United States Patent
Yamamoto et al.

(10) Patent No.: US 12,199,277 B2
(45) Date of Patent: Jan. 14, 2025

(54) NEGATIVE ELECTRODE ACTIVE MATERIAL, NEGATIVE ELECTRODE, AND BATTERY

(71) Applicant: NIPPON STEEL CORPORATION, Tokyo (JP)

(72) Inventors: Sukeyoshi Yamamoto, Tokyo (JP); Tatsuo Nagata, Tokyo (JP); Shunsuke Taniguchi, Tokyo (JP); Takafumi Amino, Tokyo (JP); Akira Taniyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 763 days.

(21) Appl. No.: 17/422,830

(22) PCT Filed: Jan. 17, 2020

(86) PCT No.: PCT/JP2020/001521
§ 371 (c)(1),
(2) Date: Jul. 14, 2021

(87) PCT Pub. No.: WO2020/149404
PCT Pub. Date: Jul. 23, 2020

(65) Prior Publication Data
US 2022/0085362 A1  Mar. 17, 2022

(30) Foreign Application Priority Data
Jan. 17, 2019 (JP) .................................. 2019-006440

(51) Int. Cl.
*H01M 4/38* (2006.01)
*C22C 9/00* (2006.01)
(Continued)

(52) U.S. Cl.
CPC .................. *H01M 4/38* (2013.01); *C22C 9/00* (2013.01); *H01M 10/0525* (2013.01); *H01M 2004/021* (2013.01); *H01M 2004/027* (2013.01)

(58) Field of Classification Search
CPC ............... H01M 4/38; H01M 10/0525; H01M 2004/021; H01M 2004/027; H01M 4/362;
(Continued)

(56) References Cited

U.S. PATENT DOCUMENTS

| | | | |
|---|---|---|---|
| 11,387,449 B2 * | 7/2022 | Yamamoto | B22F 7/08 |
| 2005/0175901 A1 * | 8/2005 | Kawakami | C22C 45/00 |
| | | | 429/231.95 |

(Continued)

FOREIGN PATENT DOCUMENTS

| | | |
|---|---|---|
| KR | 10-2015-0043462 A | 4/2015 |
| KR | 10-2016-0057813 A | 5/2016 |

(Continued)

OTHER PUBLICATIONS

Aroyo, "International Tables for Crystallography", 6th Edition, vol. A, Space-Group Symmetry, 2016, Total 6 pages.

(Continued)

*Primary Examiner* — James M Erwin
*Assistant Examiner* — Kevin Nguyen
(74) *Attorney, Agent, or Firm* — Birch, Stewart, Kolasch & Birch, LLP

(57) ABSTRACT

Provided is a negative electrode active material which is excellent in capacity, capacity retention ratio, and a coulombic efficiency when charging/discharging is repeated. The chemical composition of the alloy particles of the negative electrode active material of the present disclosure includes 0.50 to 3.00 mass % of oxygen, and alloy elements containing Sn: 13.0 to 40.0 at % and Si: 6.0 to 40.0 at %, with
(Continued)

the balance being Cu and impurities. The structure of the alloy particles includes: one or more types selected from the group consisting of a phase having a $D0_3$ structure, and a δ phase; one or more types selected from the group consisting of an ε phase and an η' phase; and a $SiO_x$ phase (x=0.50 to 1.70). The $SiO_x$ phase (x=0.50 to 1.70) has a volume fraction of 5.0 to 60.0% and the η' phase has a volume fraction of 0 to 60.0%.

20 Claims, 18 Drawing Sheets

(51) Int. Cl.
*H01M 10/0525* (2010.01)
*H01M 4/02* (2006.01)

(58) Field of Classification Search
CPC ...... H01M 4/386; H01M 4/387; H01M 4/483; H01M 4/364; H01M 10/052; H01M 10/054; C22C 9/00; C22C 9/02; C22C 9/10; Y02E 60/10; C01B 33/06; C01B 33/113
USPC ......................................................... 429/220
See application file for complete search history.

(56) References Cited

U.S. PATENT DOCUMENTS

| | | | |
|---|---|---|---|
| 2015/0200392 A1* | 7/2015 | Yamamoto | C22C 30/04 420/587 |
| 2016/0141608 A1 | 5/2016 | Ryu et al. | |
| 2017/0077501 A1* | 3/2017 | Nishiura | H01M 4/387 |
| 2019/0190021 A1 | 6/2019 | Yamamoto et al. | |

FOREIGN PATENT DOCUMENTS

| | | | |
|---|---|---|---|
| WO | 2013/141230 A1 | 9/2013 | |
| WO | WO-2017150311 A1 * | 9/2017 | ........ H01M 10/0525 |
| WO | WO 2017/200046 A1 | 11/2017 | |

OTHER PUBLICATIONS

Liu et al., "Experimental Determination and Thermodynamic Calculation of the Phase Equilibria in the Cu—In—Sn System", Journal of Electronic Materials, 2001, vol. 30, No. 9, pp. 1093-1103.
Villars, Pearson's Handbook Desk Edition, Crystallographic Data for Intermetallic Phases, 1997, vol. 2, pp. 1593-1594.

* cited by examiner

NEGATIVE ELECTRODE ACTIVE MATERIAL, NEGATIVE ELECTRODE, AND BATTERY

TECHNICAL FIELD

The present invention relates to a negative electrode active material, a negative electrode, and a battery.

BACKGROUND ART

Recently, small electronic appliances such as home video cameras, laptop PCs, and smart phones, etc., have become widespread, and there are demands for higher capacity and longer service life of batteries.

Moreover, due to the spread of hybrid vehicles, plug-in hybrid vehicles, and electric vehicles, there is also a demand for more compact batteries.

At present, graphite-based negative electrode active materials are utilized for lithium ion batteries. However, graphite-based negative electrode active materials have a limit to achieving a longer service life and a more compact size of a battery.

Accordingly, alloy-based negative electrode active materials have gained attention, which have higher capacity than those of the graphite-based negative electrode active materials. As an alloy-based negative electrode active material, silicon (Si)-based negative electrode active materials and tin (Sn)-based negative electrode active materials are known. To realize a lithium ion battery having a more compact size and a longer life, various studies have been conducted on the alloy-based negative electrode active materials.

However, an alloy-based negative electrode active material repeatedly undergoes large expansion and contraction in volume at the time of charging/discharging. For that reason, the capacity of the alloy-based negative electrode active material is prone to deteriorate. For example, a volume expansion ratio of graphite associated with charging is about 12%. In contrast to this, the volume expansion ratio of Si single substance or Sn single substance associated with charging is about 400%. For this reason, if a negative electrode plate of Si single substance or Sn single substance is repeatedly subjected to charging/discharging, significant expansion and contraction occur. Thereby, in this case, cracking occurs in the negative electrode compound which is applied to a current collector of the negative electrode plate. Consequently, the capacity of the negative electrode plate sharply decreases. This is mainly attributable to the fact that a part of the negative electrode active material in the negative electrode compound is peeled off due to volumetric expansion/contraction, and thereby the negative electrode plate loses electron conductivity.

International Application Publication No. 2013/141230 (Patent Literature 1) introduces a technique of suppressing volumetric expansion/contraction due to repetition of charging/discharging.

Porous silicon particles described in Patent Literature 1 have continuous voids with which a plurality of silicon fine particles are joined. It is described in Patent Literature 1 that the change in expansion and contraction of silicon particles can be suppressed by these voids.

CITATION LIST

Patent Literature

Patent Literature 1: International Application Publication No. 2013/141230

Non Patent Literature

Non Patent Literature 1: Liu et al., Journal of Electronic Materials, 2001, vol. 30, No. 9, p. 1093-1103
Non Patent Literature 2: Mois I. Aroyo, International Tables for Crystallography, 6th Edition, Volume-A, Space-Group Symmetry, 2016
Non Patent Literature 3: P. Villars, Pearson's Handbook Desk Edition Crystallographic Data for Intermetallic Phases Vol. 2, 1997, p. 1593-1594

SUMMARY OF INVENTION

Technical Problem

However, even if the technique of Patent Literature 1 is used, there is a case in which the capacity and a capacity retention ratio of the alloy-based negative electrode active material cannot be sufficiently achieved.

Further, Patent Literature 1 has not studied on coulombic efficiency (charging/discharging efficiency) after the second cycle when charging/discharging is repeated.

It is an object of the present disclosure to provide a negative electrode active material which is excellent in discharge capacity per mass (hereinafter, also referred to simply as "capacity", or "discharge capacity"), a capacity retention ratio, and a coulombic efficiency when charging/discharging is repeated; a negative electrode which uses the negative electrode active material; and a battery.

Solution to Problem

A negative electrode active material of the present disclosure includes a plurality of alloy particles, wherein
a chemical composition of the alloy particles contains:
0.50 to 3.00 mass % of oxygen; and
alloy elements containing: in atomic composition percentage excluding the oxygen and carbon, Sn: 13.0 to 40.0 at % and Si: 6.0 to 40.0 at %, with the balance being Cu and impurities, wherein
a structure of the alloy particles includes:
one or more types selected from the group consisting of a phase having a $D0_3$ structure in Strukturbericht notation and having a Si content of 0 to 5.0 at %, and a δ phase having a Si content of 0 to 5.0 at %;
one or more types selected from the group consisting of an ε phase having a Si content of 0 to 5.0 at % and an η' phase having a Si content of 0 to 5.0 at %; and
a $SiO_x$ phase (x=0.50 to 1.70), wherein
the alloy particles have a peak having a maximum diffraction integrated intensity in an X-ray diffraction profile, in a range of 42.0 to 44.0 degrees of diffraction angle 2θ, and the peak has a half-value width of 0.15 to 2.50 degrees, and wherein
in the structure of the alloy particles,
the $SiO_x$ phase (x=0.50 to 1.70) has a volume fraction of 5.0 to 60.0%, and
the η' phase has a volume fraction of 0 to 60.0%.

A negative electrode of the present disclosure includes the above described negative electrode active material. A battery of the present disclosure includes the above described negative electrode.

Advantageous Effects of Invention

The negative electrode active material according to the present disclosure is excellent in the capacity (discharge capacity per mass), the capacity retention ratio, and the coulombic efficiency when charging/discharging is repeated.

DESCRIPTION OF EMBODIMENTS

Figure 1:
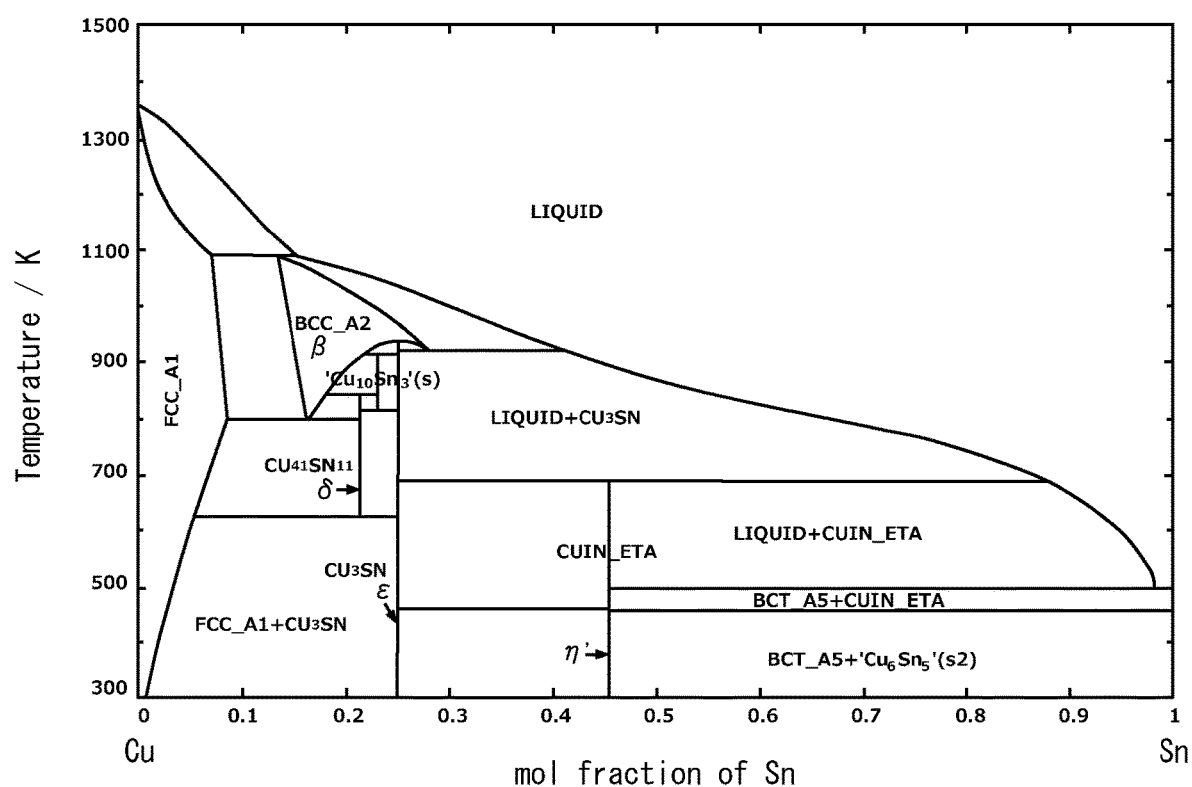
FIG. 1 is a calculated phase diagram of Cu—Sn binary system obtained by thermodynamic calculation software.

The present inventors investigated and examined the capacity of a negative electrode active material, the capacity retention ratio, and the coulombic efficiency when charging/discharging were repeated. As a result, the present inventors obtained the following findings.

If the negative electrode active material contains a plurality of alloy particles containing alloy elements (Cu, Sn, and Si), the capacity of the negative electrode active material increases. The epsilon phase (ε phase) and the eta-prime phase (η' phase) of a Cu—Sn alloy have a large reversible electric capacity due to the storage of metal ions typified by lithium ion. Therefore, if the alloy particles contain the ε phase and/or the η' phase, the capacity of the negative electrode active material is further increased. However, because of large capacity, the ε phase and the η' phase exhibit large expansion and contraction associated with the occlusion and release of metal ions (charging/discharge). Therefore, when the alloy particles contain only one phase of the ε phase and the η' phase, or only the two phases of the ε phase and the η' phase, the capacity retention ratio of the negative electrode active material decreases.

Accordingly, the present inventors further investigated the capacity retention ratio of the negative electrode active material. As a result, the present inventors have found that if the alloy particles have a composite structure containing one or more types selected from the group consisting of the ε phase and the η' phase, and one or more types selected from the group consisting of a phase having a D0$_3$ structure which appears as another phase of Cu—Sn alloy (hereinafter, also referred to as a D0$_3$ phase) and a delta phase (δ phase), the capacity retention ratio of the negative electrode active material is increased.

Although the reason for this is not clear, the following reasons are conceivable. When the alloy particles have a composite structure containing a phase having a D0$_3$ structure and/or a δ phase, and an ε phase and/or a η' phase, the D0$_3$ phase and/or the δ phase restrains the ε phase and/or the η' phase, and thereby the expansion and contraction of the ε phase and/or the η' phase is suppressed. It is presumed that consequently, the expansion and contraction of the negative electrode active material is suppressed. Therefore, if the alloy particles have the above-described composite structure, it is possible to increase both the capacity and the capacity retention ratio of the negative electrode active material.

If the alloy particles have a peak having a maximum diffraction integrated intensity (hereinafter referred to as the strongest diffraction line peak) in a range of 42.0 to 44.0 degrees of diffraction angle 2θ in an X-ray diffraction profile, the alloy particles contain one or two types selected from the group consisting of a phase having the $D0_3$ structure and a δ phase, and one or two types selected from the group consisting of the ε phase and the η' phase. If the half-value width of the strongest diffraction line peak is 0.15 to 2.50 degrees, the sizes of the crystallite diameters of the phase having the $D0_3$ structure, the δ phase, the ε phase, and the η' phase in the alloy particles are appropriate. In this case, the storage sites of metal ions are appropriately present, and the metal ions are difficult to be stabilized at the boundary region of the crystallite. Therefore, metal ions are unlikely to have irreversible capacity. As a result, excellent capacity and capacity retention ratio can be easily obtained.

The present inventors have further found that the capacity and capacity retention ratio of the negative electrode active material are further increased by adding a further new phase to the alloy particles having the above-described composite structure. This new phase is a $SiO_x$ phase (x=0.50 to 1.70). The $SiO_x$ phase (x=0.50 to 1.70) has a large reversible electric capacity due to the storage of metal ions. Therefore, if the alloy particles having the above-described composite structure further contain the $SiO_x$ phase (x=0.50 to 1.70), the capacity and the capacity retention ratio of the negative electrode active material are further increased. Although the reason for this is not clear, it is considered that when the alloy particles having at least one phase of $D0_3$ phase and δ phase, and at least one phase of ε phase and η' phase further include the $SiO_x$ phase (x=0.50 to 1.70), the $D0_3$ phase and/or the δ phase restrains the $SiO_x$ phase (x=0.50 to 1.70), so that the expansion and contraction of the $SiO_x$ phase (x=0.50 to 1.70) associated with the occlusion and release of metal ions are suppressed.

As described above, the alloy particles including at least one phase of $D0_3$ phase and δ phase, at least one phase of ε phase and η' phase, and a $SiO_x$ phase (x=0.50 to 1.70) is excellent in capacity and is suppressed from peeling off that arises from expansion and contraction. However, even with the above-described alloy particles, there are still cases in which the capacity retention ratio is low. Therefore, the present inventors have considered as follows.

The following two causes are considered to be the cause of decrease in the capacity retention ratio.

Cause 1: As a result of repeated charging/discharging, one or more phases in the alloy particles in the negative electrode repeatedly expand and contract so that the alloy particles are peeled off from the negative electrode and the electron conductivity of the negative electrode deteriorates.

Cause 2: Although the initial coulombic efficiency (charging/discharging efficiency) of the alloy particles is high, the coulombic efficiency deteriorates when charging/discharging is repeated multiple times.

The present inventors considered that, in the above-described alloy particles, although Cause 1 is suppressed, the capacity retention ratio may be low due to Cause 2 (decrease in coulombic efficiency when charging/discharging is repeated). Thus, the present inventors investigated a method of suppressing the decrease in coulombic efficiency when charging/discharging is performed multiple times in the alloy particles including at least one phase of $D0_3$ phase and δ phase, and at least one phase of ε phase and η' phase, and further, including the $SiO_x$ phase (x=0.50 to 1.70).

Here, when charging/discharging is repeated multiple times, the coulombic efficiency after the 10th time is stabilized. Therefore, in the present description, the arithmetic mean value of the coulombic efficiency from the 10th charging/discharging to the 100th charging/discharging is defined as a "stable-period coulombic efficiency" as an index of the coulombic efficiency when charging/discharging is performed multiple times. The coulombic efficiency (%) is defined as follows.

Coulombic efficiency(%)=$n$-th discharge capacity (mAh/g)/$n$-th charge capacity (mAh/g)×100

In the present description, the coulombic efficiency of n=1 in the above formula is the "initial coulombic efficiency". In the above formula, the arithmetic mean value of the coulombic efficiency of n=10 to 100 is the "stable-period coulombic efficiency".

Therefore, the present inventors further investigated and examined alloy particles which are excellent in capacity, and which are also excellent in the capacity retention ratio as a result of Cause 1 and Cause 2 being suppressed. Here, the present inventors have considered that in the above-described alloy particles, there might be an appropriate volume fraction of $SiO_x$ phase (x=0.50 to 1.70) in the structure of the alloy particles to improve the capacity and to increase the stable-period coulombic efficiency concerning Cause 2. Therefore, the present inventors have attempted to examine the volume fraction of the $SiO_x$ phase (x=0.50 to 1.70) in alloy particles including at least one phase of $D0_3$ phase and δ phase, at least one phase of ε phase and η phase, and a $SiO_x$ phase (x=0.50 to 1.70).

However, a method for measuring the volume fraction of each phase in the structure of alloy particles has not been established. Therefore, the present inventors first examined a method for measuring the volume fraction of the $SiO_x$ phase (x=0.50 to 1.70) in alloy particles. As a result, it was found for the first time that the volume fraction of the $SiO_x$ phase (x=0.50 to 1.70) in alloy particles can be measured by adopting the measurement method to be described later.

Therefore, the present inventors have investigated and examined an optimum volume fraction of the $SiO_x$ phase (x=0.50 to 1.70) in the alloy particles for the purpose of increasing the capacity and the capacity retention ratio, and improving the stable-period coulombic efficiency. As a result, the present inventors have obtained the following findings.

When the volume fraction of the $SiO_x$ phase (x=0.50 to 1.70) is 5.0% or more, the capacity of the negative electrode active material is remarkably increased. Further, since the $D0_3$ phase and/or the δ phase restrains the $SiO_x$ phase (x=0.50 to 1.70), Cause 1 is suppressed. However, if the volume fraction of the $SiO_x$ phase (x=0.50 to 1.70) increases, the stable-period coulombic efficiency may deteriorate. If the volume fraction of the $SiO_x$ phase (x=0.50 to 1.70) is 60.0% or less, it is possible to increase the capacity of the negative electrode active material, and also improve the stable-period coulombic efficiency while suppressing Cause 1. As a result, the capacity retention ratio also increases.

The following items are considered as the reason why the stable-period coulombic efficiency of the negative electrode active material is increased by setting the volume fraction of the $SiO_x$ phase (x=0.50 to 1.70) to 60.0% or less.

As the volume fraction of the $SiO_x$ phase (x=0.50 to 1.70) increases, the $SiO_x$ phase (x=0.50 to 1.70) to be exposed on the surface of the negative electrode active material increases. The $SiO_x$ phase (x=0.50 to 1.70) exposed on the surface of the negative electrode active material reacts with the electrolytic solution to decompose the electrolytic solution. The reaction with the electrolytic solution produces Li oxide having a high valence. Since Li oxide having a high valence does not release Li, it may cause irreversible capacity. Li oxide having a high valence will increase if charging/discharging is repeated. If the $SiO_x$ phase (x=0.50 to 1.70) exposed on the surface of the negative electrode active material increases, the decomposition of the electrolytic solution by the exposed $SiO_x$ phase (x=0.50 to 1.70) becomes remarkable so that by repeating charging/discharging, the amount of formation of Li oxide having a high valence increases. When the volume fraction of the $SiO_x$ phase (x=0.50 to 1.70) is 60.0 volume % or less, the decomposition of the electrolytic solution is suppressed, and the amount of formation of Li oxide having a high valence is suppressed. As a result, it is possible to improve the stable-period coulombic efficiency.

The negative electrode active material of the present embodiment completed based on the findings described above has the following constitution.

[1]

A negative electrode active material, including a plurality of alloy particles, wherein
a chemical composition of the alloy particles contains:
0.50 to 3.00 mass % of oxygen; and
alloy elements containing: in atomic composition percentage excluding the oxygen and carbon, Sn: 13.0 to 40.0 at % and Si: 6.0 to 40.0 at %, with the balance being Cu and impurities, wherein
a structure of the alloy particles includes:
one or more types selected from the group consisting of a phase having a $D0_3$ structure in Strukturbericht notation and having a Si content of 0 to 5.0 at %, and a δ phase having a Si content of 0 to 5.0 at %;
one or more types selected from the group consisting of an ε phase having a Si content of 0 to 5.0 at % and an η' phase having a Si content of 0 to 5.0 at %; and
a $SiO_x$ phase (x=0.50 to 1.70), wherein
the alloy particles have a peak having a maximum diffraction integrated intensity in an X-ray diffraction profile, in a range of 42.0 to 44.0 degrees of diffraction angle 2θ, and the peak has a half-value width of 0.15 to 2.50 degrees, and wherein
in the structure of the alloy particles,
the $SiO_x$ phase (x=0.50 to 1.70) has a volume fraction of 5.0 to 60.0%, and
the η' phase has a volume fraction of 0 to 60.0%.
The negative electrode active material of [1] is excellent in the capacity and the coulombic efficiency (stable-period coulombic efficiency) when charging/discharging are repeated, and is also excellent in the capacity retention ratio.

[2]

The negative electrode active material according to [1], wherein
in the structure of the alloy particles,
the η' phase has a volume fraction of more than 0% to 60.0%.

[3]

The negative electrode active material according to [2], wherein
in the structure of the alloy particles,
a volume fraction $V_{SiOx}$ (%) of the $SiO_x$ phase (x=0.50 to 1.70) and a volume fraction $V_{η'}$ (%) of the η' phase satisfy Formula (1).

$$8.0 \leq V_{SiOx} + 0.5 V_{η'} \leq 65.0 \tag{1}$$

If the negative electrode active material satisfies Formula (1), the capacity and the stable-period coulombic efficiency of the negative electrode active material are further improved.

[4]

The negative electrode active material according to any one of [1] to [3], wherein
a mean circle-equivalent diameter of the $SiO_x$ phase (x=0.50 to 1.70) is 2.0 to 90.0 nm.

[5]

The negative electrode active material according to any one of [1] to [4], wherein
the alloy elements further contain, in place of part of Cu, one or more elements selected from the group consisting of C, Ti, V, Cr, Mn, Fe, Co, Ni, Zn, Al, and B.

[6]

The negative electrode active material according to [5], wherein
the chemical composition contains one or more elements selected from the group consisting of:
C: 40% or less in mass %,
Ti: 2.0 at % or less in atomic composition percentage excluding oxygen and carbon,
V: 2.0 at % or less in atomic composition percentage excluding oxygen and carbon,
Cr: 2.0 at % or less in atomic composition percentage excluding oxygen and carbon,
Mn: 2.0 at % or less in atomic composition percentage excluding oxygen and carbon,
Fe: 2.0 at % or less in atomic composition percentage excluding oxygen and carbon,
Co: 2.0 at % or less in atomic composition percentage excluding oxygen and carbon,
Ni: 3.0 at % or less in atomic composition percentage excluding oxygen and carbon,
Zn: 3.0 at % or less in atomic composition percentage excluding oxygen and carbon,
Al: 3.0 at % or less in atomic composition percentage excluding oxygen and carbon, and
B: 2.0 at % or less in atomic composition percentage excluding oxygen and carbon.

[7]

A negative electrode, including the negative electrode active material according to any one of [1] to [6].

[8]

A battery, including the negative electrode according to [7].

Hereinafter, the negative electrode active material according to the present embodiment will be described in detail.

[Negative Electrode Active Material]

The negative electrode active material of the present embodiment includes a plurality of alloy particles. Preferably, the plurality of alloy particles are main components of the negative electrode active material. Here, the statement "alloy particles are main components of the negative electrode active material" means that the negative electrode active material contains 40% or more of the alloy particles in mass %. The lower limit of the content of the alloy particles in the negative electrode active material is preferably 50% or more in mass %, and more preferably 60% or more. The negative electrode active material may contain other active materials other than the alloy particles. Other active materials are, for example, graphite particles. However, the negative electrode active material of the present embodiment does not have to contain graphite particles.

Graphite may be present in a state compounded with the alloy particles. In this case, the proportion of graphite (carbon: C) in the alloy particles is preferably 0 to 40 mass %. In other words, when C is contained, the C content is 40% or less in mass %. The lower limit of the C content in the alloy particles is preferably more than 0%, more preferably 1%, further preferably 2 mass %, and further preferably 3 mass %. The upper limit of the C content in the alloy particles is preferably 30 mass %, and more preferably 20 mass %.

[Alloy Particles]

The chemical composition and the structure of alloy particles that constitute a negative electrode active material will be described below in detail.

[Chemical Composition of Alloy Particles]

The chemical composition of alloy particles contains alloy elements and oxygen. The chemical composition of the alloy particles may contain impurities other than the alloy elements and oxygen as long as the gist of the present invention is not impaired. However, the amount of the impurities is preferably as low as possible.

The chemical composition of alloy particles contains 0.50 to 3.00 mass % of oxygen, and alloy elements.

Specifically, the alloy particles consist of oxygen and alloy elements. Alternatively, the alloy particles consist of oxygen, alloy elements, and graphite (carbon).

[Alloy Elements]

The alloy elements contain, in atomic composition percentage (at %) excluding oxygen and carbon of the alloy particles, Sn: 13.0 to 40.0 at % and Si: 6.0 to 40.0 at %, with the balance being Cu and impurities. In other words, in the present description, the alloy elements consist of elements other than oxygen and carbon of the chemical composition of the alloy particles. When the alloy particles do not contain graphite, the carbon content in the alloy particles is 0%, so that the alloy elements contain, in atomic composition percentage (at %) excluding oxygen, Sn: 13.0 to 40.0 at % and Si: 6.0 to 40.0 at %, with the balance being Cu and impurities. Hereinafter, the Sn content and the Si content will be described.

Sn: 13.0 to 40.0 at %

Tin (Sn) increases the capacity of the negative electrode active material. When the Sn content is less than 13.0 at %, the formation of the ε phase and the η' phase in the alloy particles is suppressed. In this case, the capacity of the negative electrode active material is reduced. On the other hand, when the Sn content is more than 40.0 at %, the formation of the $DO_3$ phase and the δ phase in the alloy particles is suppressed. In this case, the capacity retention ratio of the negative electrode active material decreases. Therefore, the Sn content is 13.0 to 40.0 at %. The lower limit of the Sn content is preferably 13.5 at %, more preferably 14.0 at %, further preferably 14.5 at %, further preferably 15.0 at %, and further preferably 15.5 at %. The upper limit of the Sn content is preferably 38.0 at %, more preferably 35.0 at %, further preferably 33.0 at %, and further preferably 30.0 at %.

Si: 6.0 to 40.0 at %

Silicon (Si) increases the capacity of the negative electrode active material. When the Si content is less than 6.0 at %, the formation of $SiO_x$ phase (x=0.50 to 1.70) in the alloy particles is suppressed. In this case, the capacity of the negative electrode active material is reduced. On the other hand, when the Si content is more than 40.0 at %, the $SiO_x$ phase (x=0.50 to 1.70) in the alloy particles is excessively formed. In this case, the capacity retention ratio of the negative electrode active material decreases. Therefore, the Si content is 6.0 to 40.0 at %. The lower limit of the Si content is preferably 6.3 at %, more preferably 6.5 at %, further preferably 6.8 at %, further preferably 7.0 at %, further preferably 7.5 at %, and further preferably 8.0 at %. The upper limit of the Si content is preferably 35.0 at %, more preferably 32.0 at %, further preferably 30.0 at %, further preferably 28.0 at %, and further preferably 25.0 at %.

The balance of the alloy elements is Cu and impurities. By combining Cu with the above-described contents of Sn and Si, the capacity of the negative electrode active material is increased and the capacity retention ratio is also increased. Further, the initial coulombic efficiency is improved. Impurities mean those which are allowed within a range not adversely affecting the negative electrode active material of the present embodiment.

[Oxygen]

In the chemical composition of alloy particles, the oxygen content is 0.50 to 3.00% in mass %. In other words, the chemical composition of the alloy particles contains 0.50 to 3.00 mass % of oxygen assuming that the mass of the whole alloy particles is 100 mass %. When the oxygen content is less than 0.50 mass %, the formation of $SiO_x$ phase (x=0.50 to 1.70) in the alloy particles is suppressed. In this case, the capacity of the negative electrode active material decreases. On the other hand, when the oxygen content is more than 3.00 mass %, the $SiO_x$ phase (x=0.50 to 1.70) in the alloy particles is excessively formed. In this case, the capacity retention ratio of the negative electrode active material decreases. Therefore, the oxygen content is 0.50 to 3.00 mass %. The lower limit of the oxygen content is preferably 0.60 mass %, and more preferably 0.70 mass %. The upper limit of the oxygen content is preferably 2.50 mass %, and more preferably 2.00 mass %.

[Method for Measuring Alloy Elements (Metal Elements, Si, B) and C]

Alloy elements are measured by the well-known inductively coupled plasma (ICP) emission spectroscopy. The analyzer to be used for the measurement is not particularly limited, but for example, an analyzer with trade name: ICPS-8100, manufactured by Shimadzu Corporation is used. The sample (alloy particles) is weighed, and is added with 20 ml of hydrochloric acid (1+1) and 5 ml of nitric acid to perform decomposition by heating. Next, filtering is performed by using filter paper (Type 5 C). The solution after filtration is recovered in a 100 ml volumetric flask. The filter paper is washed with warm hydrochloric acid (1+100) and warm water. After washing, the undissolved material remaining on the filter paper is recovered in a platinum crucible. After carbonizing and ashing the recovered filter paper, the undissolved material is liquefied by using an alkaline liquefying agent (sodium carbonate). The melt formed by liquefying is dissolved with 10 ml of nitric acid (1+2). The dissolved melt is put into the volumetric flask that collected the filtrate. The volume is adjusted to the 100 ml marked line in the volumetric flask. After being stirred, the solution is filtered through JIS P 3801 (1995) Type 5 B, and each element is quantified by ICP. As for elements of high concentration, quantification is performed by dispensing and diluting the solution each time. As the standard solution, a standard solution with JCSS certification of Kanto Chemical Co., Inc. is used. The measurement is performed twice, and the arithmetic mean of each element content obtained is defined as the element content (mass %) of each analysis target in the alloy particles.

The carbon content is measured by a well-known infrared absorption method after high-frequency combustion. The analyzer to be used for the measurement is not particularly limited, but for example, a CSLS-600 type carbon/sulfur analyzer manufactured by LECO Japan Corporation is used. Specifically, the measurement is performed in the following way. 0.2 g of sample (alloy particles), and 0.5 g of pure iron (combustion material) are weighed and placed in a porcelain crucible for carbon sulfur (CS) analysis, and burned in an oxygen stream. The carbon component in the alloy particles is reacted with oxygen to generate carbon monoxide gas and carbon dioxide gas. The generated carbon monoxide gas passes through the copper oxide (650° C.) in the apparatus and becomes carbon dioxide gas. This component (carbon dioxide) is quantitatively analyzed by the infrared absorption method and converted into a carbon content. When the alloy particles contain less than 1 mass % of carbon, as the sample for standardization, a Cu material (a sample in which a certified value of C is specified for 99.8 mass % of Cu) and the sample supplied by the Iron and Steel Institute of Japan (JSS204-2) are used, and when the alloy particles contain 1 mass % or more of carbon, the sample supplied by the Iron and Steel Institute of Japan (JSS208-3) and a chromium carbide standard reagent are used. The measurement is performed three times, and the arithmetic mean of each carbon content obtained is assumed as the carbon content (mass %) in the alloy particles. The porcelain crucible for carbon/sulfur (CS) analysis is held beforehand in an electric furnace of 1000° C. for 1 or more hours to remove impurities contained in the crucible, and is stored in an electric furnace of 400° C.

[Method for Measuring Oxygen Content]

The oxygen content in the alloy particles is measured by the infrared absorption method after fusion under inert gas. The analyzer to be used for the measurement is not particularly limited, but for example, a TC-600 type oxygen/nitrogen analyzer manufactured by LECO Corporation is used. Specifically, measurement is performed in the following way. The graphite crucible is heated in an impulse heating furnace in a helium carrier gas at a sufficiently high temperature to remove gas components in advance. The alloy particles to be measured, which are encapsulated and sealed in a nickel capsule, are put into a crucible from which the gas components have been removed in advance to melt the alloy particles. The oxygen component in the alloy particles reacts with the graphite material of the crucible to generate carbon monoxide gas and carbon dioxide gas. These components (generated carbon monoxide and carbon dioxide) in the helium carrier gas are quantitatively analyzed by the infrared absorption method. As the sample for standardization, Japanese Iron and Steel Certified Reference Materials (JSS383-1, JSS389-1) are used. No particular preparations of the sample is performed. The measurement is carried out three times, and the arithmetic mean of each oxygen content obtained is defined as the oxygen content (mass %) in the alloy particles.

[Structure of Alloy Particles]

The structure of alloy particles contains the following first phase to third phase:

(First phase) one or more types selected from the group consisting of a phase having a $D0_3$ structure in Strukturbericht notation and having a Si content of 0 to 5.0 at %, and a $\delta$ phase having a Si content of 0 to 5.0 at %, (Second phase) one or more types selected from the group consisting of an $\epsilon$ phase having a Si content of 0 to 5.0 at % and an $\eta'$ phase having a Si content of 0 to 5.0 at %, and (Third phase) a $SiO_x$ phase (x=0.50 to 1.70).

The structure of the alloy particles may include phases other than the $D0_3$ phase, the $\delta$ phase, the $\epsilon$ phase, the $\eta'$ phase, and the $SiO_x$ phase (x=0.50 to 1.70). However, it is preferable that the number of phases other than the $D0_3$ phase, the $\delta$ phase, the $\epsilon$ phase, the $\eta'$ phase, and the $SiO_x$ phase (x=0.50 to 1.70) is as small as possible.

The $D0_3$ phase, the $\delta$ phase, the $\epsilon$ phase and the $\eta'$ phase are given in the calculated phase diagram of Cu—Sn binary system shown in Non Patent Literature 1. FIG. 1 shows a calculated phase diagram of Cu—Sn binary system obtained by thermodynamic calculation software (software name: FactSage) using the same thermodynamic database (database name: SGTE11) as in Non Patent Literature 1.

Referring to FIG. 1, the region represented by $\beta$ in the phase diagram is a high-temperature stabilized phase of the bcc structure. The $D0_3$ phase is a non-equilibrium phase. The $D0_3$ phase is formed, for example, by rapid cooling from the $\beta$ region. The $D0_3$ phase is also produced as a metastable phase at room temperature by performing a mechanical alloying (MA) processing under specific conditions described later, without performing rapid cooling. The $\delta$ phase is a high-temperature stabilized phase. The $\delta$ phase is formed by rapid cooling similarly to the $D0_3$ phase. The $\delta$ phase is further formed as a metastable phase at room temperature by performing a mechanical alloying (MA) processing. The $\epsilon$ phase and the $\eta'$ phase are equilibrium phases that are stable at room temperature. The $D0_3$ phase, the $\delta$ phase, the $\epsilon$ phase, the $\eta'$ phase, and the $SiO_x$ phase (x=0.50 to 1.70) reversibly occlude and release metal ions. Therefore, these phases function as negative electrode active material. The "metal ion" includes, for example, lithium ion, magnesium ion, sodium ion and the like. A preferred metal ion is lithium ion. Hereinafter, the $D0_3$ phase, the $\delta$ phase, the $\epsilon$ phase, and the $\eta'$ phase will be described.

[First Phase: $D0_3$ Phase and $\delta$ Phase]

The structure of the alloy particles contains one or more types selected from the group consisting of a phase having a $D0_3$ structure in Strukturbericht notation and having a Si content of 0 to 5.0 at %, and a $\delta$ phase having a Si content of 0 to 5.0 at %. All of these phases restrain the $\epsilon$ phase, the $\eta'$ phase, and the $SiO_x$ phase (x=0.50 to 1.70) when the s phase, the $\eta'$ phase, and the $SiO_x$ phase (x=0.50 to 1.70) expand and contract. As a result, the above-described Cause 1 (peeling off of the alloy particles from the negative electrode plate due to expansion/contraction) is suppressed, and thereby increases the capacity retention ratio of the negative electrode active material. Note that the $D0_3$ phase and the $\delta$ phase also increase the capacity of the negative electrode active material, but the effects thereof are smaller than those of the $\epsilon$ phase, the $\eta'$ phase, and the $SiO_x$ phase (x=0.50 to 1.70).

[$D0_3$ Phase]

The $D0_3$ phase occludes and releases metal ions. The crystal structure of the $D0_3$ phase changes when metal ions are occluded, resulting in a phase (occlusion phase) having a crystal structure different from that of the $D0_3$ phase. When the occlusion phase releases metal ions, the crystal structure changes again and returns to the $D0_3$ phase. In other words, when the alloy particles contain the $D0_3$ phase, the alloy particles contain the $D0_3$ phase before the occlusion of the metal ions, and the alloy particles contain the occlusion phase after the occlusion of metal ions. When the alloy particles repeatedly occlude and release metal ions, the $D0_3$ phase repeats changes in crystal structure. This change in crystal structure alleviates the strain caused by the expansion and contraction of the alloy particles during charging/discharging. As a result, it is possible to suppress the peeling off of the alloy particles from the current collector of the negative electrode of the alloy particles due to the accumulation of strain. Therefore, if the alloy particles contain the $D0_3$ phase, the capacity retention ratio of the negative electrode active material increases for the above-described reason.

Figure 2:
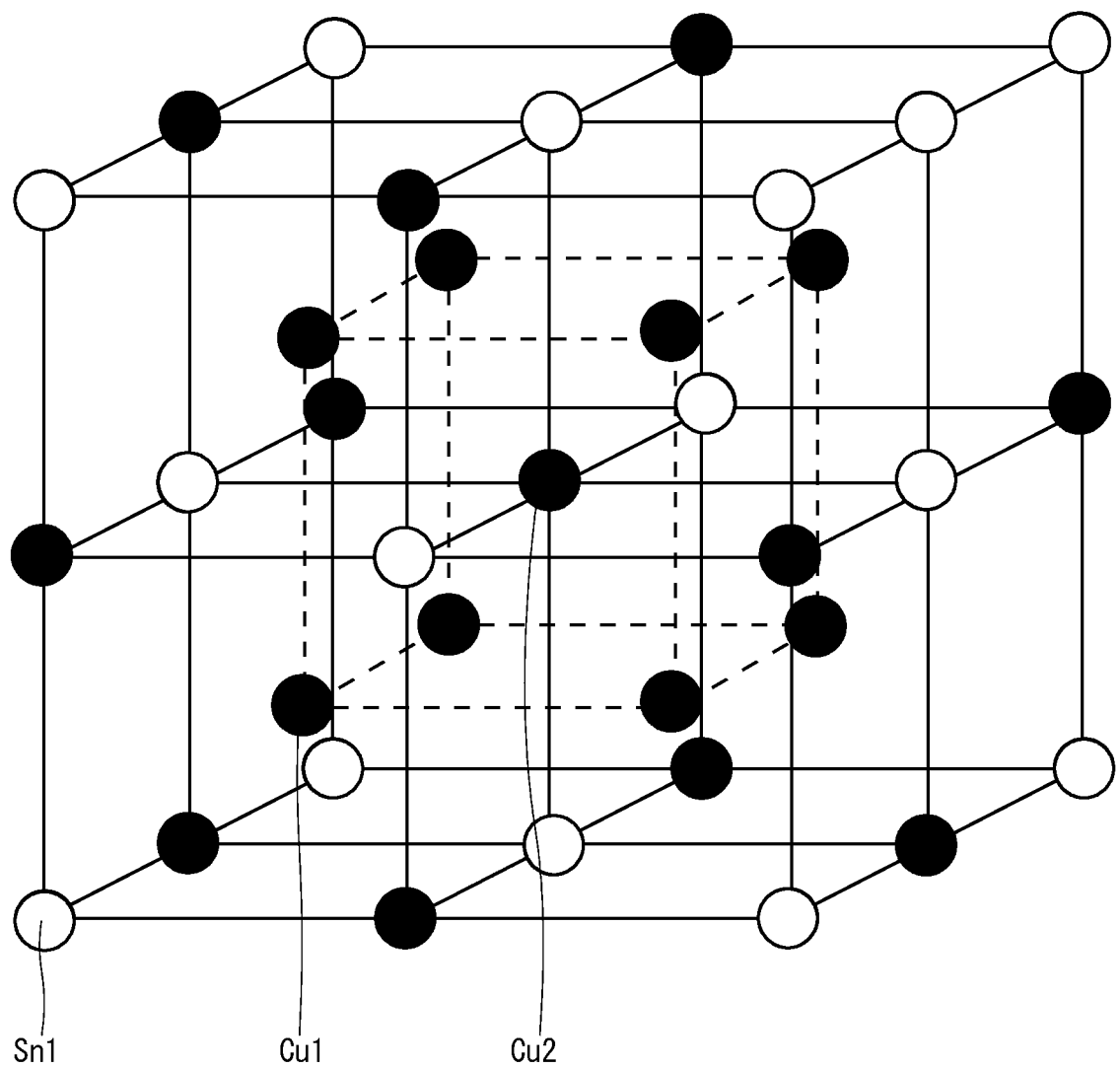
FIG. 2 is a diagram to show the crystal lattice of a D0$_3$ structure in Strukturbericht notation.

The $D0_3$ phase is a non-equilibrium phase. FIG. 2 is a diagram showing a crystal lattice of the $D0_3$ structure in the Strukturbericht notation. Referring to FIG. 2, the $D0_3$ structure is a regular structure and is a cubic crystal. Sn is mainly disposed at the atomic site Sn1 indicated by a white circle in FIG. 2. Cu is mainly disposed at the atomic sites Cu1 and Cu2 indicated by black circles. Such a crystal structure corresponds to No. 225 (Fm-3m) of Non Patent Literature 2 in terms of the classification of space groups. Table 1 shows an example of the lattice constant and atomic coordinates of the $D0_3$ structure belonging to this space group number. However, the elements to be disposed at the sites Sn1, Cu1 and Cu2 shown in Table 1 can be substituted according to the alloy elements. Specifically, when the alloy elements are a Cu—Sn—Si ternary system, Si can be substituted at each site. Further, the numerical value of the lattice constant "a" shown in Table 1 may change depending on the alloy elements. Further, the numerical values of atomic coordinates and the occupancy of each site shown in Table 1 may also change depending on the alloy elements.

TABLE 1

$D0_3$ phase Cubic Space group number
(international Table A): NO. 225 (Fm-3 m)
Lattice constant: a = 6.05 Å
(as an example)

| Site | Element | Multiplicity, Wyckoff symbol | Atomic coordinates | | | Occupancy |
|---|---|---|---|---|---|---|
| | | | x | y | z | |
| Sn1 | Sn | 4a | 0.0 | 0.0 | 0.0 | 1.0 |
| Cu1 | Cu | 8c | 1/4 | 1/4 | 1/4 | 1.0 |
| Cu2 | Cu | 4b | 1/2 | 1/2 | 1/2 | 1.0 |

Structure model references: Mois I. Aroyo, International Tables for Crystallography, 6th Edition, Volume-A, Space-Group Symmetry, 2016

The details of the crystal structure of the occlusion phase are unknown. However, the crystal structure of the occlusion phase is considered to be as follows.

Figure 3:
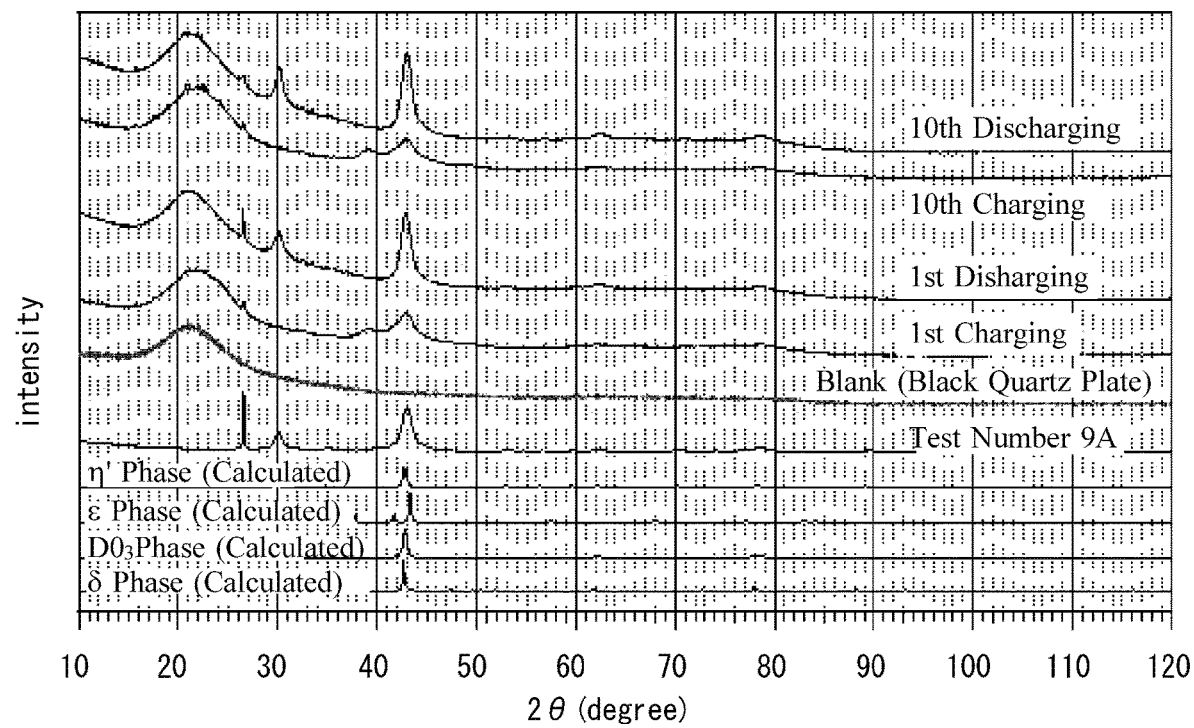
FIG. 3 is a diagram to show changes in an X-ray diffraction profile and a peak having a maximum diffraction integrated intensity (hereinafter, also referred to as a strongest diffraction line peak) before and after charging/discharging, and after MA processing of the negative electrode active material in Test Number 9A in Examples.

FIG. 3 shows the changes in the X-ray diffraction profile and the peak having a maximum diffraction integrated intensity (hereinafter, also referred to as the strongest diffraction line peak) of the negative electrode active material in Test Number 9A in Examples after the MA processing, and before and after charging/discharging. In each of X-ray diffraction profiles of the 1st charged state, the 1st discharged state, the 10th charged state, and the 10th discharged state of FIG. 3, a large and broad peak on a lower angle side (2θ: a range of about 15 to 30 degrees) is a peak originated from the glass of the sample holder (made of black quartz). Referring to the X-ray diffraction profile of the negative electrode active material of Test Number 9A in FIG. 3, in the negative electrode active material before lithium ion occlusion, the strongest diffraction line peak (in the case of $D0_3$ phase, hkl: 220, in the case of δ phase, hkl: 660, in the case of the ε phase, hkl: 211, in the case of the η' phase, hkl: 204, 132, 31-4, 42-2, 510) appears at 42.0 to 44.0 degrees. Here, the above-described hkl means the Miller index (hkl). In the Miller index (hkl) of the present description, a numeral with a minus sign means that it is a component in the negative direction. For example, in the case of "31-4", it means that 4 is a component in the negative direction. Originally, "–" should be written above the numeral, but in the present description, a minus sign is simply placed in front of the numeral.

Referring to FIG. 3, after charging (after occlusion of lithium ions), the strongest diffraction line peak becomes broad (the width of the peak becomes wider) (see the 1st and 10th charged states in FIG. 3). After discharging (after release of lithium ions), the strongest diffraction line peak becomes sharp again (the width of the peak becomes narrower) (see the 1st and 10th discharged states in FIG. 3). From the reversible behavior described above, it is presumed that the entire structure of the alloy particles including an occlusion phase is reversibly changed in crystal structure accompanying charging/discharging. Moreover, it is considered that the volume change accompanying the change in the crystal structure is small.

[δ phase]

The δ phase has a chemical composition of $Cu_4Sn_{11}$ in the Cu—Sn binary system alloy. The δ phase occludes and releases metal ions. In the δ phase, the volume change due to the change in crystal structure during occlusion and release of metal ions is small. Therefore, if the alloy particles contain the δ phase, the expansion and release of the alloy particles during charging/discharging can be suppressed. Therefore, if the alloy particles contain the δ phase, the capacity retention ratio of the negative electrode active material increases for the above-described reason.

The crystal structure of the δ phase is cubic. The crystal structure of the δ phase corresponds to the crystal structure model of $Cu_{41}Sn_{11}$ shown on page 1594 of Non Patent Literature 3, and in terms of the classification of the space group, corresponds to No. 216 (F-43m) of Non Patent Literature 2. Table 2 shows an example of the lattice constant and atomic coordinates of the crystal structure of the δ phase belonging to this space group number. In the case of the δ phase of the Cu—Sn binary system of $Cu_{41}Sn_{11}$ shown on page 1594 of Non Patent Literature 3, Cu is disposed at each site of Cu1 to Cu13, and Sn is disposed at each site of Sn1 to Sn3. However, the elements disposed at the sites shown in Table 2 can be substituted according to the alloy elements. Specifically, when the alloy elements is a Cu—Sn—Si ternary system, Si can be substituted for each site. The numerical value of the lattice constant "a" shown in Table 2 may change depending on the alloy elements. The numerical values of atomic coordinates and occupancy of each site shown in Table 2 may also change depending on the alloy elements.

TABLE 2

δ phase ($Cu_{41}Sn_{11}$) Cubic (F-cell)
Space group number (International Table A): No. 216 (F-43 m)
Lattice constant: a = 17.98 Å (as an example)

| Site | Element | Multiplicity, Wyckoff symbol | Atomic coordinates | | | Occupancy |
|---|---|---|---|---|---|---|
| | | | x | y | z | |
| Cu1 | Cu | 16e | 0.0573 | 0.0573 | 0.0573 | 0.75 |
| Cu2 | Cu | 16e | 0.3005 | 0.3005 | 0.3005 | 1.00 |
| Cu3 | Cu | 16e | 0.5504 | 0.5504 | 0.5504 | 1.00 |
| Cu4 | Cu | 16e | 0.8062 | 0.8062 | 0.8062 | 1.00 |
| Cu5 | Cu | 16e | 0.1657 | 0.1657 | 0.1657 | 1.00 |

TABLE 2-continued

δ phase ($Cu_{41}Sn_{11}$) Cubic (F-cell)
Space group number (International Table A): No. 216 (F-43 m)
Lattice constant: a = 17.98 Å (as an example)

| Site | Element | Multiplicity, Wyckoff symbol | Atomic coordinates | | | Occupancy |
|------|---------|---|---|---|---|---|
| | | | x | y | z | |
| Cu6 | Cu | 16e | 0.4166 | 0.4166 | 0.4166 | 1.00 |
| Cu7 | Cu | 16e | 0.6664 | 0.6664 | 0.6664 | 1.00 |
| Sn1 | Sn | 16e | 0.9113 | 0.9113 | 0.9113 | 1.00 |
| Cu8 | Cu | 24f | 0.1763 | 0.0000 | 0.0000 | 1.00 |
| Cu9 | Cu | 24f | 0.6765 | 0.0000 | 0.0000 | 1.00 |
| Cu10 | Cu | 24g | 0.4241 | 0.2500 | 0.2500 | 1.00 |
| Sn2 | Sn | 24g | 0.9309 | 0.2500 | 0.2500 | 1.00 |
| Cu11 | Cu | 48h | 0.1562 | 0.1562 | 0.0186 | 1.00 |
| Cu12 | Cu | 48h | 0.6465 | 0.6465 | 0.5278 | 1.00 |
| Cu13 | Cu | 48h | 0.9087 | 0.9087 | 0.7631 | 1.00 |
| Sn3 | Sn | 48h | 0.4084 | 0.4084 | 0.2680 | 1.00 |

Structure model references: P. Villars, Pearson's Handbook Desk Edition Crystallographic Data for Intermetallic Phases Vol. 2, 1997, p. 1594

[Second Phase: ε Phase and η' Phase]

The structure of the alloy particles further contain one or more types selected from the group consisting of an ε phase having a Si content of 0 to 5.0 at %, and a η' phase having a Si content of 0 to 5.0 at %. All of these phases have a higher reversible electric capacity due to the storage of metal ions as compared with the $D0_3$ phase and the δ phase, and increase the capacity of the negative electrode active material.

[ε Phase]

The ε phase has a chemical composition of $Cu_3Sn$ in the Cu—Sn binary system alloy. The ε phase occludes and releases metal ions. The ε phase has a larger reversible electric capacity due to the storage of metal ions as compared with the $D0_3$ phase and the δ phase. Therefore, the ε phase increases the capacity of the negative electrode active material.

The crystal structure of the ε phase is orthorhombic. Of the two types of $Cu_3Sn$ shown on page 1593 of Non Patent Literature 3, the crystal structure of the F phase corresponds to No. 59 Choice2 (Pmmn) of Non Patent Literature 2 in terms of the classification of space groups. Table 3 shows an example of the lattice constant and atomic coordinates of the crystal structure of the ε phase belonging to this space group number. In the case of the ε phase of the Cu—Sn binary system shown on page 1593 of Non Patent Literature 3 (No. 59 Choice2 of Non Patent Literature 2), Sn is mainly disposed at the site of Sn1, and Cu is mainly disposed at each site of Cu1 and Cu2. However, the elements disposed at the sites shown in Table 3 can be substituted according to the alloy elements. Specifically, when the alloy elements is a Cu—Sn—Si ternary system, Si can be substituted for each site. Further, the numerical values of the lattice constant a, b and c shown in Table 3 may change depending on the alloy elements. Further, numerical values of atomic coordinates and occupancy of each site shown in Table 3 may also change depending on the alloy elements.

TABLE 3

ε phase ($Cu_3Sn$) Orthorhombic Space group number
(International Table A): No. 59-2 (Pmmn)
Lattice constant: a = 5.49 Å, b = 4.32 Å, c = 4.74 Å (as an example)

| Site | Element | Multiplicity, Wyckoff symbol | Atomic coordinates | | | Occupancy |
|------|---------|---|---|---|---|---|
| | | | x | y | z | |
| Sn1 | Sn | 2a | 0 | 0 | 0.333 | 1.0 |
| Cu1 | Cu | 2b | 0 | 1/2 | 0.667 | 1.0 |
| Cu2 | Cu | 4f | 1/4 | 0 | 0.833 | 1.0 |

Structure model references: P. Villars, Pearson's Handbook Desk Edition Crystallographic Data for Intermetallic Phases Vol. 2, 1997, p. 1593

[η' Phase]

The η' phase has a chemical composition of $Cu_6Sn_5$ in the Cu—Sn binary system alloy. The η' phase occludes and releases metal ions. Similarly to the F phase, the η' phase has a larger reversible electric capacity due to the storage of metal ions as compared with the $D0_3$ phase and the δ phase. Therefore, the η' phase increases the capacity of the negative electrode active material.

The crystal structure of the η' phase is monoclinic. The crystal structure of the η' phase corresponds, in terms of the classification of the space group, to No. 15(C2/c) of Non Patent Literature 2 out of the two types of $Cu_6Sn_5$ shown on pages 1593 and 1594 of Non Patent Literature 3. Table 4 shows an example of the lattice constant and atomic coordinates of the crystal structure of the η' phase belonging to this space group number. In the case of the η' phase of the Cu—Sn binary system shown on pages 1593 and 1594 of Non Patent Literature 3 (No. 15 of Non Patent Literature 2), Sn is mainly disposed at the sites of Sn1 to Sn3, and Cu is mainly disposed at the sites of Cu1 to Cu4. However, the elements disposed at the sites shown in Table 4 can be substituted according to the alloy elements. Specifically, when the alloy elements is a Cu—Sn—Si ternary system, Si can be substituted for each site. Further, the numerical values of the lattice constants a, b, c, α, β and γ shown in Table 4 may change depending on the alloy elements. Further, the numerical values of the atomic coordinates and the occupancy of each site shown in Table 4 may also change depending on the alloy elements.

TABLE 4

η' phase ($Cu_6Sn_5$) Monoclinic Space group number
(International Table A): No. 15 (C2/c)
Lattice constant: a = 11.022 Å b = 7.282 Å c = 9.827 Å
α = 90° β = 98.84° γ = 90° (as an example)

| Site | Element | Multiplicity, Wyckoff symbol | Atomic coordinates | | | Occupancy |
|------|---------|---|---|---|---|---|
| | | | x | y | z | |
| Cu1 | Cu | 8f | 0.39904 | 0.02703 | 0.29764 | 1.00 |
| Cu2 | Cu | 8f | 0.19380 | 0.00404 | 0.39028 | 1.00 |
| Cu3 | Cu | 4a | 0.00000 | 0.00000 | 0.00000 | 1.00 |
| Cu4 | Cu | 4e | 0.00000 | 0.83980 | 0.25000 | 1.00 |
| Sn1 | Sn | 8f | 0.39106 | 0.16250 | 0.02864 | 1.00 |
| Sn2 | Cu | 8f | 0.28518 | 0.34501 | 0.35792 | 1.00 |
| Sn3 | Cu | 4e | 0.00000 | 0.20108 | 0.25000 | 1.00 |

Structure model references: P. Villars, Pearson's Handbook Desk Edition Crystallographic Data for Intermetallic Phases Vol. 2, 1997, p. 1593-1594

[Third Phase: $SiO_x$ Phase (x=0.50 to 1.70)]

The $SiO_x$ phase (x=0.50 to 1.70) is an amorphous phase and occludes and releases metal ions. The $SiO_x$ phase (x=0.50 to 1.70) has a larger reversible electric capacity due to the storage of metal ions as compared with the $D0_3$ phase and the δ phase. Therefore, the $SiO_x$ phase (x=0.50 to 1.70) increases the capacity of the negative electrode active material.

The $SiO_x$ phase (x=0.50 to 1.70) is formed as an amorphous phase by, for example, mechanical alloying (MA) described later. Here, the amorphous phase means a phase in which the arrangement of atoms has an order at a short distance (short range order), but does not have an order at a long distance (long range order). The short range order is the order between atoms in short distances. Specifically, the short range order means that there is regularity in the values of the number of nearest atoms (the coordination number), the bond distance between atoms, and the bond angle between atoms. In other words, the amorphous phase means a phase in which the arrangement of atoms in which short range order exists (a base unit) is irregularly connected to each other.

In the amorphous phase, an electron diffraction pattern of the transmission electron microscope shows neither clear diffraction points nor diffraction rings due to a periodic arrangement structure. The electron diffraction pattern of the amorphous phase shows a wide and indistinct concentric Halo Pattern. Therefore, those skilled in the art can distinguish between an amorphous phase and a crystalline phase based on the electron diffraction pattern of the transmission electron microscope.

The "x" of the $SiO_x$ phase is 0.50 to 1.70. When x is less than 0.50, it means that a coarse Si phase will be formed in the alloy particles. The Si phase is a crystalline phase that has both short range order and long range order. When the Si phase, which is a crystalline phase, is formed, the degree of expansion and contraction of the negative electrode active material increases during charging/discharging, and the capacity retention ratio thereof decreases. On the other hand, when x is more than 1.70, it means that the $SiO_2$ phase is formed in the alloy particles. In this case, upon initial charging, $SiO_2$ and lithium react with each other to form lithium silicate (Li—SiO based compound). Lithium silicate has a small electric capacity. Therefore, the capacity and the initial coulombic efficiency of the negative electrode active material decrease. The lower limit of x is preferably 0.53, more preferably 0.55, further preferably 0.57, and further preferably 0.60. The upper limit of x is preferably 1.68, more preferably 1.65, further preferably 1.63, and further preferably 1.60. The x is calculated from the ratio of the chemical analysis values of the two elements Si and O obtained by analyzing the chemical composition of the $SiO_x$ phase (x=0.50 to 1.70) by EDS analysis described later.

[Identification Method of Each Phase of Structure of Alloy Particles]

The structure (each phase) of the alloy particles is identified by the following method. Using a transmission electron microscope (TEM), minute electron diffraction patterns are measured from the regions of each constituent phase. Further, analysis of the chemical composition by energy dispersive X-ray spectroscopy (hereinafter referred to as EDS analysis) is performed from the same region. Thereby, each phase ($D0_3$ phase, δ phase, ε phase, η' phase, and $SiO_x$ phase (x=0.50 to 1.70)) in the alloy particles is identified.

Specifically, the measurement is carried out under the following conditions. First, a sample for TEM observation is prepared. The sample is prepared using powder particles of the negative electrode active material taken out from the battery. The method for taking out the powder particles of the negative electrode active material from the battery is as follows.

In a state before charging (if used, a state after discharging), the battery is disassembled in a glovebox in an argon atmosphere, and the negative electrode is taken out from the battery. From the taken out negative electrode, a small amount of the negative electrode compound containing the negative electrode active material is torn off with a spatula or the like. The negative electrode compound is mounted to a transfer vessel that can be transferred to a cryo-FIB (Focused Ion Beam) device and to the TEM used for observation. The transfer vessel is taken out from the glovebox without exposing it to the atmosphere. The interior of the glovebox is kept under an argon atmosphere by using argon gas supplied from an ultra-high purity argon gas cylinder having a purity of 99.9999% or more. Furthermore, through a purification device using a catalyst or the like, exterior impurities such as nitrogen are prevented from being mixed. The dew point is controlled to be −60° C. or less to prevent changes in quality of the negative electrode active material due to nitrogen or moisture.

By the method described above, powder particles of the negative electrode active material are prepared. When the alloy particles contain graphite, a sample for TEM observation may be prepared with the graphite being contained. When it is difficult to take out the powder particles of the negative electrode active material from the battery, a sample for TEM observation is prepared by using the powder particles before producing the battery.

[Method for Preparing Sample for TEM Observation]

From the powder particles of the negative electrode active material, which have been prepared by the procedure described above, a thin film sample for observation with a transmission electron microscope (TEM) is prepared. One grain of the prepared powder particles (alloy particles) of the negative electrode active material is extracted. The alloy particles are irradiated with a gallium ion beam in a vacuum at a liquid nitrogen temperature by a known cryo-FIB (Focused Ion Beam) method to produce a thin film sample.

By preparing a thin film sample at a low temperature, it is possible to suppress a change in the constituent phase due to increase in the sample temperature by the FIB method. The model of the cryo-FIB device is not particularly limited, but for example, one with trade name: Quata 3D FEG, manufactured by FEI Company is used. The sampling method for preparing a thin film sample is the cryo-FIB-μ sampling method. When preparing a thin film sample, a mesh made of Mo is used, and carbon deposition (C deposition film) is used for surface protection. Powder particles (alloy particles) of the negative electrode active material, which have a suitable size for FIB processing, are appropriately selected. The type of each phase constituting the alloy particles and the mean circle-equivalent diameter of the $SiO_x$ phase (x=0.50 to 1.70) described later are not affected by the size of the powder particles of the negative electrode active material. The thickness of the thin film sample is about 100 nm or less.

[TEM Observation and EDS Analysis]

TEM observation and EDS analysis are performed on the thin film sample for TEM observation prepared by the method described above. The model of the TEM, the imaging conditions of the bright field image and the electron diffraction pattern, and the conditions of the EDS analysis are as follows. However, the model of the TEM, and the analysis software for the EDS analysis value are not particularly limited as long as results equivalent to those according to the present embodiment can be obtained.

Model of electron microscope: 200 kV-field emission transmission electron microscope JEM-2100F (manufactured by JEOL Ltd.),
Acceleration voltage during observation: 200 kV,
Camera length: 20 cm (DIFF mode),
Analysis: EDS analyzer JED-2300T (manufactured by JEOL Ltd.),
Acceleration voltage during analysis: 200 kV,
Probe diameter during EDS analysis: 1 nm,
Analysis software for EDS analysis values: JED Analysis Program ver. 3.8.0.32 (software name) supplied by JEOL Ltd.,
Electron diffraction: Nano beam diffraction (NBD),
Probe diameter: Approximately 10 nm or approximately 3 nm,
Settings for EDS semi-quantitative calculation,
Quantitative correction: Ratio,
Quantification mode: Simple quantification,
Calculation method: Single unit,
Absorption correction: None,
Characteristic X-ray peaks used in EDS semi-quantitative calculation: O—K, Si—K, (Fe—K), Cu-L, Sn-L.

Figure 4:
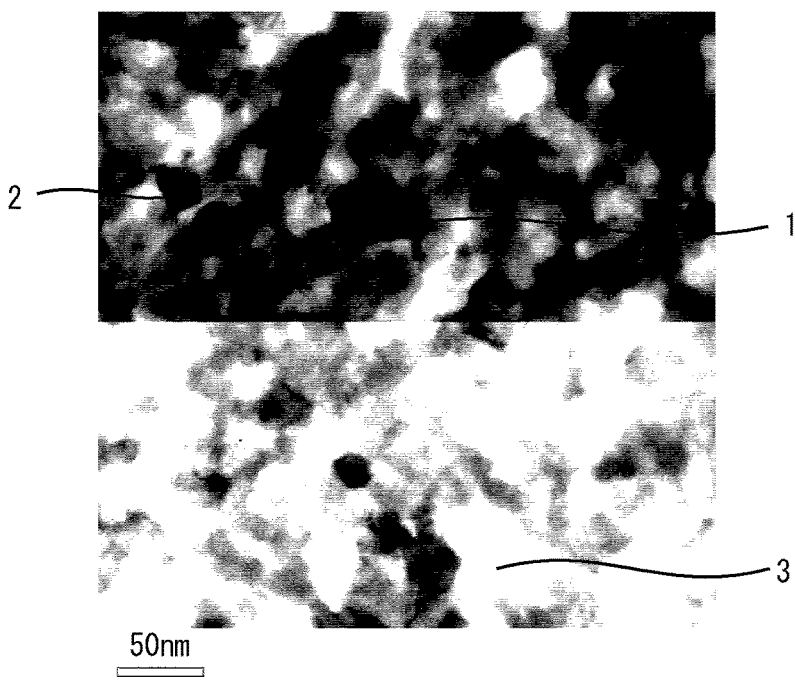
FIG. 4 is a bright field image obtained by observing the negative electrode active material of Test Number 1 in Examples with a transmission electron microscope.

Based on the obtained bright field image, the measurement of electron diffraction pattern and EDS analysis are performed. FIG. 4 is a bright field image obtained by observing alloy particles (mechanically alloyed (MA) powder particles collected from the negative electrode compound layer) of the negative electrode active material of Test Number 1 in Examples described later with a transmission electron microscope. In the EDS analysis, the detected amounts of Cu and Sn, which are heavy elements, are large in the regions of the $D0_3$ phase, δ phase, ε phase and η' phase. Therefore, these phases have a higher proportion of elements having a larger atomic scattering factor compared with regions containing oxygen, which is a light element, such as the $SiO_x$ phase (x=0.50 to 1.70). Therefore, in a bright field image, these phases are observed as a gray to black color, as the scattering contrast resulting from the chemical composition. On the other hand, the region of the $SiO_x$ phase (x=0.50 to 1.70) contains oxygen which has a small atomic scattering factor. Therefore, in the bright field image, the $SiO_x$ phase (x=0.50 to 1.70) is observed to be relatively white in the scattering contrast resulting from the chemical composition. Based on the information of this bright field image, measurements of electron diffraction patterns and EDS analyses are performed.

Figure 5:
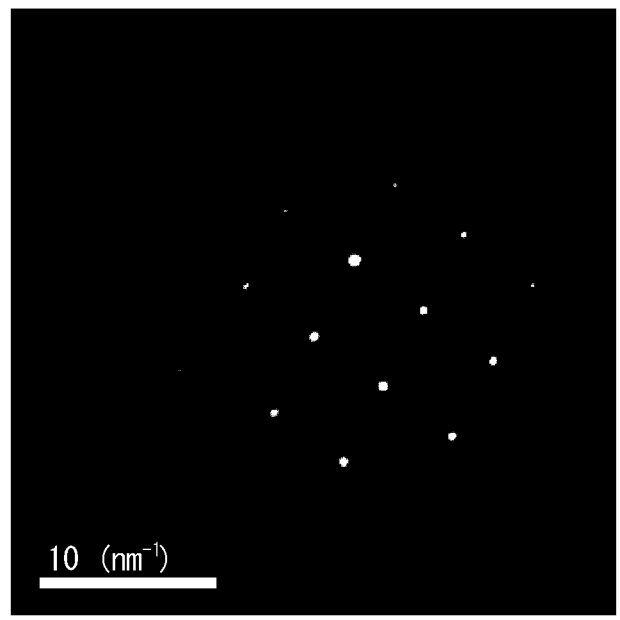
FIG. 5 shows an electron diffraction pattern of a ε phase.
Figure 6:
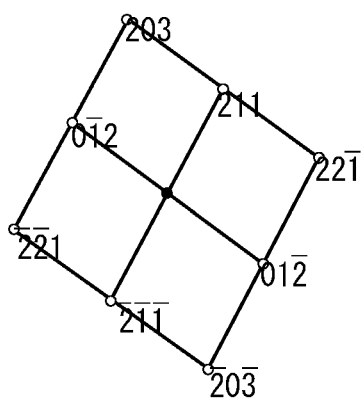
FIG. 6 is a schematic diagram of an electron diffraction pattern of a ε phase.

The electron diffraction patterns of regions of each contrast are measured by tilting the sample in the transmission electron microscope. FIG. 5 is an electron diffraction pattern obtained by measuring a black region 1 in FIG. 4. Referring to FIG. 5, an electron diffraction pattern having specific diffraction points can be obtained from the black region 1 (the incident direction of the electron beam at this time is [3-4-2] of the ε phase shown in Table 3). Further, performing EDS analysis on the region 1, it is found to have a chemical composition close to $Cu_3Sn$. From the analysis result of the electron diffraction pattern and the result of EDS analysis, the region 1 is identified as the ε phase. FIG. 6 shows a schematic diagram of an electron diffraction pattern of the ε phase obtained by indexing the electron diffraction pattern of FIG. 5.

Figure 7:
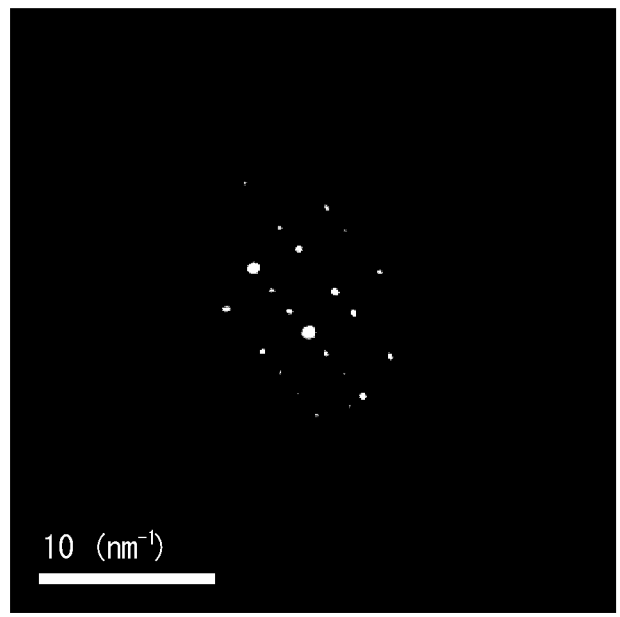
FIG. 7 shows an electron diffraction pattern of a δ phase.
Figure 8:
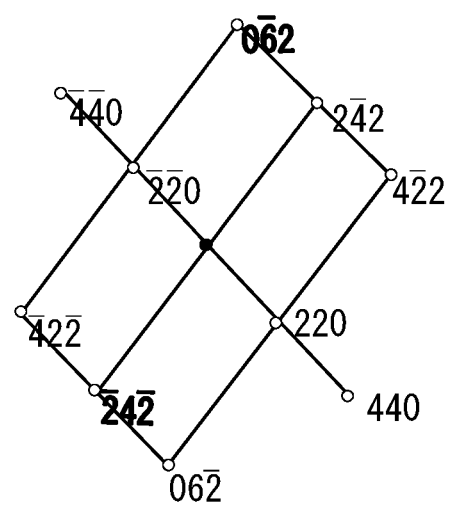
FIG. 8 is a schematic diagram of an electron diffraction pattern of a δ phase.

FIG. 7 is an electron diffraction pattern obtained by measuring a gray region 2 in FIG. 4. Referring to FIG. 7, an electron diffraction pattern having specific diffraction points can be obtained from the region 2 (at this time, the incident direction of the electron beam is [1-1-3] of the δ phase shown in Table 2). Further, performing EDS analysis on the region 2, it is found to have a chemical composition close to $Cu_{41}Sn_{11}$. From the analysis result of the electron diffraction pattern and the result of EDS analysis, the region 2 is identified as the δ phase. FIG. 8 shows a schematic diagram of an electron diffraction pattern of δ-phase obtained by indexing the electron diffraction pattern of FIG. 7.

Figure 9:
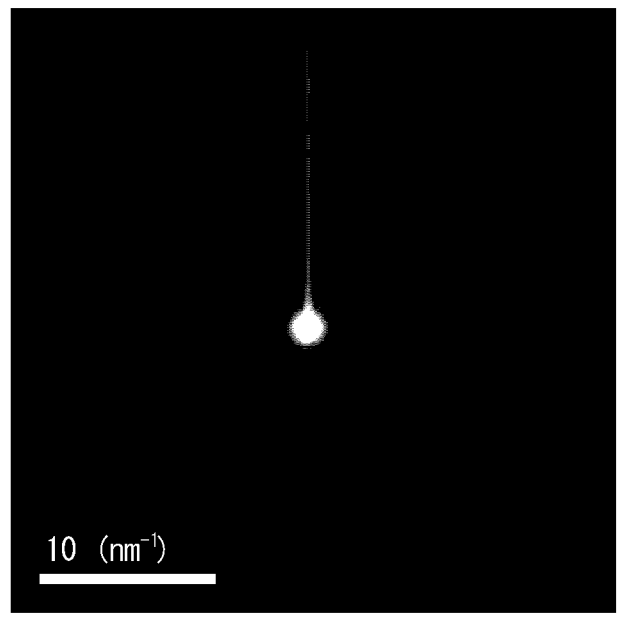
FIG. 9 shows an electron diffraction pattern of a SiO$_x$ phase (x=0.50 to 1.70)

FIG. 9 is an electron diffraction pattern obtained by measuring a relatively white region 3 in FIG. 4. Referring to FIG. 9, no specific diffraction point or clear diffraction ring is observed from the region 3, and a halo ring peculiar to amorphous is observed. Moreover, even if the sample is tilted, the diffraction conditions are not satisfied. From this, it can be determined that the reason why the region 3 appears relatively white is due to the scattering contrast, and that the region 3 is a region in which the proportion of light elements having a smaller atomic scattering factor is high. Further, EDS analysis is performed on the region 3. Converting the analysis values of the four elements Cu, Sn, Si and O into atomic ratios, if the combined atomic ratio of Si and O is 60% or more of the total, the region 3 is regarded as the $SiO_x$ phase (x=0.50 to 1.70). As the EDS analysis value, the arithmetic mean of the analysis values measured at 5 locations in a relatively white region is used. By the procedure described above, the region 3 can be identified as the $SiO_x$ phase (x=0.50 to 1.70).

Figure 10:
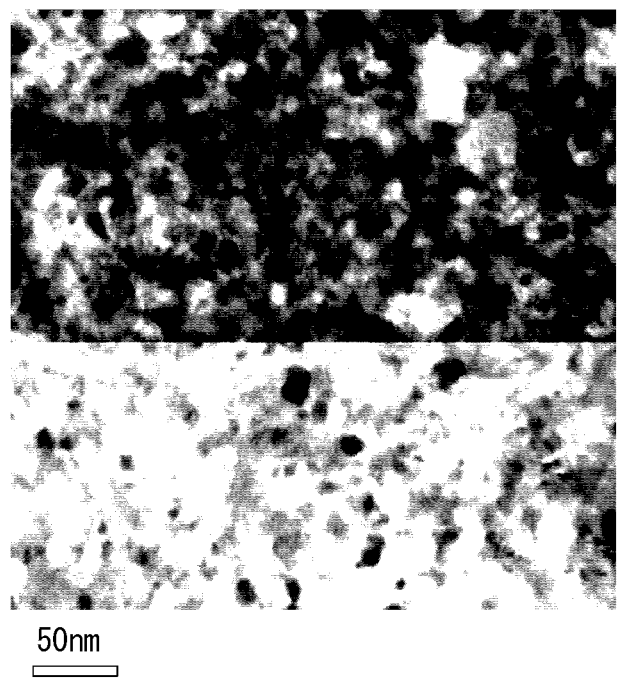
FIG. 10 is a bright field image obtained by observing the negative electrode active material of Test Number 9A in Examples with a transmission electron microscope.
Figure 11:
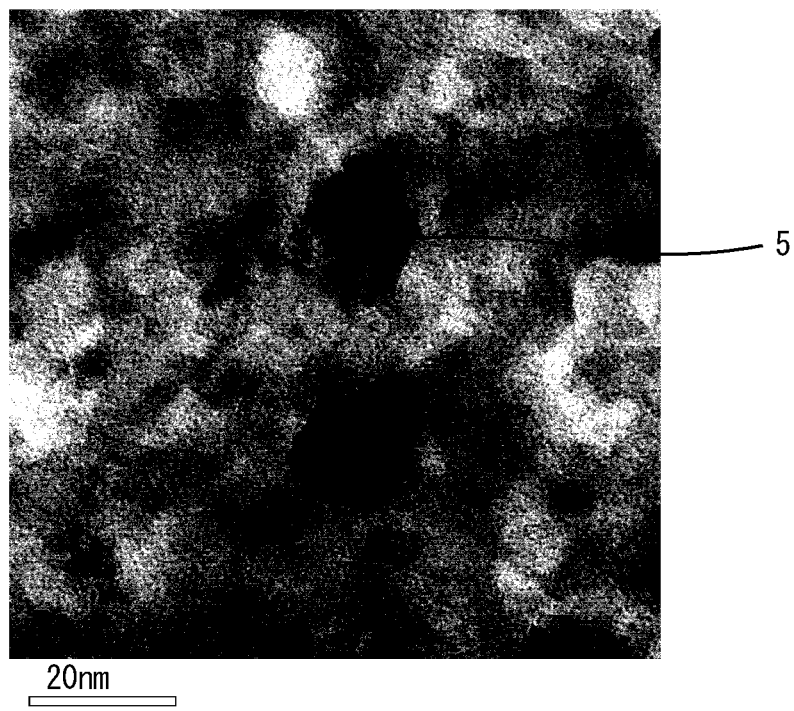
FIG. 11 shows a bright field image obtained by transmission electron microscope observation in which a part in the visual field of FIG. 10 is enlarged and observed.
Figure 12:
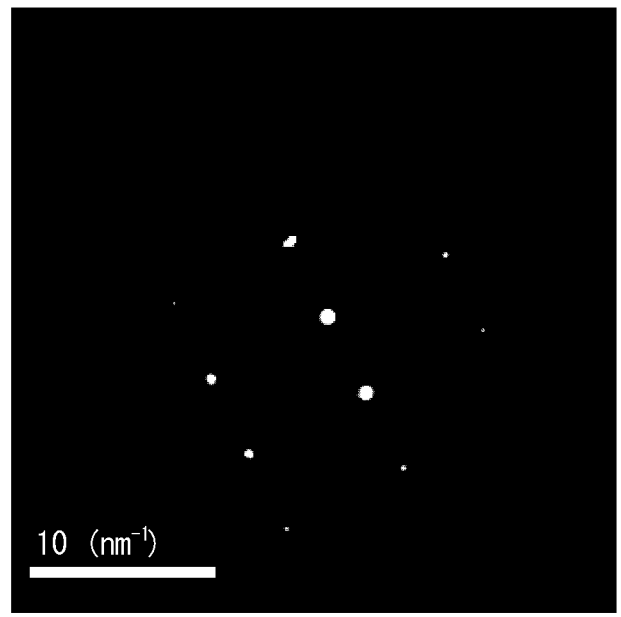
FIG. 12 shows an electron diffraction pattern of a D0$_3$ phase.
Figure 13:
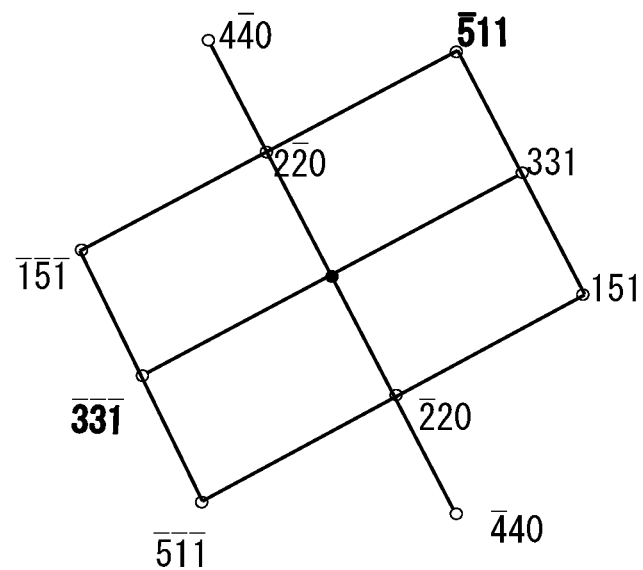
FIG. 13 is a schematic diagram of an electron diffraction pattern of a D0$_3$ phase.

FIG. 10 is a bright field image of the negative electrode active material of Test Number 9A in Examples described later observed with a transmission electron microscope. FIG. 11 is a bright field image obtained by transmission electron microscope observation in which a part of the visual field of FIG. 10 is enlarged and observed. FIG. 12 is an electron diffraction pattern obtained by measuring a black region 5 in FIG. 11. Referring to FIG. 12, an electron diffraction pattern having peculiar diffraction points can be obtained from the region 5 (at this time, the incident direction of the electron beam is [1-1-6] of the $D0_3$ structure shown in Table 1). Furthermore, performing EDS analysis on the region 1, it is found to have a chemical composition of Cu—Sn. From the analysis result of the electron diffraction pattern and the result of EDS analysis, the region 5 is identified as the $D0_3$ phase. FIG. 13 shows a schematic diagram of an electron pattern diagram of $D0_3$ phase obtained by indexing the electron diffraction pattern of FIG. 12.

Figure 14:
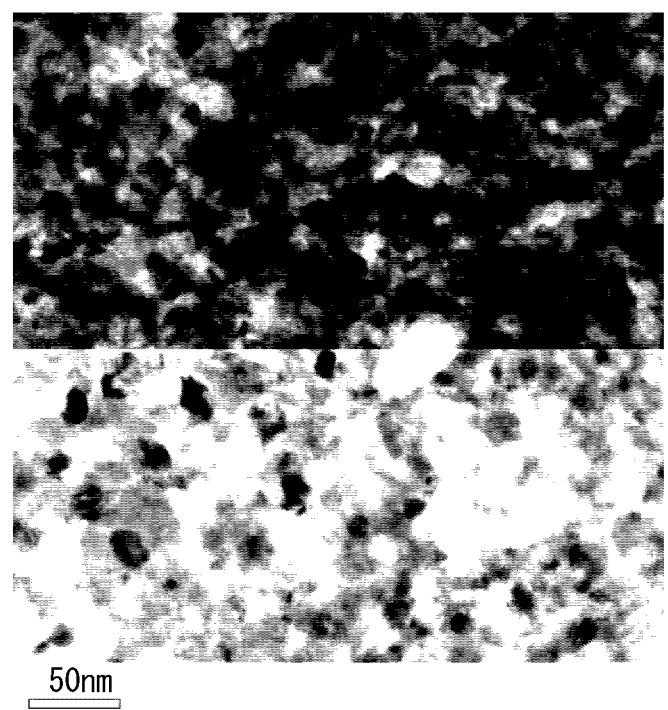
FIG. 14 shows a bright field image obtained by transmission electron microscope observation of the negative electrode active material of Test Number 9A in Examples at an observation point different from that of FIG. 10.
Figure 15:
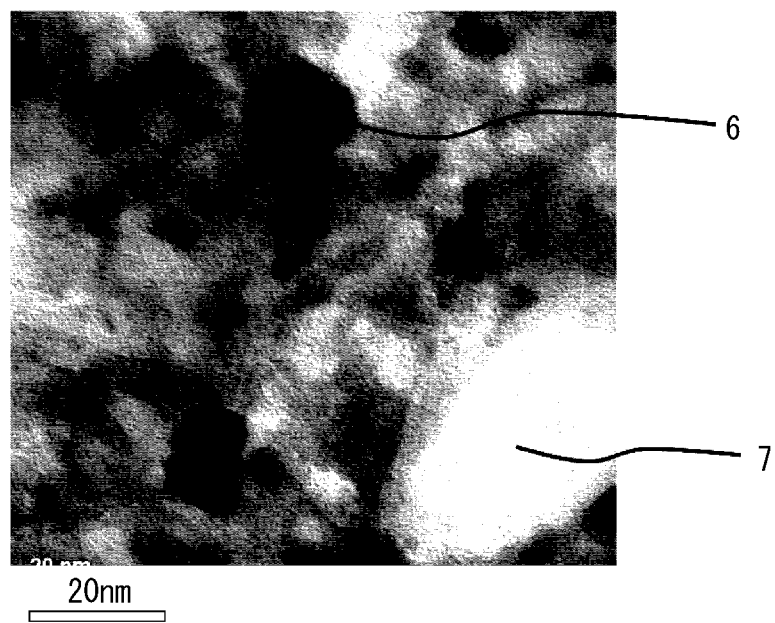
FIG. 15 shows a bright field image obtained by transmission electron microscope observation in which a part in the visual field of FIG. 14 is enlarged and observed.
Figure 16:
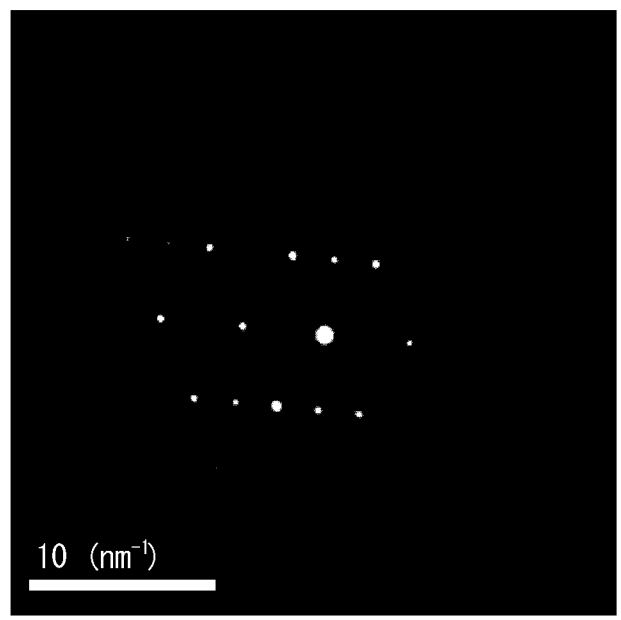
FIG. 16 shows an electron diffraction pattern of a η' phase.
Figure 17:
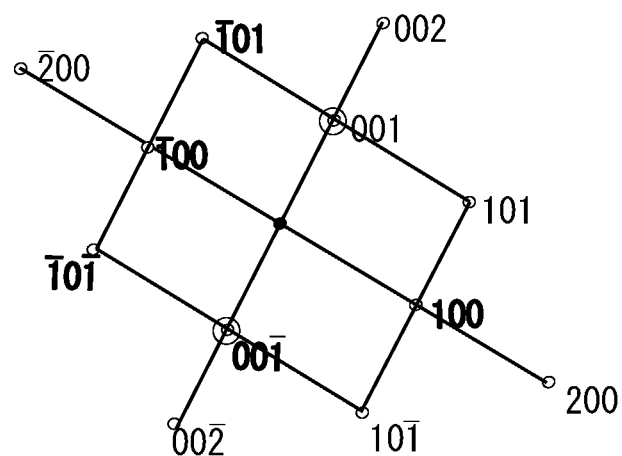
FIG. 17 is a schematic diagram of an electron diffraction pattern of a η' phase.

FIG. 14 is a bright field image of the negative electrode active material of Test Number 9A in Examples by transmission electron microscope observation at an observation point different from that of FIG. 10. Further, FIG. 15 is a bright field image by transmission electron microscope observation in which a part in the visual field of FIG. 14 is enlarged and observed. FIG. 16 is an electron diffraction pattern obtained by measuring a black region 6 in FIG. 15. Referring to FIG. 16, an electron diffraction pattern having specific diffraction points can be obtained from the region 6 (at this time, the incident direction of the electron beam is [−1-42] of the η' phase shown in Table 4). Further, performing EDS analysis on the region 6, it is found to have a chemical composition close to $Cu_6Sn_5$. From the analysis result of the electron diffraction pattern and the result of EDS analysis, the region 6 is identified as the η' phase. FIG. 17 shows a schematic diagram of an electron diffraction pattern of the η' phase obtained by indexing the electron diffraction pattern of FIG. 16.

Figure 18:
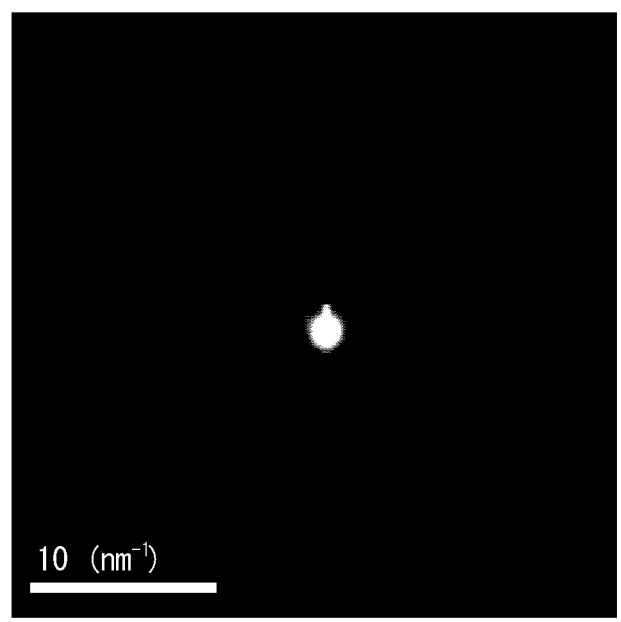
FIG. 18 is an electron diffraction pattern of a SiO$_x$ phase (x=0.50 to 1.70).

FIG. 18 is an electron diffraction pattern obtained by measuring a relatively white region 7 in FIG. 15. Referring to FIG. 18, neither specific diffraction point nor clear diffraction ring is observed from the region 7, and a halo ring peculiar to amorphous is observed. Moreover, even if the sample is tilted, the diffraction conditions are not satisfied. From this, it is determined that the reason why the region 7 appears relatively white is due to the scattering contrast, and that the region 7 is a region with a high proportion of light elements having a smaller atomic scattering factor. Further, EDS analysis is performed on the region 7. Converting the analysis values of the four elements Cu, Sn, Si and O into an atomic ratio, if the combined atomic ratio of Si and O is 60% or more of the total, the region 7 is regarded as the $SiO_x$ phase (x=0.50 to 1.70). As the EDS analysis value, the arithmetic mean of the analysis values measured at 5 locations in the relatively white region is used. By the procedure described above, the region 7 is identified as the $SiO_x$ phase (x=0.50 to 1.70).

[Si Content (at %) of $D0_3$ Phase, δ Phase, ε Phase, and η' Phase]

Since, in the alloy particles, Si is discharged from the $D0_3$ phase, δ phase, a phase, and η' phase, the Si content in these alloy phases ($D0_3$ phase, δ phase, ε phase and η' phase) is 5.0 at % or less.

The method of discharging Si from the $D0_3$ phase, the δ phase, the ε phase, and the η' phase is, for example, mechanical alloying (MA). Si may be completely discharged from the $D0_3$ phase, the δ phase, the ε phase, and the η' phase. In other words, the Si content of each of the $D0_3$ phase, the δ phase, the ε phase, and the η' phase may be 0 at %. On the other hand, when the Si content of any of the $D0_3$ phase, the δ phase, the ε phase, and the η' phase in the alloy particles is more than 5.0 at %, the capacity of the phase in which the Si content is more than 5.0 at % becomes lower than that when the Si content is 5.0 at % or less. In this case, the capacity of the negative electrode active material is reduced. Therefore, the Si content of the $D0_3$ phase is 0 to 5.0 at %. The Si content of the δ phase is 0 to 5.0 at %. The Si content of the ε phase is 0 to 5.0 at %. The Si content of the η' phase is 0 to 5.0 at %. The Si contents of the $D0_3$ phase, δ phase, ε phase, and η' phase in the alloy particles can be adjusted to 0 to 5.0 at % by a mechanical alloying (MA) process described later.

[Method for Measuring Si Content of $D0_3$ Phase, δ Phase, ε Phase, and η' Phase]

The Si content in the $D0_3$ phase, the Si content in the δ phase, the Si content in the ε phase, and the Si content in the η' phase can be determined by performing EDS analysis under the above-described conditions. Specifically, they are calculated by converting the EDS analysis values of the four elements Cu, Sn, Si and O into atomic ratios from the EDS analysis values of each phase obtained under the above-described conditions. The EDS analysis is performed at 5 locations for each phase, and the arithmetic mean thereof is used.

[Volume Fraction of $SiO_x$ Phase (x=0.50 to 1.70) in Alloy Particles]

Further, in the alloy particles of the present embodiment, the volume fraction of the $SiO_x$ phase (x=0.50 to 1.70) in the alloy particles is 5.0 to 60.0%.

The $SiO_x$ phase (x=0.50 to 1.70) has a larger reversible electric capacity due to storage of metal ions than that of the ε phase and the η' phase, as compared with the $D0_3$ phase and the δ phase. If the volume fraction of the $SiO_x$ phase (x=0.50 to 1.70) is less than 5.0%, this effect cannot be sufficiently obtained. On the other hand, if the volume fraction of the $SiO_x$ phase (x=0.50 to 1.70) is more than 60.0%, the stable-period coulombic efficiency deteriorates. The reason for this is as follows. If the volume fraction of the $SiO_x$ phase (x=0.50 to 1.70) is more than 60.0%, the $SiO_x$ phase (x=0.50 to 1.70) exposed on the surface of the negative electrode active material increases. If the $SiO_x$ phase (x=0.50 to 1.70) exposed on the surface of the negative electrode active material increases, the exposed $SiO_x$ phase (x=0.50 to 1.70) reacts with the electrolytic solution. The reaction between the exposed $SiO_x$ phase (x=0.50 to 1.70) and the electrolytic solution will cause decomposition of the electrolytic solution. Consequently, the stable-period coulombic efficiency deteriorates. Therefore, the volume fraction of the $SiO_x$ phase (x=0.50 to 1.70) is 5.0 to 60.0%. The lower limit of the volume fraction of the $SiO_x$ phase (x=0.50 to 1.70) is preferably 7.0%, more preferably 8.0%, further preferably 10.0%, further preferably 12.0%, and further preferably 15.0%. The upper limit of the volume fraction of the $SiO_x$ phase (x=0.50 to 1.70) is preferably 55.0%, and more preferably 50.0%.

The volume fraction of the $SiO_x$ phase (x=0.50 to 1.70) in the alloy particles can be adjusted by precisely controlling the oxygen source to be added and the method of controlling the oxygen atmosphere in the production process of the alloy particles.

[Volume Fraction of η' Phase in Alloy Particles]

Further, in the alloy particles of the present embodiment, the volume fraction of the η' phase in the alloy particles is 0 to 60.0%. When compared with other phases ($D0_3$ phase, δ phase, ε phase, $SiO_x$ phase (x=0.50 to 1.70)), the η' phase has a largest reversible electric capacity due to the storage of metal ions next to that of the $SiO_x$ phase (x=0.50 to 1.70). Therefore, when the alloy particles contain the η' phase, that is, when the volume fraction of the η' phase in the alloy particles is more than 0%, there is an effect of increasing the capacity of the negative electrode active material.

On the other hand, if the volume fraction of the η' phase is more than 60.0%, the stable-period coulombic efficiency deteriorates. The reason for this is as follows. If the volume fraction of the η' phase is more than 60.0%, the η' phase exposed on the surface of the negative electrode active material increases. If the η' phase exposed on the surface of the negative electrode active material increases, the electrolytic solution will be decomposed by the reaction between the η' phase and the electrolytic solution. Consequently, the stable-period coulombic efficiency deteriorates. Therefore, in the alloy particles of the present embodiment, the volume fraction of the η' phase is preferably 0 to 60.0%, and more preferably more than 0 to 60.0%. The lower limit of the volume fraction of the η' phase is preferably 1.0%, more preferably 2.0%, and further preferably 5.0%. The upper limit of the volume fraction of the η' phase is preferably 55.0%, and more preferably 50.0%.

The volume fraction of the η' phase in the alloy particles can be adjusted, for example, by controlling the mechanical alloying (MA) time, and thereby controlling the proportion at which the η' phase is produced.

[Method for Measuring Volume Fraction of $SiO_x$ Phase (x=0.50 to 1.70) in Alloy Particles]

The method for measuring the volume fraction of the $SiO_x$ phase (x=0.50 to 1.70) in the alloy particles is as follows.

[TEM Observation]

Measurement of the volume fraction of the $SiO_x$ phase (x=0.50 to 1.70) in the alloy particles is performed by TEM observation. A thin film is prepared from powder particles of negative electrode active material by a known cryo-FIB method. Note that when the alloy particles contain graphite, a thin film may be prepared in the same manner as when the alloy particles do not contain graphite. As the FIB grid that supports the thin film, one made of Mo is used. The prepared thin film is subjected to Ar ion polishing by using an Ar ion polishing apparatus. The conditions for Ar ion polishing are as follows: the temperature is a room temperature (15 to 30° C.), and an acceleration voltage is 900 V. The thin film after Ar ion polishing is conveyed to the TEM and inserted thereto while being held in vacuum with an air protection holder.

In the TEM used for this observation, the probe diameter of the electron beam is 1 nm or less. Further, the probe current is set to 0.2 nA or more. A silicon drift detector is used as the detector of EDS. The solid angle to be detected by EDS is 0.7 sr or more. Any TEM model can be used as long as the same result can be obtained. The TEM used for this observation may be, for example, a TEM equipped with a Schottky type electron gun or a field emission type electron gun, or a TEM equipped with an aberration corrector for the irradiation system.

The acceleration voltage of the TEM is set to 100 kV, and observation is performed with a high-angle annular darkfield scanning transmission electron microscope (HAADF-STEM). The brightness of the HAADF-STEM image is due to scattering contrast, and a location where a larger number of elements with a larger atomic number are present is observed to be brighter.

Using a known EELS log-ratio method, t/λ is mapped as a parameter representing the sample thickness. Mapping analysis of the Scanning Transmission Electron Microscope Energy Dispersive X-ray Spectroscopy (STEM-EDS) is performed on a region in which a mean value of t/λ is 0.4 or less under a condition that the collection angle is 10 mrad or more. Where, t is the sample thickness (nm), and λ (nm) is the inelastic scattering mean free path. Locations where no sample is available, such as holes made by Ar ion polishing, and edges of thin films are not to be included in the mapping region.

In the STEM-EDS mapping analysis, a HAADF-STEM image is picked up at a magnification of 225,000 times. The whole of the picked-up HAADF-STEM image is subjected to a 12-hour mapping analysis with 1024 pixels in each of the vertical and horizontal directions. The energy range of EDS is 20 keV, the Dwell time is 10 s, and the drift correction is executed at an interval of 10 sec. The measured STEM-EDS mapping data of 1024 pixel in the vertical and horizontal directions is subjected to 4×4 binning to obtain data for STEM-EDS mapping of 256 pixels in the vertical and horizontal directions. The data of STEM-EDS mapping of 256 pixels in the vertical and horizontal directions is quantified by three elements of Cu, Sn, and Si. However, when tungsten (W) is vapor-deposited during the preparation of a thin film by the cryo-FIB method, the peak of the M line of W overlaps the peak of the K line of Si in the spectrum of EDS. Therefore, after quantification with the four elements Cu, Sn, Si, and W, conversion is performed so that a total of atomic concentrations of the three elements Cu, Sn, and Si is 100%. Quantification is performed using known analysis software. The analysis software is, for example, the Cliff-Lorimer method of EDS analysis software (product name: ESPRIT) manufactured by Bruker. By using a thin film approximation model in the background removal of the EDS spectrum, the fitting range for creating a background curve is specified in an energy range of 1 keV to 20 keV, and in an energy range to avoid characteristic X-ray peaks generated from Cu, Sn, Si, materials of FIB grid, and materials of vapor deposition film. The peak of the characteristic X-ray of each element is fitted by a Gaussian function, and the integrated intensity thereof is evaluated. A value included in the EDS analysis software may be used as the k factor of the Cliff-Lorimer method, which is used to convert the integrated intensity of the characteristic X-ray peak of each element into the atomic concentration. In the STEM-EDS mapping analysis, mapping images of Cu atomic concentration, Sn atomic concentration, and Si atomic concentration are obtained in the same field of view with that of the HAADF-STEM image.

In order to obtain the volume fraction of the $SiO_x$ phase (x=0.50 to 1.70) in the alloy particles, the CuSn alloy phase ($D0_3$ phase, δ phase, ε phase, and η' phase) and $SiO_x$ phase (x=0.50 to 1.70) are discriminated by using the Si concentration of the Si atomic concentration mapping image described above. The number of pixels of each discriminated phase is quantified as the area of each phase.

Figure 19:
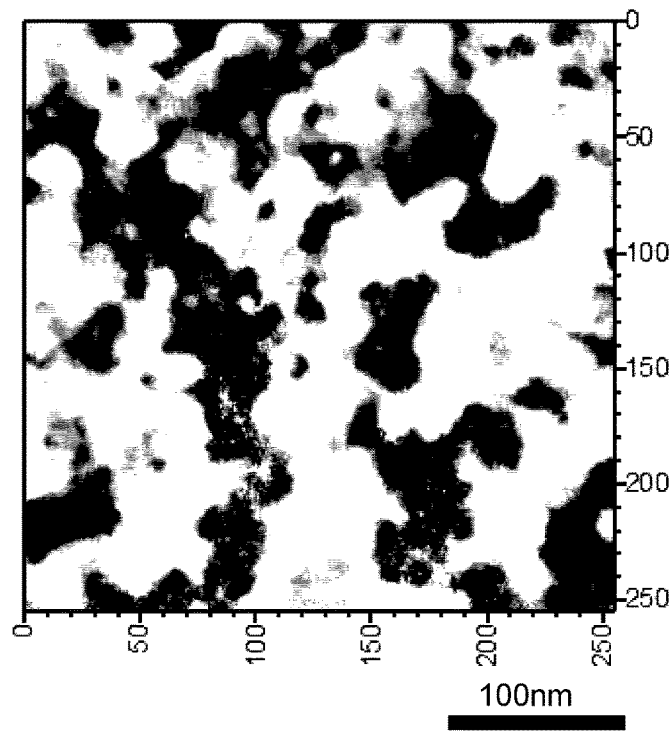
FIG. 19 is a Si atomic concentration mapping image of STEM-EDS measurement, which is measured in the same field of view in HAADF-STEM observation of the negative electrode active material of Test Number 9A in Examples.
Figure 20:
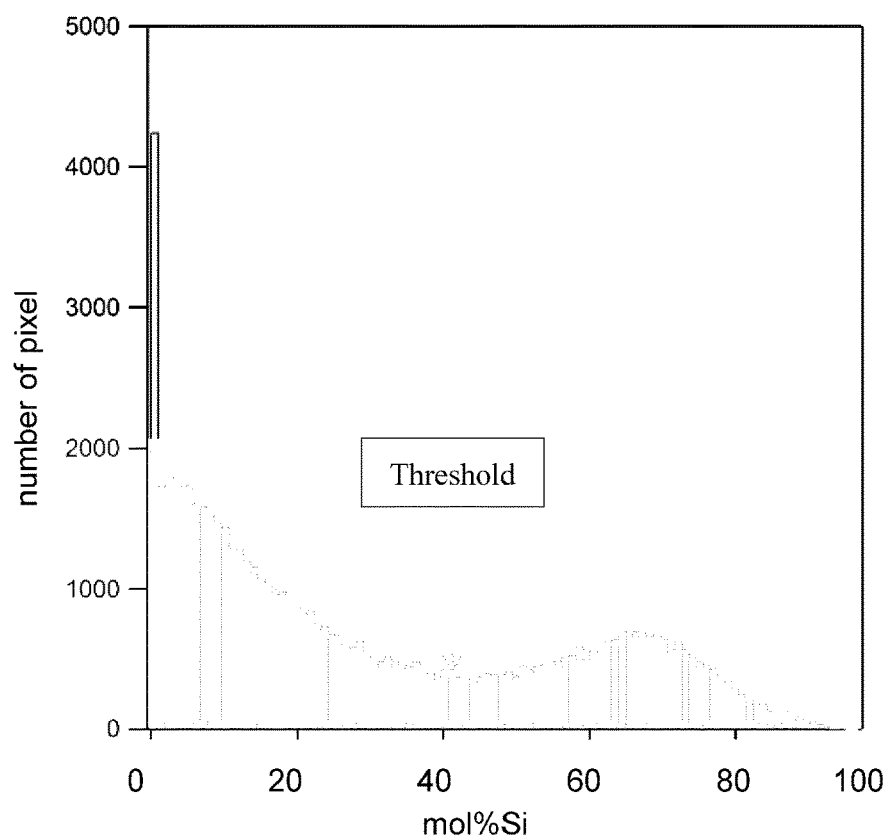
FIG. 20 is a histogram to show the Si atomic concentration of each pixel of the Si atomic concentration mapping image of FIG. 19.

Specifically, the negative electrode active material of Test Number 9A in Examples will be described as an example. FIG. 19 is a Si atomic concentration mapping image of STEM-EDS measurement, which is measured in the same field of view as in the HAADF-STEM observation of the particles of the negative electrode active material of Test Number 9A in Examples. Based on the atomic concentration mapping of 256 pixels in the vertical and horizontal directions as shown in FIG. 19, the Si atomic concentration for all the pixels is represented by a histogram at an increment of 1% in a range of 0 to 100%. FIG. 20 is a histogram of the Si atomic concentration of each pixel in the Si atomic concentration mapping image of FIG. 19. As shown in FIG. 20, the histogram usually shows a bimodal distribution in which two peaks appear.

Figure 21:
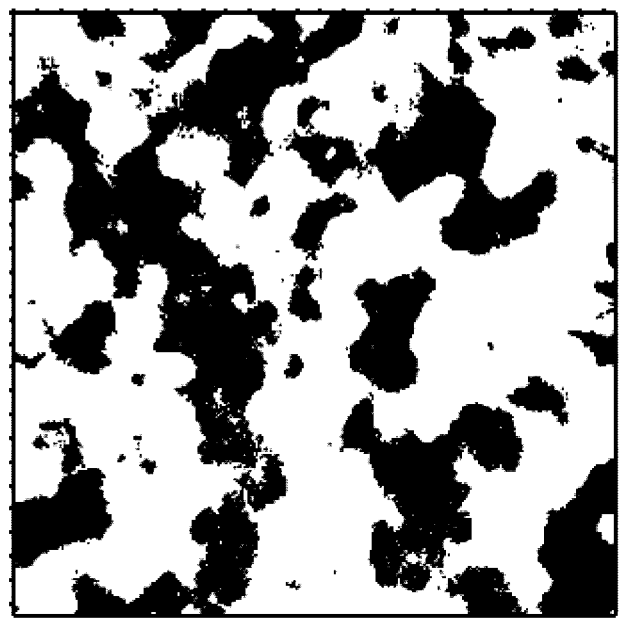
FIG. 21 shows a binarized image of FIG. 19.

When the Si atomic concentration has a bimodal distribution, an image is created in which the lower concentration side is binarized to white and the higher concentration side to black (binarization process), with the Si atomic concentration at the bottom of the valley between the two peaks (the position where the value is the lowest in the valley portion of the two peaks) as a threshold. FIG. 21 is a binarized image of FIG. 19. In FIG. 21, the value (41 mol % of Si) of the valley in the histogram of FIG. 20 is used as the threshold. In the binarized image of FIG. 21, the black region is discriminated as the $SiO_x$ phase (x=0.50 to 1.70), and the white region as other phases. The proportion of the number of black pixels to the total number of pixels is assumed to be the volume fraction (%) of the $SiO_x$ phase (x=0.50 to 1.70). Similar observation and measurement are performed in three visual fields, and an arithmetic mean value of the three volume fractions obtained is defined as the volume fraction of the $SiO_x$ phase (x=0.50 to 1.70) according to the present embodiment.

In some cases, the histogram of the Si atomic concentration mapping image does not have a bimodal distribution as shown in FIG. 20. In this case, the volume fraction of the $SiO_x$ phase (x=0.50 to 1.70) is obtained by the following method. Hereinafter, the negative electrode active material of Test Number 1 in Examples will be described as an example.

Figure 22:
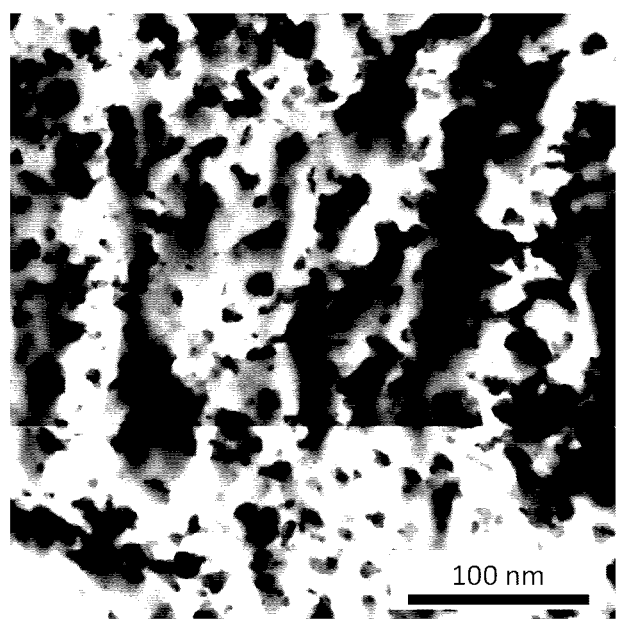
FIG. 22 is a Si atomic concentration mapping image of STEM-EDS measurement, which is measured in the same field of view in HAADF-STEM observation of particles of the negative electrode active material of Test Number 1 in Examples.
Figure 23:
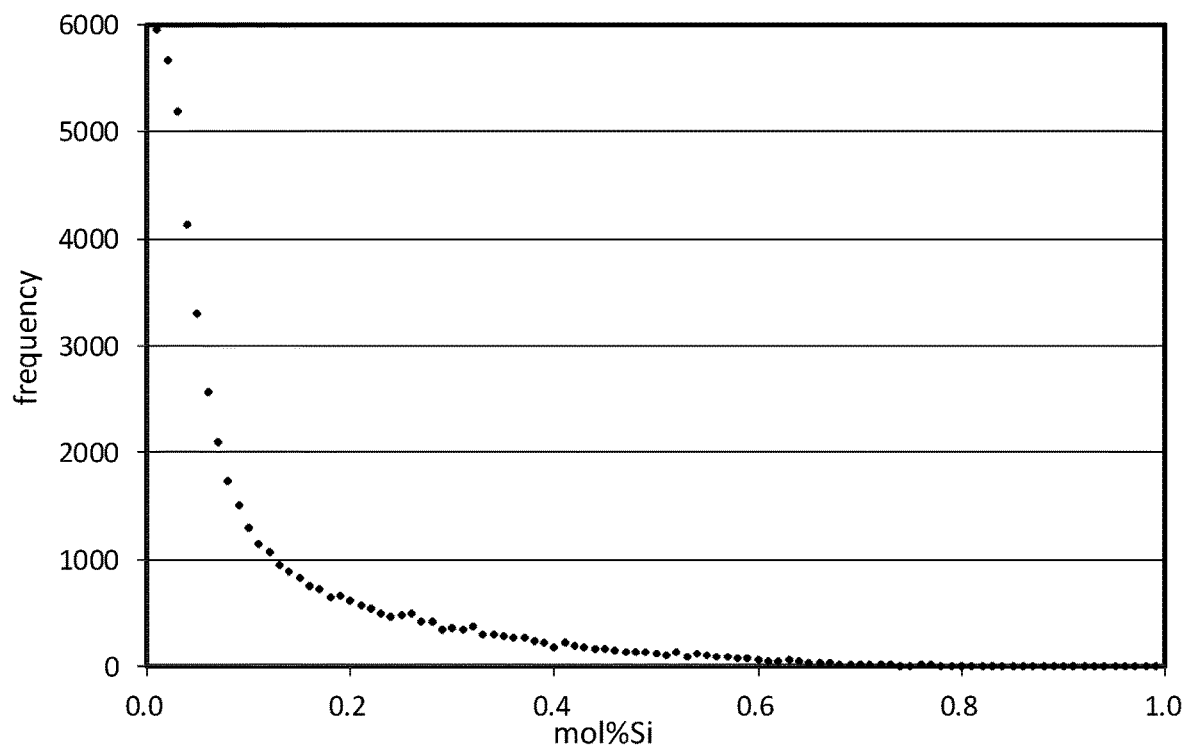
FIG. 23 is a histogram to show the Si atomic concentration of each pixel of the Si atomic concentration mapping image of FIG. 22.

FIG. 22 is a Si atomic concentration mapping image of STEM-EDS measurement, which is measured in the same field of view in HAADF-STEM observation of the particles of the negative electrode active material of Test Number 1 in Examples. By the above method, the Si atomic concentration of all the pixels of the Si atomic concentration mapping image of FIG. 22 is represented by a histogram at an increment of 1% in a range of 0 to 100%. FIG. 23 is a histogram of the Si atomic concentration of each pixel in the Si atomic concentration mapping image of FIG. 22. Referring to FIG. 23, the histogram of the Si atomic concentration of Test Number 1 is not bimodal distribution. Therefore, in this case, the threshold value cannot be set by the above method (a minimum value of Si atomic concentration).

In this case, the threshold of the Si concentration is set by the following method. The histogram curve of FIG. 23 is fitted by 20th-order polynomial approximation. Further, the curve after fitting is subjected to the second-order differentiation by numerical analysis to derive a curve of second derivative. The minimum Si concentration among the Si concentrations whose values are less than 1000, and in which the second derivative value of the curve of derived second derivative is close to zero and can be regarded as sufficiently small, is set as the threshold.

For the analysis for fitting the histogram curve by the 20th-order polynomial approximation, for example, general-purpose software with trade name: Igor (manufactured by Hulinks Inc., Ver. 6.36) may be used. The 20 coefficients obtained when performing fitting with a 20th-order polynomial approximation are set to have 16 significant digits to sufficiently ensure the accuracy of the fitting. Further, if the histogram data on the lower concentration side, which is less than 5 mol % of Si, is incorporated into the fitting curve, the accuracy of fitting of the entire histogram is deteriorated. Accordingly, frequency data of 5 mol % of Si or more is targeted for fitting. Table 5 shows the coefficients (K0 to K19) of the 20th-order polynomial obtained by using the histogram of FIG. 23.

TABLE 5

| | Coefficients of 20th-order polynomial approximation formula |
|---|---|
| K0 | 13,175 |
| K1 | −381,342 |
| K2 | 5,434,983 |
| K3 | −45,431,397 |
| K4 | 239,178,219 |
| K5 | −810,947,346 |
| K6 | 1,730,869,228 |
| K7 | −2,073,408,452 |
| K8 | 704,439,082 |
| K9 | 1,244,486,125 |
| K10 | −918,922,994 |
| K11 | −1,009,629,063 |
| K12 | 708,767,568 |
| K13 | 1,062,669,282 |
| K14 | −402,641,571 |
| K15 | −1,147,223,322 |
| K16 | 234,523,376 |
| K17 | 1,275,351,291 |
| K18 | −1,049,603,019 |
| K19 | 252,456,201 |

Figure 24:
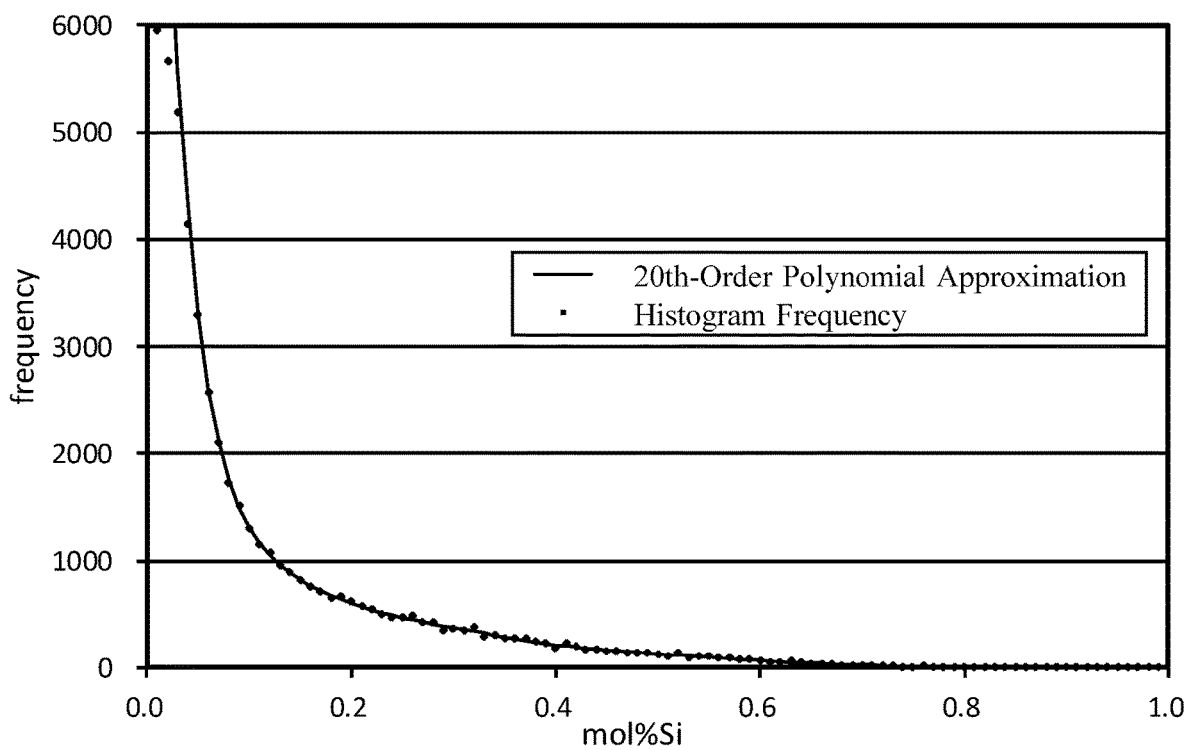
FIG. 24 is a histogram represented by an approximate curve of 20th-order polynomial shown in Table 5.

Using the obtained 20th-order polynomial (based on Table 5) as an approximate formula, numerical values are obtained for 100 classes of Si concentration from 0 to 100 mol % at an increment of 1%, and a histogram based on the approximate curve shown in FIG. 24 is created.

Figure 25:
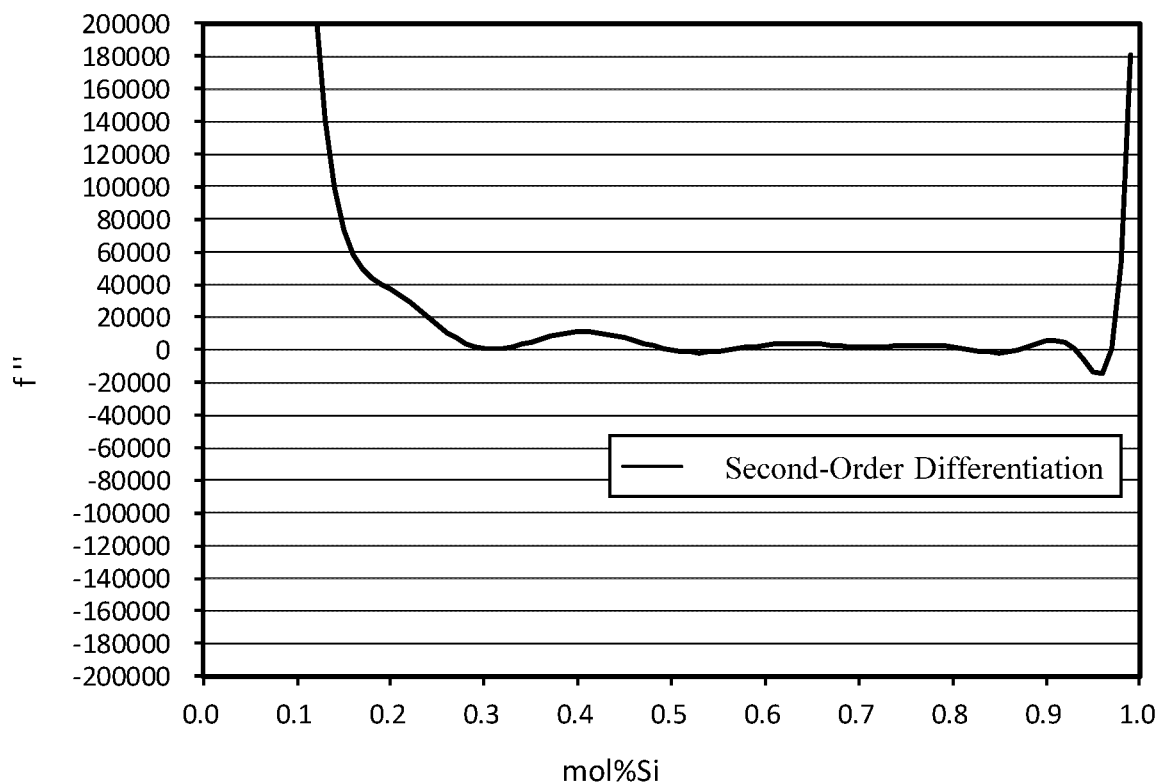
FIG. 25 is a diagram to show a curve of second derivative values of the curve which has approximated the Si concentration of FIG. 24 by 20th-order polynomial.

Based on the histogram according to the approximate curve shown in FIG. 24, the first-order differentiation and the second-order differentiation are performed by ordinary arithmetic calculations to obtain second derivative values with respect to the approximate curve (20th-order polynomial) of Si concentration. Ordinary arithmetic calculations can be easily performed with general-purpose spreadsheet software. Based on the approximate curve (20th-order polynomial) and the second derivative values of Si concentration, a graph (curve) of the second derivative values with respect to the approximate curve (20th-order polynomial) of Si concentration as shown in FIG. 25 is created. As described above, in the obtained graph (curve), the minimum Si concentration among the Si concentrations whose values are less than 1000, and in which the second derivative value is close to zero and can be regarded as sufficiently small, is set as the threshold.

Figure 26:
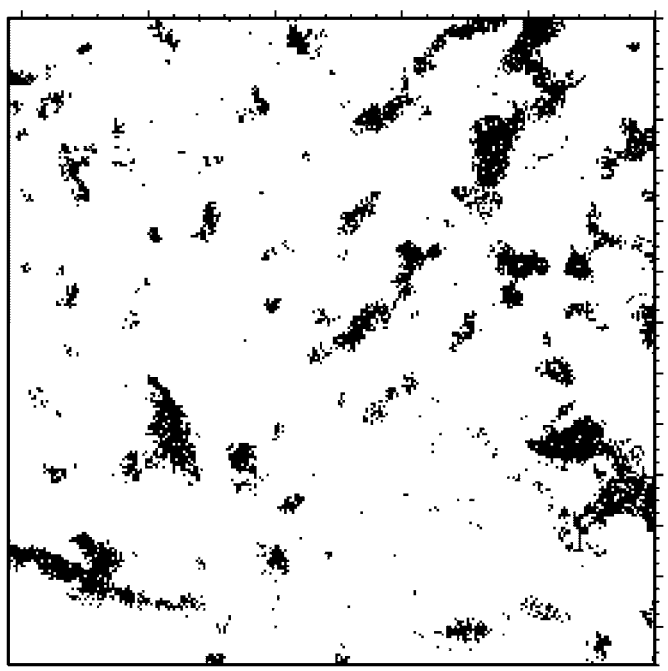
FIG. 26 shows an image obtained by binarizing FIG. 22 by using a threshold obtained from the curve of FIG. 25.

An image in which the higher concentration side of the obtained threshold is binarized to black and the lower concentration side to white is created (binarization process). FIG. 26 is a binarized image of FIG. 22 using the threshold obtained from the curve of FIG. 25. In the binarized image shown in FIG. 26, the black region is discriminated as the $SiO_x$ phase (x=0.50 to 1.70), and the white region is discriminated as other phases. The proportion of the number of black pixels to the total number of pixels is taken as the volume fraction of the $SiO_x$ phase (x=0.50 to 1.70). Similar observation and measurement are performed in three visual fields, and a mean value is taken as the volume fraction of the $SiO_x$ phase (x=0.50 to 1.70) according to the present embodiment.

The method for analyzing the Cu atomic concentration, Sn atomic concentration, and Si atomic concentration of each pixel in a STEM-EDS mapping image is not particularly limited as long as a result equivalent to the analysis according to the present embodiment can be obtained. The analysis for measuring the Cu atomic concentration, Sn atomic concentration, and Si atomic concentration of each pixel in the STEM-EDS mapping image can be analyzed, for example, by outputting numerical text data for each image from EDS analysis software (trade name: ESPRIT) manufactured by Bruker, which is attached to the TEM, and using general-purpose software. Further, a text file of the two-dimensional atomic concentration mapping may be read into general-purpose software with trade name: Igor (manufactured by Hulinks Co., Ltd., Ver. 6.36) and the above analysis may be performed. Similar analysis can be performed by using the above-described EDS analysis software attached to TEM, and software with trade name: Digital Micrograph manufactured by GATAN Inc. in combination with other general-purpose software such as one with the tradename: Excel supplied by Microsoft.

[Method for Measuring Volume Fraction of η' Phase]

The method for measuring the volume fraction of the η' phase in the alloy particles is as follows.

Figure 27:
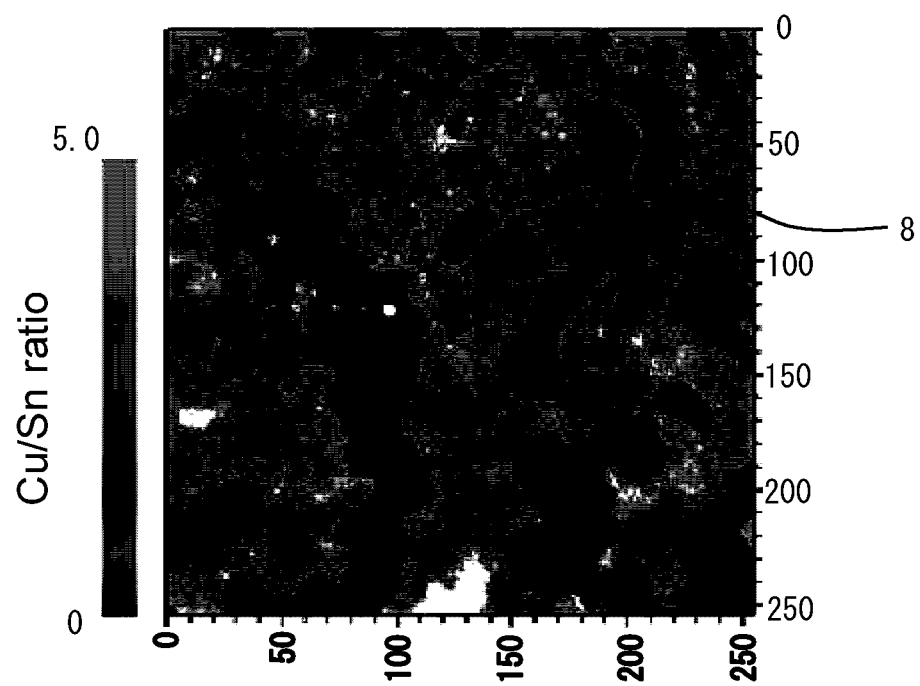
FIG. 27 is a mapping image of a Cu/Sn atomic concentration ratio obtained from the ratio of Cu atomic concentration with respect to Sn atomic concentration of STEM-EDS measurement, which has been measured in the same field of view in the HAADF-STEM observation of the negative electrode active material of Test Number 9A in Examples.
Figure 28:
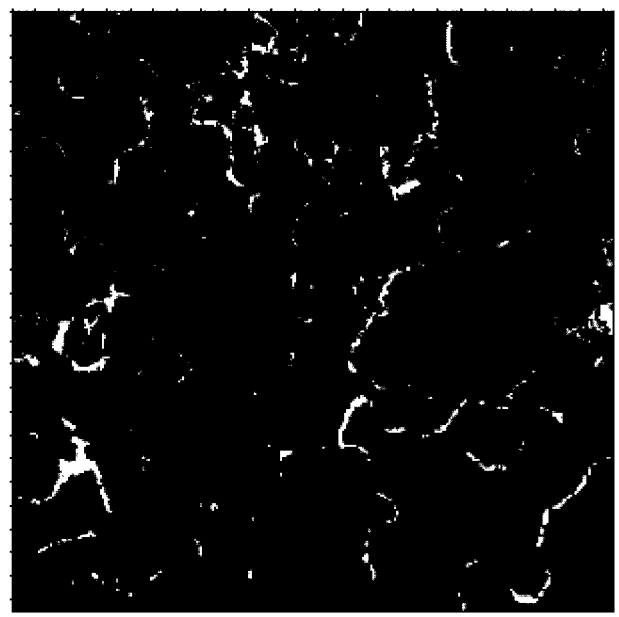
FIG. 28 is a binarized image of FIG. 22, with 1.2 as the threshold of the Cu/Sn atomic concentration ratio.

The negative electrode active material of Test Number 9A in Examples will be described as an example. To measure the volume fraction of the η' phase in the alloy particles, the Cu atomic concentration and Sn atomic concentration of the atomic concentration mapping in the same fields of view as those in which the volume fraction of the $SiO_x$ phase (x=0.50 to 1.70) was measured are used. A Cu/Sn atomic concentration ratio in each pixel is calculated to create a Cu/Sn atomic concentration ratio map. From the created Cu/Sn atomic concentration ratio map, all the pixels of the previously discriminated $SiO_x$ phase (x=0.50 to 1.70) are excluded. Specifically, as preparations, all the pixels of the $SiO_x$ phase (x=0.50 to 1.70) specified above are displayed in black in the previously obtained Cu/Sn atomic concentration ratio map to discriminate them from pixels showing a phase other than the $SiO_x$ phase (x=0.50 to 1.70). FIG. 27 is a mapping image of the Cu/Sn atomic concentration ratio after the above-described preparations, which was obtained from the ratio of the Cu atomic concentration to the Sn atomic concentration of the STEM-EDS measurement measured in the same field of view in the HAADF-STEM observation of the negative electrode active material of Test Number 9A in Examples. In FIG. 27, a region 8 (black region) is the $SiO_x$ phase (x=0.50 to 1.70). In the Cu/Sn atomic concentration ratio map after the above preprocessing, pixels having a Cu/Sn atomic concentration ratio of 1.2 or less are discriminated as the η' phase. The proportion of the total number of pixels of the discriminated η' phase to all the pixels is quantified as the volume fraction of the η' phase. The Cu/Sn atomic concentration ratio of 1.2 corresponds to the stoichiometric ratio of the η' phase ($Cu_6Sn_5$ compound). Specifically, as Test Number 9A is shown as an example in FIG. 27, a binarized image in which pixels having a Cu/Sn atomic concentration ratio of 1.2 or less are derived as a white region is created based on a mapping image of 256 pixels in the vertical and horizontal directions of Cu/Sn atomic concentration ratios excluding the $SiO_x$ phase (x=0.50 to 1.70). FIG. 28 is a binarized image of FIG. 27, in which the threshold is 1.2 in the value of the Cu/Sn atomic concentration ratio. In the created binarized image, the ratio of the total number of white pixels to all pixels (256×256) is defined as the volume fraction (%) of the η' phase in the observation visual field. Similar observation and measurement are performed in three visual fields, and an arithmetic mean value of the obtained volume fractions of the η' phase is defined as the volume fraction (%) of the η' phase.

[X-Ray Diffraction Profile of Alloy Particles]

The peak having a maximum diffraction integrated intensity in the X-ray diffraction profile of alloy particles is located in a range of 42.0 to 44.0 degrees of diffraction angle 2θ, and the half-value width of the peak is 0.15 to 2.50 degrees.

The alloy particles have the strongest diffraction line peak (the diffraction line peak having the maximum diffraction integrated intensity) in a range of 42.0 to 44.0 degrees of diffraction angle 2θ in the X-ray diffraction profile. Peaks in this range are mainly originated from the $D0_3$ phase and the δ phase, and also diffraction from the ε phase and the η' phase also contribute to these peaks. Therefore, if the alloy particles have a peak having the maximum diffraction integrated intensity (a strongest diffraction line peak) in this range, it means that the alloy particles contain these phases.

[Method for Measuring the Strongest Diffraction Line Peak]

The strongest diffraction line peak is measured by the following method. First, a sample for X-ray diffraction measurement is prepared. The sample is prepared by taking out a negative electrode having a negative electrode active material from inside a battery. X-ray diffraction measurement is performed on the sample to obtain an X-ray diffraction profile. The position of the strongest diffraction line peak is determined from the X-ray diffraction profile.

Even when the alloy particles contain graphite, a sample for X-ray diffraction measurement may be prepared in the same manner as when the alloy particles do not contain graphite. In this case, the strongest diffraction line peak of the alloy particles is determined by excluding the peak of graphite (the peak around 2θ=26.0 to 27.0).

The procedure for taking out the negative electrode having the negative electrode active material from inside the battery and performing the X-ray diffraction measurement is as follows. In a state before charging (if being used, a state after discharging), the battery is disassembled in a glove box in an argon atmosphere, and the negative electrode is taken out from the battery. The negative electrode taken out is wrapped with Mylar foil. Then, the circumference of the Mylar foil is sealed with a thermocompression machine. The negative electrode sealed with Mylar foil is taken out of the glove box. Inside the glove box, an argon atmosphere is formed by using argon gas supplied from an ultra-high purity argon gas cylinder having a purity of 99.9999% or more. Furthermore, through a purification device using a catalyst or the like, mixing of exterior impurities such as nitrogen is prevented. Thereby, the dew point is controlled to be −60° C. or less to prevent changes in quality of the negative electrode active material due to nitrogen or moisture. Next, the negative electrode is attached to a non-reflective sample plate with a hairspray to prepare a sample. The non-reflective sample plate is a plate obtained by cutting out a silicon single crystal so that a specific crystal plane is parallel to the measurement plane. The non-reflective sample plate does not generate interference lines such as diffraction lines and halos. The sample is set in an X-ray diffractometer, and X-ray diffraction measurement of the sample is performed to obtain an X-ray diffraction profile.

The measurement conditions for X-ray diffraction measurement are as follows. However, the device, goniometer and detector are not particularly limited as long as the results equivalent to those of the present embodiment can be obtained.

Equipment: SmartLab manufactured by Rigaku Corporation

X-ray tube: Cu-Kα ray

X-ray output: 45 kV, 200 mA

Monochromator on incident side: Johansson element (with Cu-Kα2 line and Cu-Kβ line being cut)

Optical system: Bragg-Brentano focusing method

Incident parallel slit: 5.0 degrees

Incident slit: ½ degrees

Longitudinal limiting slit: 10.0 mm

Light receiving slit 1: 8.0 mm

Light receiving slit 2: 13.0 mm

Light receiving parallel slit: 5.0 degrees

Goniometer: SmartLab goniometer

Distance between X-ray source and mirror: 90.0 mm

Distance between X-ray source and selected slit: 114.0 mm

Distance between X-ray source and sample: 300.0 mm

Distance between sample and light receiving slit 1: 187.0 mm

Distance between sample and light receiving slit 2: 300.0 mm

Distance between light receiving slit 1 and light receiving slit 2: 113.0 mm

Distance between sample and detector: 331.0 mm

Detector: D/Tex Ultra

Measurement range: 10 to 120 degrees

Data collection angle interval: 0.02 degrees

Scanning method: Continuous

Scan speed: 2.0 degrees/minute

In the X-ray diffraction profile of the alloy particles of the negative electrode active material of the present embodiment, the diffraction line peak of Si single substance is not observed under the above-described measurement conditions. This is not because, for example, the Si element contained in the raw material alloy of the mechanical alloying (MA) process is released as a Si single phase from the $D0_3$ phase, δ phase, ε phase and η' phase in the mechanical alloying (MA) process, but because the $SiO_x$ phase (x=0.50 to 1.70) is released as an amorphous phase.

[Half-Value Width of the Strongest Diffraction Line Peak]

In the alloy particles of the present embodiment, the half-value width of the strongest diffraction line peak (peak having the maximum diffraction integrated intensity) (hereinafter, simply referred to as a half-value width) is 0.15 to 2.50 degrees. If the half-value width is less than 0.15 degrees, the discharge capacity and the initial coulombic efficiency of the negative electrode active material deteriorate. On the other hand, if the half-value width is larger than 2.50 degrees, the capacity retention ratio of the negative electrode active material decreases. When the half-value width is 0.15 to 2.50 degrees, it is possible to increase the capacity retention ratio while increasing the discharge capacity and the initial coulombic efficiency of the negative electrode active material.

If the half-value width is within the above-described range, the following reasons can be considered as the reasons for increasing the discharge capacity, initial coulombic efficiency, and capacity retention ratio of the negative electrode active material. The half-value width serves as an index of the mean size (crystallite diameter) of the crystallite (the smallest region that can be regarded as a single crystal) of the $D0_3$ phase, the $\delta$ phase, the $\epsilon$ phase and the $\eta'$ phase. In particular, in powder X-ray diffraction, individual crystallite constituting the powder particles can be regarded as a region of the smallest unit that contributes to diffraction with respect to incident X-rays. The half-value width changes depending on the crystallite diameter. Specifically, the smaller the crystallite diameter, the wider the half-value width tends to be. This phenomenon can be evaluated quantitatively by the Scherrer equation.

However, since the crystallite diameter defined in the present invention is analyzed based on the strongest diffraction line peak (diffraction line peak having the maximum diffraction integrated intensity) observed in the range of 42.0 to 44.0 degrees of diffraction angle 2θ, it is treated as a value obtained conveniently from the diffraction intensity originated from the $D0_3$ phase, the $\delta$ phase, the $\epsilon$ phase and the $\eta'$ phase which appear in this region.

The Scherrer equation is as follows.

$$D=(K\cdot\lambda)/\{B\cdot\cos\theta\}$$

D: Crystallite diameter (nm)
K: Scherrer constant (dimensionless)
λ: X-ray wavelength (nm)
B: Half-value width originated from material (radian)
θ: Diffraction angle (radian) when measuring X-ray diffraction by the θ-2θ method In this description, a Scherrer constant K=0.94 is used for the Scherrer equation. The wavelength (λ) of the X-ray is measured in monochrome with Cu-Kα$_1$. The value corresponding to the wavelength is λ=0.15401 nm.

A boundary region of crystallite functions as a diffusion path for metal ions and a storage site for metal ions during charging/discharging. If the half-value width is too narrow, the crystallite diameter is excessively large. In this case, the number density of the storage site decreases, and the discharge capacity decreases. In addition, the initial coulombic efficiency often has a positive correlation with the discharge capacity. Therefore, as the crystallite diameter increases, the discharge capacity decreases and the initial coulombic efficiency also decreases. When the discharge capacity is small, it is considered that among the metal ions which are taken into the active material by the initial charging, the proportion of the metal ions which are stabilized increases, and consequently, the metal ions in the active material become unable to be taken out at the time of discharging. On the other hand, when the half-value width is too wide, the crystallite diameter is excessively small. In this case, although there are many metal ion storage sites and the initial capacity is large, it is considered that the proportion of the metal ions which are stabilized in a boundary region of the crystallite tends to increase as the charging/discharging cycle progresses. For this reason, the capacity retention ratio is considered to decrease.

Therefore, if the half-value width is 0.15 to 2.50 degrees, the size of the crystallite will be appropriate so that the discharge capacity, the initial coulombic efficiency, and the capacity retention ratio of the negative electrode active material are considered to increase. The lower limit of the half-value width is preferably 0.20 degrees, more preferably 0.25 degrees, further preferably 0.30 degrees, further preferably 0.35 degrees, further preferably 0.40 degrees, further preferably 0.50 degrees, and further more preferably 0.70 degrees. The upper limit of the half-value width is preferably 2.20 degrees, more preferably 2.10 degrees, and further preferably 2.00 degrees. This also applies to the negative electrode active material in a discharged state after repeated charging and discharging.

It should be noted that the above-described half-value width B originated from material and the measured half-value width $B_{obs}$ have the following relationship.

$$B_{obs}=B+b$$

$B_{obs}$: Measured half-value width (radian)
b: Mechanical half-value width (radian) attributable to the X-ray diffractometer The mechanical half-value width b attributable to the X-ray diffractometer is measured by using a standard sample of a $LaB_6$ crystal having a sufficiently large crystallite diameter. As the correction value in the vicinity of the target 2θ region, b=8.73×10$^{-4}$ radian (0.05 degrees) is used. Therefore, when simply described herein as a half-value width, it indicates the above-described half-value width after correction, that is, the half-value width B (B=$B_{obs}$−b) originated from material, instead of the measured half-value width $B_{obs}$. Further, the unit thereof is described by "degrees" in the main text of the description for convenience, but radian is used in the above-described calculation.

Preferably, the crystallite diameter of the $D0_3$ phase, the δ phase, the ε phase and the η' phase is 3.0 to 90.0 nm. The lower limit of the crystallite diameter of the $D0_3$ phase, the δ phase, the ε phase, and the η' phase is more preferably 4.0 nm, and further preferably 5.0 nm. The upper limit of the crystallite diameter of the $D0_3$ phase, the δ phase, the ε phase, and the η' phase is more preferably 40.0 nm, further preferably 20.0 nm, and further preferably 15.0 nm. This also applies to the negative electrode active material in a discharged state after charging/discharging is repeated.

[Method for Measuring Half-Value Width]

The method for measuring the half-value width is as follows. An X-ray diffraction profile is obtained according to the method for measuring the strongest diffraction line peak described above. Among the peaks of the obtained X-ray diffraction profile, the strongest diffraction line peak (diffraction line peak having the maximum diffraction integrated intensity) appearing in a range of 42.0 to 44.0 degrees of diffraction angle 2θ is determined. The width of a peak (half-value full width) is obtained at a half diffraction integrated intensity of the diffraction integrated intensity of the strongest diffraction line peak. Thereby, a measured half-value width $B_{obs}$ (Δ2θ/degree) is obtained. From the measured half-value width $B_{obs}$, the above-described mechanical half-value width b=0.05 degrees (8.73×10$^{-4}$ radian) attributable to the X-ray diffractometer is subtracted as a correction value to obtain the half-value width B (Δ2θ/degree) originated from material.

[Mean Circle-Equivalent Diameter of $SiO_x$ Phase (x=0.50 to 1.70)]

Preferably, the mean circle-equivalent diameter of the $SiO_x$ phase (x=0.50 to 1.70) is 2.0 to 90.0 nm. If the mean circle-equivalent diameter of the $SiO_x$ phase (x=0.50 to 1.70) is 90.0 nm or less, interphase difference in the expansion ratio and the contraction ratio due to storage of metal ions is suppressed. In this case, the strain at the interface between the $SiO_x$ phase (x=0.50 to 1.70) and the other phases caused by charging/discharging is suppressed, and the capacity retention ratio of the negative electrode active material is increased. On the other hand, although the $SiO_x$ phase (x=0.50 to 1.70) is preferably as small as possible, it may be difficult to make it less than 2.0 nm in production. Therefore, the mean circle-equivalent diameter of the $SiO_x$ phase (x=0.50 to 1.70) is preferably 2.0 to 90.0 nm. The lower limit of the mean circle-equivalent diameter of the $SiO_x$ phase (x=0.50 to 1.70) is more preferably 3.0 nm, further preferably 4.0 nm, and further preferably 5.0 nm. The upper limit of the mean circle-equivalent diameter of the $SiO_x$ phase (x=0.50 to 1.70) is more preferably 70.0 nm, further preferably 60.0 nm, further preferably 50.0 nm, further preferably 40.0 nm, further preferably 30.0 nm, and further preferably 20.0 nm. The preferable mean circle-equivalent diameter of the $SiO_x$ phase (x=0.50 to 1.70) is similar in the negative electrode active material in a discharged state after repeated charging/discharging. The mean circle-equivalent diameter of the $SiO_x$ phase (x=0.50 to 1.70) can be adjusted by, for example, the mechanical alloying (MA) process to be described later.

[Method for Measuring Mean Circle-Equivalent Diameter of $SiO_x$ Phase (x=0.50 to 1.70)]

The mean circle-equivalent diameter of the $SiO_x$ phase (x=0.50 to 1.70) is measured by the following method. A bright field image is picked up at any three locations of a thin film sample prepared for the above-described TEM observation to create images. Each visual field is 350 nm×350 nm, and the number of pixels is about 650 pixels in one side. The shape of the pixel is square in real space.

Image processing of the picked-up bright field image is performed. First, the brightness and contrast are adjusted. Next, the picked-up bright field image is saved in an electronic file in the BITMAP format or the J-PEG format. At this time, a black-and-white 255-step gray scale (zero corresponds to black and 255 corresponds to white) is used, and a histogram is saved in a state close to the shape of the normal distribution. Using the saved electronic file, the mean circle-equivalent diameter of the $SiO_x$ phase (x=0.50 to 1.70) is obtained by image processing software. For example, as the image processing software, one with a trade name: ImageJ Ver. 1.43U is used. The specific procedure is as follows.

Figure 29:
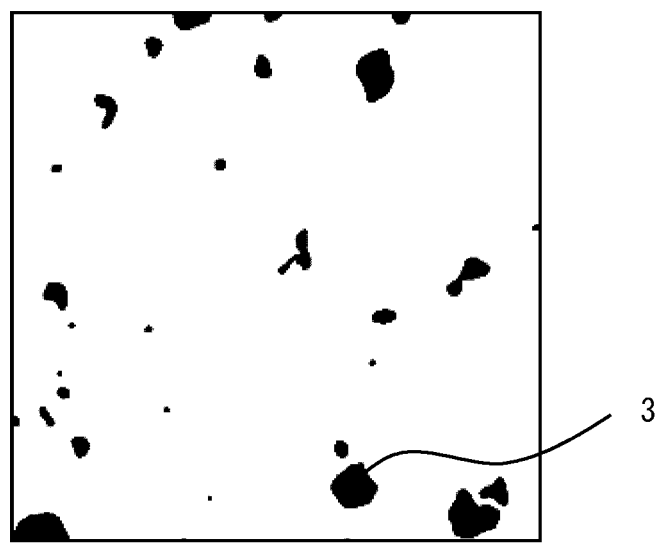
FIG. 29 is a binary image of the bright field image of FIG. 4.

The electronic file of the bright field image to be analyzed is read into ImageJ. Scaling information (scale) of the read-in bright field image is set. More specifically, the histogram of the grayscale in the bright field image is expanded over the entire 0-255 steps to obtain a grayscale image. The white region in the grayscale image is the region corresponding to the $SiO_x$ phase (x=0.50 to 1.70). For a grayscale image in which the histogram is expanded over the entire 0-255 steps, the grayscale extraction target is set so as to be in a range of 210 to 255, and a binarized image is obtained. In the binarized image, the $SiO_x$ phase (x=0.50 to 1.70) is observed as a black region. A black region corresponding to the $SiO_x$ phase (x=0.50 to 1.70) is extracted from the binarized image. A binarized image created by the above-described image processing from the bright field image shown in FIG. 4 is shown in FIG. 29. FIG. 29 is a binarized image of the bright field image of FIG. 4. The $SiO_x$ phase (x=0.50 to 1.70) observed as the relatively white region 3 in FIG. 4 is confirmed as a black region 3 in FIG. 29. From the binarized image, the number of regions corresponding to the $SiO_x$ phase (x=0.50 to 1.70) and the area of each region are obtained by a well-known method.

All the areas of the obtained $SiO_x$ phase (x=0.50 to 1.70) are converted into circle-equivalent diameters, and the arithmetic mean value of the obtained circle-equivalent diameters is obtained. As described above, an arithmetic mean value of the circle-equivalent diameter is obtained from the area of the $SiO_x$ phase (x=0.50 to 1.70) in all the bright field images picked up at any three locations of the thin film sample. The obtained arithmetic mean value is defined as the mean circle-equivalent diameter (nm) of the $SiO_x$ phase (x=0.50 to 1.70). When obtaining the circle-equivalent diameter, the number of $SiO_x$ phases (x=0.50 to 1.70) (the number of regions corresponding to the $SiO_x$ phases (x=0.50 to 1.70) in the bright field image) is 20 or more. When the total number of $SiO_x$ phases (x=0.50 to 1.70) of all the above-described three locations is less than 20, the number of observation locations is increased until the total number is 20 or more.

As described above, the alloy particles of the present embodiment include at least one phase selected from the group consisting of $D0_3$ phase and δ phase, at least one phase selected from the group consisting of ε phase and η' phase, and $SiO_x$ phase (x=0.50 to 1.70). Therefore, the negative electrode active material containing a plurality of alloy particles is excellent in the capacity and the capacity retention ratio. The reason for this is not clear, but the following reasons are conceivable. The ε phase, the η' phase and the $SiO_x$ phase (x=0.50 to 1.70) have a larger reversible electric capacity due to the storage of metal ions compared to the $D0_3$ phase and the δ phase. Therefore, these phases (ε phase, η' phase and $SiO_x$ phase (x=0.50 to 1.70)) increase the capacity of the negative electrode active material. On the other hand, when the ε phase, the η' phase, and the $SiO_x$ phase (x=0.50 to 1.70) are present as single phases, the expansion and contraction in the process of charging/discharging cycle characteristics are large. Therefore, when the ε phase, the η' phase and the $SiO_x$ phase (x=0.50 to 1.70) are single phases, the capacity retention ratio of the negative electrode active material tends to decrease. However, the alloy particles of the present embodiment include at least one phase of the $D0_3$ phase and the δ phase together with at least one phase of the ε phase and the η' phase, and $SiO_x$ phase (x=0.50 to 1.70). Therefore, the expansion and contraction of the ε phase, the η' phase, and the $SiO_x$ phase (x=0.50 to 1.70) are suppressed by the $D0_3$ phase and the δ phase. As a result, the negative electrode active material of the present embodiment can achieve both a sufficiently high capacity (that is, a high discharge capacity) and a sufficiently high capacity retention ratio.

[Optional Elements]

If the alloy particles of the present embodiment include the above-described phases (at least one phase of the $D0_3$ phase and the δ phase, at least one phase of the s phase and the η' phase, and the $SiO_x$ phase (x=0.50 to 1.70)), the alloy elements may contain, in place of a part of Cu, one or more elements selected from the group consisting of C, Ti, V, Cr, Mn, Fe, Co, Ni, Zn, Al and B.

Preferably, the alloy elements may contain, in place of a part of Cu, C: 1 to 40 mass %, and one or more elements selected from the group consisting of: in atomic composition percentage excluding oxygen and carbon, Ti: 2.0 at % or less, V: 2.0 at % or less, Cr: 2.0 at % or less, Mn: 2.0 at % or less, Fe: 2.0 at % or less, Co: 2.0 at % or less, Ni: 3.0 at % or less, Zn: 3.0 at % or less, Al: 3.0 at % or less, and B: 2.0 at % or less. The above-described Ti, V, Cr, Mn, Fe, Co, Ni, Zn, Al and B are optional elements and do not have to be contained.

C (carbon) is an optional element and does not have to be contained. When C is contained, the ratio of graphite (carbon: C) in the alloy particles is preferably 1 to 40 mass %. A more preferable lower limit of the ratio of graphite (carbon) in the alloy particles is 2 mass %, and a further preferable lower limit is 3 mass %. A more preferable upper limit of the ratio of graphite (carbon) in the alloy particles is 30 mass %, and a further preferable upper limit is 20 mass %.

Ti is an optional element and does not have to be contained. In other words, the Ti content may be 0%, and when it is contained, a preferable upper limit of the Ti content is 2.0 at % in atomic composition percentage excluding oxygen and carbon, as described above. The upper limit of the Ti content is more preferably 1.0 at %, and further preferably 0.5 at %. The lower limit of the Ti content is preferably more than 0%, more preferably 0.01 at %, further preferably 0.05 at %, and further preferably 0.1 at %.

V is an optional element and does not have to be contained. In other words, the V content may be 0%, and when it is contained, a preferable upper limit of the V content is 2.0 at % in atomic composition percentage excluding oxygen and carbon, as described above. The upper limit of the V content is more preferably 1.0 at %, and further preferably 0.5 at %. The lower limit of the V content is preferably more than 0%, more preferably 0.01 at %, further preferably 0.05 at %, and further preferably 0.1 at %.

Cr is an optional element and does not have to be contained. In other words, the Cr content may be 0%, and when it is contained, a preferable upper limit of the Cr content is 2.0 at % in atomic composition percentage excluding oxygen and carbon, as described above. The upper limit of the Cr content is more preferably 1.0 at %, and further preferably 0.5 at %. The lower limit of the Cr content is preferably more than 0%, more preferably 0.01 at %, further preferably 0.05 at %, and further preferably 0.1 at %.

Mn is an optional element and does not have to be contained. In other words, the Mn content may be 0%, and when it is contained, a preferable upper limit of the Mn content is 2.0 at % in atomic composition percentage excluding oxygen and carbon, as described above. The upper limit of the Mn content is more preferably 1.0 at %, and further preferably 0.5 at %. The lower limit of the Mn content is preferably more than 0%, more preferably 0.01 at %, further preferably 0.05 at %, and further preferably 0.1 at %.

Fe is an optional element and does not have to be contained. In other words, the Fe content may be 0%, and when it is contained, a preferable upper limit of the Fe content is 2.0 at % in atomic composition percentage excluding oxygen and carbon, as described above. The upper limit of the Fe content is more preferably 1.0 at %, and further preferably 0.5 at %. The lower limit of the Fe content is preferably more than 0%, more preferably 0.01 at %, further preferably 0.05 at %, and further preferably 0.1 at %.

Co is an optional element and does not have to be contained. In other words, the Co content may be 0%, and when it is contained, a preferable upper limit of the Co content is 2.0 at % in atomic composition percentage excluding oxygen and carbon, as described above. The upper limit of the Co content is more preferably 1.0 at %, and further preferably 0.5 at %. The lower limit of the Co content is preferably more than 0%, more preferably 0.01 at %, further preferably 0.05 at %, and further preferably 0.1 at %.

Ni is an optional element and does not have to be contained. In other words, the Ni content may be 0%, and when it is contained, a preferable upper limit of the Ni content is 3.0 at % in atomic composition percentage excluding oxygen and carbon, as described above. A more preferable upper limit of the Ni content is 2.0 at %. The lower limit of the Ni content is preferably more than 0%, and more preferably 0.1 at %.

Zr is an optional element and does not have to be contained. In other words, the Zr content may be 0%, and when it is contained, a preferable upper limit of the Zn content is 3.0 at % in atomic composition percentage excluding oxygen and carbon, as described above. The upper limit of the Zn content is more preferably 2.0 at %. The lower limit of the Zn content is preferably more than 0%, more preferably 0.1 at %, further preferably 0.5 at %, and further preferably 1.0 at %.

Al is an optional element and does not have to be contained. In other words, the Al content may be 0%, and when it is contained, a preferable upper limit of the Al content is 3.0 at % in atomic composition percentage excluding oxygen and carbon, as described above. The upper limit of the Al content is more preferably 2.5 at %, and further preferably 2.0 at %. The lower limit of the Al content is preferably 0.10%, more preferably 0.2 at %, and further preferably 0.5 at %.

B is an optional element and does not have to be contained. In other words, the B content may be 0%, and when it is contained, a preferable upper limit of the B content is 2.0 at % in atomic composition percentage excluding oxygen and carbon, as described above. The upper limit of the B content is more preferably 1.0 at %, and further preferably 0.5 at %. The lower limit of the B content is preferably more than 0%, more preferably 0.01 at %, further preferably 0.05 at %, and further preferably 0.1 at %.

[Particle Diameter of Alloy Particles]

The mean particle diameter of the alloy particles according to the embodiment of the present invention is not particularly limited. The mean particle diameter of the alloy particles is, for example, 0.5 to 50 μm. When the mean particle diameter is 0.5 μm or more, the specific surface area will not become too large. Therefore, the irreversible capacity is small and the initial charging/discharging efficiency is improved. On the other hand, when the mean particle diameter of the alloy particles is 50 μm or less, a flat and thin electrode can be created. A more preferable lower limit of the particle diameter of the alloy particles is 1.0 μm. A more preferable upper limit of the particle diameter of the alloy particles is 20 μm.

The method for measuring the particle diameter of alloy particles is as follows. The measurement is performed by the laser diffraction/scattering method using a laser diffraction/scattering type particle size distribution analyzer conforming to JIS Z 8825 (2013). The dispersion medium in the measurement is water supplemented with 0.1 mass % of a surfactant containing alkyl glycoxide. The dispersion method is performed by ultrasonic waves for 5 minutes. A particle diameter at which the cumulative volume with respect to the volume of all particles becomes 50% (a volumetric mean particle diameter by the laser diffraction/scattering method) is assumed to be the particle diameter of the alloy particles.

[Formula (1)]

In the negative electrode active material of the present embodiment, preferably, the volume fraction $V_{SiOx}$ (%) of the $SiO_x$ phase (x=0.50 to 1.70) and the volume fraction $V_{\eta'}$ (%) of the η' phase of the alloy particles satisfy Formula (1).

$$8.0 \leq V_{SiOx} + 0.5 V_{\eta'} \leq 65.0 \tag{1}$$

Where, the volume fraction (%) of the $SiO_x$ phase (x=0.50 to 1.70) is substituted for $V_{SiOx}$. The volume fraction (%) of the η' phase is substituted for $V_{η'}$.

Definition is made as $F1=V_{SiOx}+0.5V_{η'}$. F1 is an index showing the effect of the volume fractions of the $SiO_x$ phase (x=0.50 to 1.70) and the η' phase on the capacity and the stable-period coulombic efficiency.

The $SiO_x$ phase (x=0.50 to 1.70) has a larger capacity than that of the η' phase. When F1 is 8.0 or more, the capacity of the negative electrode active material further increases. Therefore, F1 is preferably 8.0 or more. The lower limit of F1 is more preferably 8.5, further preferably 9.0, further preferably 9.5, and further preferably 10.0.

On the other hand, if F1 is too high, although the capacity of the negative electrode active material increases, the stable-period coulombic efficiency deteriorates. As the F1 value increases, the proportion of the $SiO_x$ phase (x=0.50 to 1.70) and the η' phase that are exposed on the surface of the alloy particles increases. In this case, decomposition of the electrolytic solution becomes likely to occur, and the stable-period coulombic efficiency deteriorates.

The decomposition reaction of the electrolytic solution by the $SiO_x$ phase (x=0.50 to 1.70) has a higher reaction amount than the decomposition reaction of the electrolytic solution by the η' phase. Therefore, if F1 in which the volume fraction (vol %) of the $SiO_x$ phase (x=0.50 to 1.70) and the volume fraction (vol %) of the η' phase are specified is 65.0 or less, the stable-period coulombic efficiency is further improved. Therefore, preferably, F1 is 65.0 or less. The upper limit of F1 is more preferably 63.0, further preferably 61.0, further preferably 60.0, further preferably 58.0, and further preferably 55.0.

[Method for Producing Negative Electrode Active Material, Negative Electrode, and Battery]

An example of the method for producing a negative electrode active material containing the above-described alloy particles, and a negative electrode and a battery, which include the negative electrode active material, will be described. The method for producing the negative electrode active material according to the present embodiment is not limited to the following production method. However, the following production method is suitable.

The method for producing a negative electrode active material includes a process of preparing a molten metal (preparation process), a process of cooling the molten metal to produce an alloy (alloy ingot or alloy foil sheet) (alloy production process), and a process of subjecting the alloy to mechanical alloying (mechanical alloying (MA) process).

[Preparation Process]

In the preparatory process, a molten metal having the above-described alloy elements is produced. The molten metal is produced by melting the raw material by a well-known melting method such as an ingot casting method, arc melting, and resistance heating melting.

[Alloy Production Process]

Figure 30:
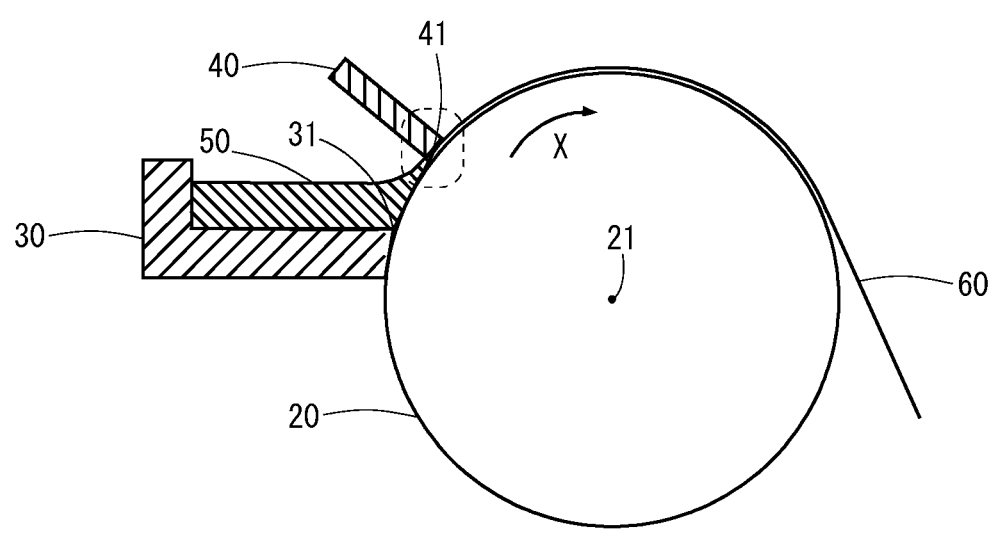
FIG. 30 is a schematic diagram of a production apparatus of alloys according to a preferred embodiment.

The cooling rate of the molten metal is appropriately set. The method for producing alloys in the alloy production process is, for example, an ingot casting method, a strip casting method and a melt spin method. However, for example, when an alloy is produced by an ingot casting method, the ε phase and the η' phase, which are equilibrium phases, may become coarse. In this case, in order to obtain a preferable half-value width (crystallite diameter), the processing time of the mechanical alloying (MA) process described later may become long. Therefore, the alloy is preferably produced by rapid cooling. FIG. 30 is a schematic diagram of an alloy production apparatus according to the preferred embodiment. In the present embodiment, in consideration of manufacturing efficiency, for example, it is preferable to produce the alloy foil sheet by rapid cooling using a production apparatus 10 shown in FIG. 30. The production apparatus 10 includes a cooling roll 20, a tundish 30, and a blade member 40.

[Cooling Roll]

The cooling roll 20 has an outer peripheral surface, and is adapted to cool and solidify a molten metal 50 on the outer peripheral surface while rotating. The cooling roll 20 includes a columnar body portion and a shaft portion (not shown). The body portion has the above-described outer peripheral surface. The shaft portion is arranged at the central shaft position of the body portion and is attached to a drive source (not shown). The cooling roll 20 is rotated around a central axis 21 of the cooling roll 20 by the drive source.

The material of the cooling roll 20 is preferably a material having high hardness and thermal conductivity. The material of the cooling roll 20 is, for example, copper or a copper alloy. Preferably, the material of the cooling roll 20 is copper. The cooling roll 20 may further have a coating on its surface. Thereby, the hardness of the cooling roll 20 is increased. The coating is, for example, a plated coating or a cermet coating. The plated coating is, for example, chrome plating or nickel plating. The cermet coating contains, for example, one or more elements selected from the group consisting of tungsten (W), cobalt (Co), titanium (Ti), chromium (Cr), nickel (Ni), silicon (Si), aluminum (Al), boron (B), carbides, nitrides, and carbonitrides of these elements. Preferably, the outer layer of the cooling roll 20 is copper, and the cooling roll 20 further has a chrome-plated coating on its surface.

X shown in FIG. 25 is the rotational direction of the cooling roll 20. When producing the alloy foil sheet 60, the cooling roll 20 rotates in a fixed direction X. Thereby, in FIG. 30, the molten metal 50 in contact with the cooling roll 20 is partially solidified on the outer peripheral surface of the cooling roll 20 and moves as the cooling roll 20 rotates. The roll peripheral speed of the cooling roll 20 is appropriately set in consideration of the cooling speed of the molten metal 50 and the production efficiency. If the roll peripheral speed is low, the production efficiency decreases. If the roll peripheral speed is high, the alloy foil sheet 60 is likely to be peeled off from the outer peripheral surface of the cooling roll 20. Therefore, the time during which the alloy foil sheet 60 is in contact with the outer peripheral surface of the cooling roll 20 decreases. In this case, the alloy foil sheet 60 is not subjected to heat removal by the cooling roll 20, and is air-cooled. When air-cooled, a sufficient cooling rate cannot be obtained. If a sufficient cooling rate is not obtained, the ε phase and the η' phase, which are equilibrium phases, become coarse. In this case, while it is necessary to obtain a preferable half-value width (crystallite diameter), it is difficult to adjust the processing conditions of the mechanical alloying (MA) process to be described later. Therefore, the lower limit of the roll peripheral speed is preferably 50 m/min, more preferably 80 m/min, and further preferably 120 m/min. The upper limit of the roll peripheral speed is not particularly limited, but is, for example, 500 m/min in consideration of the equipment capacity. The roll peripheral speed can be obtained from the diameter and the rotational speed of the cooling roll 20.

The interior of the cooling roll 20 may be filled with a solvent for heat removal. Thereby, the molten metal 50 can be cooled efficiently. The solvent is, for example, one or more types selected from the group consisting of water, organic solvents and oils. The solvent may stay inside the cooling roll 20 or may be circulated to the outside.

[Tundish]

The tundish 30 can store the molten metal 50, and supplies the molten metal 50 onto the outer peripheral surface of the cooling roll 20. The shape of the tundish 30 is not particularly limited as long as the molten metal 50 can be supplied onto the outer peripheral surface of the cooling roll 20. The tundish 30 may have a shape like a housing with an open upper portion as shown in FIG. 30, or another shape.

The tundish 30 includes a supply end 31 for guiding the molten metal 50 onto the outer peripheral surface of the cooling roll 20. The molten metal 50 is supplied to the tundish 30 from a crucible (not shown), and then is supplied onto the outer peripheral surface of the cooling roll 20 through the supply end 31. The shape of the supply end 31 is not particularly limited. The cross section of the supply end 31 may be rectangular as shown in FIG. 30, or may be inclined. The supply end 31 may have a nozzle shape.

Preferably, the tundish 30 is arranged near the outer peripheral surface of the cooling roll 20. Thereby, the molten metal 50 can be stably supplied onto the outer peripheral surface of the cooling roll 20. The gap between the tundish 30 and the cooling roll 20 is appropriately set within a range in which the molten metal 50 does not leak.

The material of the tundish 30 is preferably refractories. The tundish 30 contains, for example, one or more types selected from the group consisting of aluminum oxide ($Al_2O_3$), silicon monoxide (SiO), silicon dioxide ($SiO_2$), chromium oxide ($Cr_2O_3$), magnesium oxide (MgO), titanium oxide ($TiO_2$), aluminum titanate ($Al_2TiO_5$) and zirconium oxide ($ZrO_2$).

[Blade Member]

The blade member 40 is disposed downstream side in the rotational direction of the cooling roll 20 relative to the tundish 30, with a gap provided between the blade member 40 and the outer peripheral surface of the cooling roll 20. The blade member 40 is, for example, a plate-shaped member disposed parallel to the axial direction of the cooling roll 20.

Figure 31:
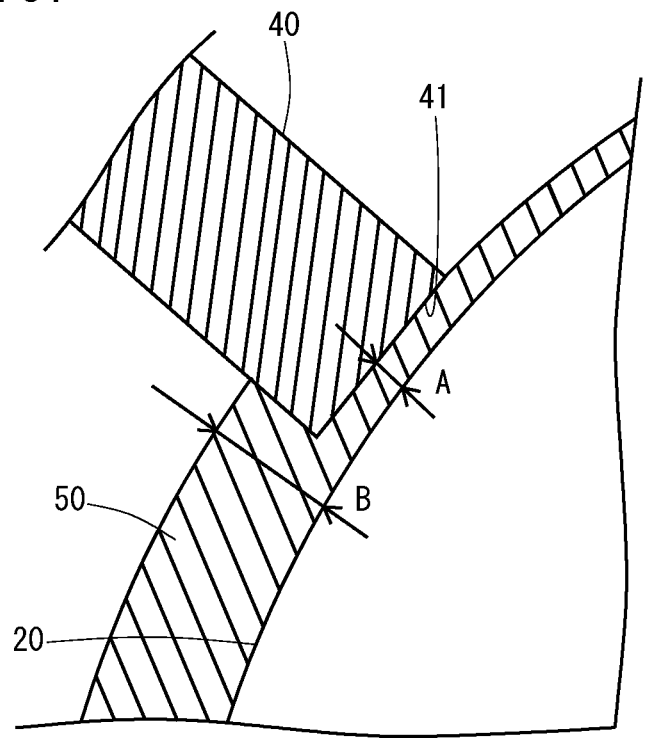
FIG. 31 is an enlarged view of the vicinity of a front end (a region surrounded by a broken line in FIG. 30) of a blade member 40 of a production apparatus 10.

FIG. 31 is an enlarged view of the vicinity of the front end of the blade member 40 of the production apparatus 10 (the region surrounded by a broken line in FIG. 30). Referring to FIG. 31, the blade member 40 is disposed with a gap A provided between the blade member 40 and the outer peripheral surface of the cooling roll 20. The blade member 40 regulates the thickness of the molten metal 50 on the outer peripheral surface of the cooling roll 20 to the width of the gap A between the outer peripheral surface of the cooling roll 20 and the blade member 40. Specifically, there may be a case in which the thickness B of the molten metal 50 upstream side in the rotational direction of the cooling roll 20 than the blade member 40 is thicker than the width of the gap A. In this case, Of the molten metal 50, an amount (B−A) corresponding to the thickness exceeding the width of the gap A is blocked by the blade member 40. Thereby, the thickness of the molten metal 50 is reduced to the width of the gap A. As a result of the thickness of the molten metal 50 being reduced, the cooling rate of the molten metal 50 increases. In this case, the crystal grains and crystallites of the alloy foil sheet 60 become finer. Further, the $D0_3$ phase which is a metastable phase and the δ phase which is a high-temperature stabilized phase become likely to be formed.

The width of the gap A is preferably narrower than the thickness B of the molten metal 50 on the outer peripheral surface on the upstream side in the rotational direction of the cooling roll 20 than the blade member 40. In this case, the molten metal 50 on the outer peripheral surface of the cooling roll 20 becomes thinner. Therefore, the cooling rate of the molten metal 50 is further increased. In this case, the crystal grains and crystallites of the alloy foil sheet 60 become finer. Further, the $D0_3$ phase which is a metastable phase and the δ phase which is a high-temperature stabilized phase become more likely to be formed.

The width of the gap A between the outer peripheral surface of the cooling roll 20 and the blade member 40 is the shortest distance between the blade member 40 and the outer peripheral surface of the cooling roll 20. The width of the gap A is appropriately set according to the target cooling rate and production efficiency. The narrower the width of the gap A, the thinner the thickness of the molten metal 50 after adjusting the thickness. Therefore, the cooling rate of the molten metal 50 is further increased. As a result, the crystal grains and crystallites of the alloy foil sheet 60 are more likely to become finer. Further, the $D0_3$ phase which is a metastable phase and the δ phase which is a high-temperature stabilized phase are more likely to be formed. Therefore, the upper limit of the gap A is preferably 100 μm, and more preferably 50 μm.

Of the outer peripheral surface of the cooling roll 20, the distance between the point where the molten metal 50 is supplied from the tundish 30 and the point where the blade member 40 is disposed is appropriately set. The blade member 40 may be disposed within a range in which the free surface of the molten metal 50 (the surface on the side where the molten metal 50 is not in contact with the cooling roll 20) is in contact with the blade member 40 in a liquid or semi-solidified state.

Figure 32:
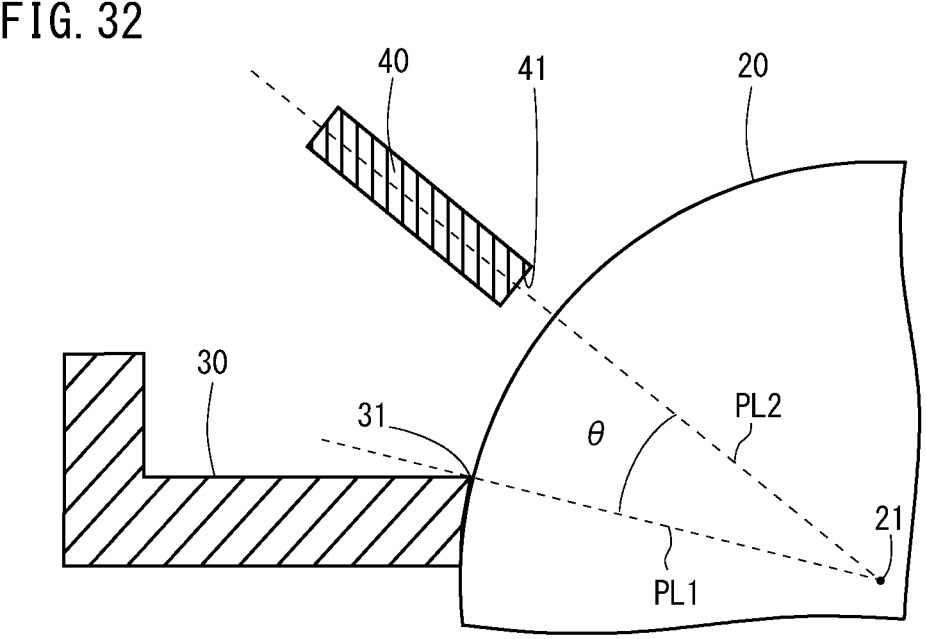
FIG. 32 is a schematic diagram to explain positional relationship between a tundish and the blade member 40 in FIG. 30.

FIG. 32 is a schematic view for explaining positional relationship between the tundish and the blade member 40 in FIG. 30. FIG. 32 shows a mounting angle of the blade member 40. Referring to FIG. 32, for example, the blade member 40 is disposed such that an angle θ formed by a plane PL1 including a central axis 21 of the cooling roll 20 and the supply end 31, and a plane PL2 including the central axis 21 of the cooling roll 20 and a front end portion of the blade member 40 is constant (hereinafter, this angle θ is referred to as a mounting angle θ). The mounting angle θ can be set as appropriate. The upper limit of the mounting angle θ is, for example, 45 degrees. The upper limit of the mounting angle θ is preferably 30 degrees. The lower limit of the mounting angle θ is not particularly limited, but it is preferable that the mounting angle θ is in a range in which the side surface of the blade member 40 does not come into direct contact with the surface of the molten metal 50 on the tundish 30.

Referring to FIGS. 30 to 32, preferably, the blade member 40 has a heat-removing surface 41. The heat-removing surface 41 is arranged so as to face the outer peripheral surface of the cooling roll 20. The heat-removing surface 41 comes into contact with the molten metal 50 passing through the gap between the outer peripheral surface of the cooling roll 20 and the blade member 40.

The material of the blade member 40 is preferably refractories. The blade member 40 contains, for example, one or more types selected from the group consisting of aluminum oxide ($Al_2O_3$), silicon monoxide (SiO), silicon dioxide ($SiO_2$), chromium oxide ($Cr_2O_3$), magnesium oxide (MgO), titanium oxide ($TiO_2$), aluminum titanate ($Al_2TiO_5$) and zirconium oxide ($ZrO_2$). Preferably, the blade member 40 contains one or more types selected from the group consisting of aluminum oxide ($Al_2O_3$), silicon dioxide ($SiO_2$), aluminum titanate ($Al_2TiO_5$) and magnesium oxide (MgO).

A plurality of blade members 40 may be continuously disposed in the rotational direction of the cooling roll 20. In this case, the load imposed on one blade member 40 is reduced. Further, the accuracy of the thickness of the molten metal 50 can be improved.

In the production apparatus 10 described above, the thickness of the molten metal 50 on the outer peripheral surface of the cooling roll 20 is regulated by the blade member 40. Therefore, the molten metal 50 on the outer peripheral surface of the cooling roll 20 becomes thinner. As a result of the molten metal 50 becoming thinner, the cooling rate of the molten metal 50 increases. Therefore, if the alloy foil sheet 60 is produced using the production apparatus 10, the alloy foil sheet 60 having finer crystal grains and crystallites can be produced. If the alloy foil sheet 60 is produced by using the production apparatus 10, further, the $D0_3$ phase which is a metastable phase, and the δ phase which is a high-temperature stabilized phase can be sufficiently formed. When the production apparatus 10 is used, a preferable mean cooling rate is 100° C./sec or more. The mean cooling rate referred to herein is calculated by the following formula.

Mean cooling rate=(molten metal temperature−temperature of alloy foil sheet at the end of rapid cooling)/rapid cooling time If the alloy foil sheet is produced without the blade member 40, that is, if strip casting (SC) is performed by a conventional method, the thickness of the molten metal 50 on the outer peripheral surface of the cooling roll 20 cannot be thinly regulated. In this case, the cooling rate of the molten metal 50 decreases. Therefore, even if the mechanical alloying (MA) processing described later is carried out, the alloy foil sheet 60 having a fine microstructure cannot be obtained. In this case, while it is necessary to obtain a preferable half-value width (crystallite diameter), it is difficult to adjust the processing conditions of the mechanical alloying (MA) process described later.

When the alloy foil sheet 60 is produced without the blade member 40, further, in order to reduce the thickness of the molten metal 50 on the outer peripheral surface of the cooling roll 20, it is necessary to increase the roll peripheral speed of the cooling roll 20. If the roll peripheral speed is high, the alloy foil sheet 60 is peeled off early from the outer peripheral surface of the cooling roll 20. In other words, the time during which the alloy foil sheet 60 is in contact with the outer peripheral surface of the cooling roll 20 is shortened. In this case, the alloy foil sheet 60 is not subjected to heat removal by the cooling roll 20 and is air-cooled. When air-cooled, a sufficient mean cooling rate cannot be obtained. Therefore, the alloy foil sheet 60 having a fine microstructure cannot be obtained. In this case, while it is necessary to obtain a preferable half-value width (crystallite diameter), it is difficult to adjust the processing conditions of the mechanical alloying (MA) process to be described later.

[Mechanical Alloying (MA) Process]

The produced alloy (alloy ingot or alloy foil sheet 60) is subjected to mechanical alloying (MA) processing to obtain alloy particles. Due to the alloying effect by the mechanical alloying (MA) processing, Si is released from the above-described alloy (Cu—Sn—Si alloy) and reacts with oxygen contained in the oxygen source described later to form the $SiO_x$ phase (x=0.50 to 1.70). Then, the structure of the alloy particles changes into a structure containing one or more types selected from the group consisting of the $D0_3$ phase and the δ phase, one or more types selected from the group consisting of the ε phase and the η' phase, and the $SiO_x$ phase (x=0.50 to 1.70). Thereby, the alloy particles of the present embodiment are produced.

In the present embodiment, $SnO_2$ is added together with the oxygen source in the mechanical alloying (MA) processing. By adding $SnO_2$ in the MA processing, the oxygen source can be completely decomposed. As a result, it is possible to obtain a volume fraction of the $SiO_x$ phase (x=0.50 to 1.70) of 5.0 to 60.0 vol %.

Further, by adding the above-described $SnO_2$ and controlling the mechanical alloying (MA) time, it is possible to control the volume fraction of the η' phase to be more than 0 to 60.0 vol %.

By the mechanical alloying (MA) processing, it is possible to further reduce the size of the crystallites of the alloy particles, and adjust the half-value width to a desired value.

The alloy (alloy ingot or alloy foil sheet 60) may be subjected to pre-grinding before the mechanical alloying (MA) processing. For the pre-grinding, an ordinary ball mill, a vibrating ball mill, an attritor, a pin mill, and a disc mill can be used. An example of the vibrating ball mill is one with trade name. mixer mill MM400 manufactured by Verder Scientific Co., Ltd.

Mechanical alloying (MA) processing is performed according to the following procedure. First, the alloy (alloy ingot or alloy foil sheet 60) is charged into a mechanical alloying (MA) equipment such as an attritor or a vibrating ball mill together with balls, an oxygen source and $SnO_2$.

[Oxygen Source]

An oxygen source is, for example, an organic compound containing oxygen. If the proportion of oxygen in the chemical composition of the organic compound containing oxygen is high, oxygen can be efficiently supplied. The proportion of oxygen in the organic compound containing oxygen is, for example, 6: more than 1, in the ratio of C:O.

The oxygen source is preferably a solid organic compound having a molecular weight of 1000 or more. In the present embodiment, a dry mechanical alloying (MA) processing using a solid oxygen source is performed. If an oxygen source with a small molecular weight is used, there is risk that it may volatilize. If a dry mechanical alloying (MA) processing is performed using a solid oxygen source having a molecular weight of 1000 or more, the mechanical alloying (MA) processing can be safely performed even under the following mechanical alloying (MA) conditions. If the oxygen source is a liquid, the energy may be too high.

The oxygen-containing organic compound is, for example, polyethylene glycol (PEG). PEG is a liquid when its mean molecular weight is less than 1000. PEG is a solid when its mean molecular weight is 1000 or more.

The preferable amount of addition of the oxygen source is 0.5 to 7.0 mass % with respect to the mass of the alloy. However, it may be changed depending on the models of the mechanical alloying (MA) equipment, atmosphere control, and processing time. The amount of addition of the oxygen source is adjusted appropriately after confirming the oxygen content in the produced alloy particles. When the addition amount is generally within the above-described range (0.5 to 7.0 mass %), the oxygen content of the alloy particles can be easily adjusted in an appropriate range, and $SiO_x$ (x=0.50 to 1.70) can be finely formed in the alloy particles.

[$SnO_2$]

As described above, in the MA processing, $SnO_2$ (tin oxide (IV)) is added together with the oxygen source. A preferable amount of addition of $SnO_2$ is 0.01 to 1.00 mass % with respect to the mass of the alloy.

If the amount of addition of $SnO_2$ is 0.01 to 1.00 mass %, the oxygen source can be completely decomposed. As a result, the volume fraction of the $SiO_x$ phase (x=0.50 to 1.70) can be made 5.0 to 60.0 vol %. The detailed mechanism by which the oxygen source is completely decomposed by $SnO_2$ is not clear, but there is possibility that catalytic action and polishing action by $SnO_2$ are functioning. Therefore, the preferable amount of addition of $SnO_2$ (tin oxide (IV)) is 0.01 to 1.00 mass % with respect to the mass of the alloy.

A more preferable amount of addition of $SnO_2$ is 0.05 to 0.15 mass %. However, the amount of addition of $SnO_2$ may be changed depending on the models of the mechanical alloying (MA) equipment, atmosphere control, and processing time. The amount of addition of $SnO_2$ is appropriately adjusted after confirming the oxygen content in the produced alloy particles.

A preferred form of addition of $SnO_2$ is powder. It is preferable to use $SnO_2$ having a mean particle diameter of 5 to 200 μm in median diameter. However, depending on the models of the mechanical alloying (MA) equipment, atmosphere control, and processing time, granules of 200 μm or more may be used.

Since the amount of addition of SnO2 is very small, the Sn component contained therein does not substantially affect the composition of the active material powder after the mechanical alloying (MA) processing.

By adding $SnO_2$ and controlling the processing time of the mechanical alloying (MA) processing, it is possible to further adjust the volume fraction of the η' phase to more than 0 to 60 vol %. The reason for this is as follows.

By adding $SnO_2$, the substance used as the oxygen source is almost completely decomposed. In the process of making the volume fraction of the $SiO_x$ phase (x=0.50 to 1.70) to be 5.0 to 60.0 vol %, Si is discharged from the Cu—Sn—Si alloy particles before mechanical alloying (MA). As Si is discharged, in addition to the $D0_3$ phase and the δ phase which are close to the Cu—Sn binary system composition, the ε phase and the η' phase begin to be formed from the $D0_3$ phase and the δ phase in which Si is originally dissolved.

By appropriately controlling the mechanical alloying (MA) time, particularly it is possible to control the proportion of formation of the η' phase within a specified range. In this case, the appropriate mechanical alloying (MA) time depends on the centrifugal acceleration of the mechanical alloying (MA) equipment described later. In other words, the appropriate mechanical alloying (MA) time is affected by the level of high energy used for grinding. The appropriate mechanical alloying (MA) time can be adjusted by confirming the proportion of formation of the η' phase after the mechanical alloying (MA).

Further, by appropriately controlling the mechanical alloying (MA) time, it is possible to adjust the relationship between the volume fraction $V_{SiOx}$ (vol %) of the above-described $SiO_x$ phase (x=0.50 to 1.70) and the volume fraction Vg (vol %) of the η' phase so as to satisfy Formula (1). An appropriate mechanical alloying (MA) time for satisfying Formula (1) depends on the centrifugal acceleration of the mechanical alloying (MA) equipment described later. In other words, the appropriate mechanical alloying (MA) time is affected by the level of high energy used for grinding. Therefore, an appropriate mechanical alloying (MA) time is determined by controlling the centrifugal acceleration and the ball ratio of the mechanical alloying (MA) equipment described later. The appropriate mechanical alloying (MA) time can be adjusted by confirming the volume fraction $V_{SiOx}$ (vol %) of the $SiO_x$ phase (x=0.50 to 1.70) and the volume fraction $V_{\eta'}$(vol %) of the η' phase, after the mechanical alloying (MA).

By mechanical alloying (MA) processing, the alloy in the mechanical alloying (MA) equipment is repeatedly subjected to grinding with high energy, and crimping of alloy particles as ground.

In order to control the volume fraction of the $SiO_x$ phase (x=0.50 to 1.70) to be 5.0 to 60.0 vol %, the oxygen concentration and dew point in an inert atmospheric gas to be used in the mechanical alloying (MA) process are sufficiently lowered. Specifically, the oxygen concentration in the original gas of, for example, nitrogen gas or argon gas used as the inert atmospheric gas is preferably 10 ppm or less. Further, the dew point is preferably minus 60° C. or less. If the oxygen concentration in the original gas is kept to be 10 ppm or less and the dew point is kept to be minus 60° C. or less, mixing originated from oxygen and moisture in the atmospheric gas can be suppressed as much as possible. If mixing originated from oxygen and moisture from the atmospheric gas is suppressed, the oxygen obtained when the substance used as the oxygen source is completely decomposed will be the main oxygen source of the $SiO_x$ phase (x=0.50 to 1.70). As a result, the oxygen contained in the alloy particles can be easily adjusted to 0.50 to 3.00 mass %.

The mechanical alloying (MA) equipment is, for example, a high-speed planetary mill. An example of the high-speed planetary mill is one with trade name: High G BX manufactured by Kurimoto, Ltd. Preferred production conditions in the mechanical alloying (MA) equipment are as follows.

When producing alloy particles by mechanical alloying (MA) processing, production conditions in the mechanical alloying (MA) equipment, such as centrifugal acceleration, a mass ratio of the ball to the alloy foil sheet to be the raw material, and mechanical alloying (MA) processing time are important. If the production conditions in the mechanical alloying (MA) equipment are, for example, as described below, it is possible to produce alloy particles of the present embodiment, which contain: one or two types selected from the group consisting of a phase having a $D0_3$ structure in Strukturbericht notation and having a Si content of 0 to 5.0 at %, and a δ phase having a Si content of 0 to 5.0 at %; one or two types selected from the group consisting of an ε phase having a Si content of 0 to 5.0 at % and an η' phase having a Si content of 0 to 5.0 at %; and a $SiO_x$ phase (x=0.50 to 1.70), and which have a peak having a maximum diffraction integrated intensity in an X-ray diffraction profile, in a range of 42.0 to 44.0 degrees of diffraction angle 2θ, in which the peak has a half-value width of 0.15 to 2.50 degrees.

Centrifugal acceleration: 13 to 150 G (corresponding to a rotational speed: 200 to 689 rpm in High G BX (trade name))

If the centrifugal acceleration is too small, the crystallite diameter increases and therefore the half-value width will decrease. Further, if the centrifugal acceleration is too small, an amorphous $SiO_x$ phase (x=0.50 to 1.70) cannot be obtained. In other words, it means that a coarse crystalline Si phase is formed in the alloy particles. In this case, the level of expansion and contraction of the negative electrode active material increases at the time of charging/discharging, and the capacity retention ratio decreases.

If the centrifugal acceleration is too large, the crystallite diameter decreases and therefore the half-value width will increase. Further, if the centrifugal acceleration is too large, the alloy particles will be amorphized. If the alloy particles are amorphized, a phase having a $D0_3$ structure, a δ phase, an ε phase and an η' phase cannot be obtained. As a result, the capacity and the capacity retention ratio of the negative electrode active material decrease. Therefore, preferable centrifugal acceleration is 13 to 150 G. The lower limit of the centrifugal acceleration is more preferably 20 G, further preferably 25 G, and further preferably 30 G. The upper limit of the centrifugal acceleration is more preferably 130 G, further preferably 110 G, further preferably 100 G, and further preferably 95 G. The centrifugal acceleration can be adjusted by adjusting the rotational speed of the mechanical alloying (MA) equipment. The rotational speed refers to the revolution speed in the turntable of the mechanical alloying (MA) equipment.

Ball ratio: 5 to 80

The ball ratio is a mass ratio of the ball to the alloy foil sheet to be the raw material, and is defined by the following formula.

(Ball ratio)=(Ball mass)/(Mass of alloy ingot or alloy foil sheet)

If the ball ratio is too small, the crystallite diameter increases and therefore the half-value width will decrease. On the other hand, if the ball ratio is too large, the crystallite diameter decreases and therefore the half-value width will increase. Therefore, a preferable ball ratio is 5 to 80. The lower limit of the ball ratio is more preferably 10, and further preferably 12. The upper limit of the ball ratio is more preferably 60, and further preferably 40.

Note that as the material of the ball, for example, a ball having a chemical composition equivalent to SUJ2 conforming to JIS G 4805 (2019) is used. The diameter of the ball is, for example, 0.8 mm to 10 mm.

Mechanical Alloying (MA) Processing Time: 1 to 48 Hours

Mechanical alloying (MA) processing time is defined as MA processing time. If the MA processing time is short, the crystallite diameter increases and therefore the half-value width will decrease. Furthermore, if the MA processing time is short, the amorphous $SiO_x$ phase (x=0.50 to 1.70) cannot be obtained. In other words, it means that a coarse crystalline Si phase is formed in the alloy particles. In this case, the level of expansion and contraction of the negative electrode active material increases at the time of charging/discharging, and the capacity retention ratio decreases. On the other hand, if the MA processing time is long, the crystallite diameter decreases and therefore the half-value width will increase. If the MA processing time is long, the alloy particles are further amorphized. If the alloy particles are amorphized, a phase having a $D0_3$ structure, a $\delta$ phase, an $\varepsilon$ phase and an $\eta'$ phase cannot be obtained. The capacity and the capacity retention ratio of the negative electrode active material decrease. Therefore, a preferable MA processing time is 1 to 48 hours. The lower limit of the MA processing time is preferably 2 hours, more preferably 3 hours, and further preferably 4 hours. The upper limit of the MA processing time is preferably 40 hours, more preferably 36 hours, further preferably 30 hours, and further preferably 24 hours. The MA processing time does not include a unit stop time to be described later.

Cooling conditions during mechanical alloying (MA) processing: Stop for 30 minutes or more per 3 hours of MA processing (intermittent operation)

If the temperature of the alloy particles during the mechanical alloying (MA) processing becomes too high, the crystallites become larger and therefore the half-value width will decrease. A preferable temperature of the chiller cooling water of the equipment during the MA processing is 1 to 25° C.

Furthermore, the total stop time per 3 hours of mechanical alloying (MA) processing (hereinafter referred to as unit stop time) is set to 30 minutes or more. When the mechanical alloying (MA) processing is continuously operated, even if the chiller cooling water is adjusted to the above-described range, the temperature of the alloy particles becomes too high and the crystallites become large. When the unit stop time is 30 minutes or more, it is possible to suppress the temperature of the alloy particles from becoming too high, and suppress the crystallite diameter from increasing.

Alloy particles are produced by the process described so far. As needed, in the mechanical alloying (MA) processing, another active material (graphite) is added in addition to the alloy (alloy ingot or alloy foil sheet 60) and the oxygen source. By the process described so far, the negative electrode active material is produced. Therefore, as described above, the negative electrode active material may be consisted of alloy particles and impurities, or may contain another active material (for example, graphite) in addition to the alloy particles.

[Method for Producing Negative Electrode]

A negative electrode using the negative electrode active material according to the present embodiment can be produced by, for example, the following well-known method.

A mixture in which the above-described negative electrode active material is mixed with a binder such as polyvinylidene fluoride (PVDF), polymethylmethacrylate (PMMA), polytetrafluoroethylene (PTFE), and styrene-butadiene rubber (SBR). Further, in order to impart sufficient conductivity to the negative electrode, this mixture is mixed with a carbon material powder such as natural graphite, artificial graphite, and acetylene black to produce a negative electrode compound. The negative electrode compound is made into a slurry state by adding solvents such as N-methylpyrrolidone (NMP), dimethylformamide (DMF), and water to dissolve the binder and thereafter, if necessary, sufficiently stirring the compound with a homogenizer and glass beads. This slurry is applied to a support such as rolled copper foil or electrodeposited copper foil, and is dried. Then, the dried product is pressed. The negative electrode is produced by the process described so far.

The binder is preferably 1 to 10 mass % with respect to the total amount of the negative electrode compound from the viewpoint of the mechanical strength of the negative electrode and the battery characteristics. The support is not limited to copper foil. The support may be, for example, a thin foil of another metal such as stainless steel or nickel, a net-shaped punched plate, or a mesh woven with metallic wire.

[Method for Producing Battery]

A non-aqueous electrolyte secondary battery according to the present embodiment includes the above-described negative electrode, a positive electrode, a separator, and an electrolytic solution or electrolyte. The shape of the battery may be a cylindrical shape, a square shape, a coin shape, a sheet shape, or the like. The battery of the present embodiment may be a battery using a solid electrolyte, such as a polymer battery.

In the battery of the present invention, it is satisfactory if the negative electrode active material in the discharged state satisfies the requirements specified as the negative electrode active material of the present invention.

The positive electrode of the battery of the present embodiment may be a well-known positive electrode. Preferably, it contains a lithium (Li)-containing transition metal compound as the active material. The Li-containing transition metal compound is, for example, $LiM_{1-x}M'_xO_2$ or $LiM_{2y}M'O_4$. Where, in the formula, $0 \leq x$, $y \leq 1$, and M and M' are each one or more elements selected from the group consisting of barium (Ba), cobalt (Co), nickel (Ni), manganese (Mn), chromium (Cr), titanium (Ti), Vanadium (V), Iron (Fe), Zinc (Zn), Aluminum (Al), Indium (In), Tin (Sn), Scandium (Sc), and Yttrium (Y).

The battery of the present embodiment may use other well-known positive electrode materials such as a transition metal chalcogenide, a vanadium oxide and a lithium (Li) compound thereof, a niobium oxide and a lithium compound thereof, a conjugated polymer using an organic conductive substance, Chevrel phase compound, activated carbon and activated carbon fibers.

The electrolytic solution or electrolyte of the battery of the present embodiment is generally a well-known non-aqueous electrolytic solution in which a lithium salt as a supporting electrolyte is dissolved in an organic solvent. The lithium salt is, for example, one or more types selected from the group consisting of $LiClO_4$, $LiBF_4$, $LiPF_6$, $LiAsF_6$, $LiB(C_6H_5)$, $LiCF_3SO_3$, $LiCH_3SO_3$, $Li(CF_3SO_2)_2N$, $LiC_4F_9SO_3$, $Li(CF_2SO_2)_2$, LiCl, LiBr and LiI.

Preferably, the organic solvent is one or more types selected from the group consisting of carbonic acid ester, carboxylic acid ester and ether. The carbonic acid ester is, for example, one or more types selected from the group consisting of propylene carbonate, ethylene carbonate, ethyl methyl carbonate, dimethyl carbonate, and diethyl carbonate.

The separator is installed between the positive electrode and the negative electrode. The battery of the present embodiment may be provided with a well-known separator. The separator is, for example, one or two types selected from the group consisting of polyolefin-based non-woven fabrics and glass filters. The polyolefin-based non-woven fabric is, for example, one or two types selected from the group consisting of polypropylene non-woven fabric and polyethylene non-woven fabric.

A battery is produced by enclosing the above-described negative electrode, positive electrode, separator, and electrolytic solution or electrolyte in a container of the battery. By the steps described so far, the battery of the present embodiment can be produced.

Hereinafter, the negative electrode active material, the negative electrode, and the battery of the above-described present embodiment will be described in more detail using Examples. The negative electrode active material, the negative electrode, and the battery of the present embodiment are not limited to Examples shown below.

EXAMPLES

[Production of Alloy Particles]
[Preparation Process]

A molten metal was produced so as to have the chemical composition of the alloy elements shown in Table 6. For example, in the case of Test Number 1, a molten metal was produced such that the alloy elements were Cu-21.0 at % Sn-8.0 at % Si, that is, contained 21.0 at % of Sn and 8.0 at % of Si with the balance being Cu and impurities. The molten metal was produced by high-frequency melting a raw material containing metals (unit is g) shown in the "Raw materials for melting" column in Table 5. In Test Number 21, a powder reagent of pure Si was used as the negative electrode active material, and therefore, the raw material for melting was not produced.

TABLE 6

| Test Number | Chemical composition of alloy elements | Cu | Sn | Si | Ti | V | Cr | Mn | Fe | Co | Ni | Zn | Al | B | C |
|---|---|---|---|---|---|---|---|---|---|---|---|---|---|---|---|
| 1 | Cu-21.0at % Sn-8.0at % Si | 624.1 | 344.8 | 31.1 | — | — | — | — | — | — | — | — | — | — | — |
| 2 | Cu-21.0at % Sn-28.0at % Si | 497.1 | 382.3 | 120.6 | — | — | — | — | — | — | — | — | — | — | — |
| 3 | Cu-15.0at % Sn-39.0at % Si | 504.1 | 307.0 | 188.9 | — | — | — | — | — | — | — | — | — | — | — |
| 4 | Cu-14.0at % Sn-7.0at % Si | 729.8 | 241.6 | 28.6 | — | — | — | — | — | — | — | — | — | — | — |
| 5 | Cu-39.0at % Sn-39.0at % Si | 196.3 | 649.9 | 153.8 | — | — | — | — | — | — | — | — | — | — | — |
| 6 | Cu-39.0at % Sn-7.0at % Si | 415.6 | 560.6 | 23.8 | — | — | — | — | — | — | — | — | — | — | — |
| 7 | Cu-14.0at % Sn-28.0at % Si | 600.9 | 270.9 | 128.2 | — | — | — | — | — | — | — | — | — | — | — |
| 8 | Cu-28.0at % Sn-29.0at % Si | 397.7 | 483.7 | 118.6 | — | — | — | — | — | — | — | — | — | — | — |
| 9A-9Q | Cu-29.0at % Sn-16.0at % Si | 473.2 | 466.0 | 60.8 | — | — | — | — | — | — | — | — | — | — | — |
| 10 | Cu-21.0at % Sn-16.0at % Si | 576.4 | 358.9 | 64.7 | — | — | — | — | — | — | — | — | — | — | — |
| 11 | Cu-29.0at % Sn-16.0at % Si-1.0at % Ti | 465.5 | 467.0 | 61.0 | 6.50 | — | — | — | — | — | — | — | — | — | — |
| 12 | Cu-29.0at % Sn-16.0at % Si-1.0at % V | 465.4 | 466.8 | 60.9 | — | 6.91 | — | — | — | — | — | — | — | — | — |
| 13 | Cu-29.0at % Sn-16.0at % Si-1.0at % Cr | 465.3 | 466.7 | 60.9 | — | — | 7.05 | — | — | — | — | — | — | — | — |
| 14 | Cu-29.0at % Sn-16.0at % Si-1.0at % Mn | 465.1 | 466.5 | 60.9 | — | — | — | 7.45 | — | — | — | — | — | — | — |
| 15 | Cu-29.0at % Sn-16.0at % Si-1.0at % Fe | 465.0 | 466.5 | 60.9 | — | — | — | — | 7.57 | — | — | — | — | — | — |
| 16 | Cu-29.0at % Sn-16.0at % Si-1.0at % Co | 464.9 | 466.3 | 60.9 | — | — | — | — | — | 7.98 | — | — | — | — | — |
| 17 | Cu-29.0at % Sn-16.0at % Si-2.0at % Ni | 456.6 | 466.6 | 60.9 | — | — | — | — | — | — | 15.91 | — | — | — | — |
| 18 | Cu-29.0at % Sn-16.0at % Si-2.0at % Zn | 455.7 | 465.8 | 60.8 | — | — | — | — | — | — | — | 17.70 | — | — | — |
| 19 | Cu-29.0at % Sn-16.0at % Si-2.0at % Al | 460.5 | 470.7 | 61.5 | — | — | — | — | — | — | — | — | 7.38 | — | — |
| 20 | Cu-29.0at % Sn-16.0at % Si-1.0at % B | 467.9 | 469.3 | 61.3 | — | — | — | — | — | — | — | — | — | 1.47 | — |
| 21 | 100% Si | — | — | — | — | — | — | — | — | — | — | — | — | — | — |
| 22 | Cu-49.0at % Sn-2.0at % Si | 346.5 | 647.2 | 6.3 | — | — | — | — | — | — | — | — | — | — | — |
| 23 | Cu-44.0at % Sn-45.0at % Si | 97.3 | 726.8 | 175.9 | — | — | — | — | — | — | — | — | — | — | — |
| 24 | Cu-15.0at % Sn-49.0at % Si | 420.2 | 327.0 | 252.8 | — | — | — | — | — | — | — | — | — | — | — |

TABLE 6-continued

| Test Number | Chemical composition of alloy elements | Cu | Sn | Si | Ti | V | Cr | Mn | Fe | Co | Ni | Zn | Al | B | C |
|---|---|---|---|---|---|---|---|---|---|---|---|---|---|---|---|
| 25 | Cu-5.0at % Sn-3.0at % Si | 896.1 | 91.0 | 12.9 | — | — | — | — | — | — | — | — | — | — | — |
| 26 | Cu-5.0at % Sn-49.0at % Si | 597.4 | 121.3 | 281.3 | — | — | — | — | — | — | — | — | — | — | — |
| 27 | Cu-6.0at % Sn-8.0at % Si | 853.7 | 111.2 | 35.1 | — | — | — | — | — | — | — | — | — | — | — |
| 28 | Cu-49.0at % Sn-8.0at % Si | 311.5 | 662.9 | 25.6 | — | — | — | — | — | — | — | — | — | — | — |
| 29 | Cu-14.0at % Sn-5.0at % Si | 740.7 | 239.1 | 20.2 | — | — | — | — | — | — | — | — | — | — | — |
| 30 | Cu-39.0at % Sn-39.0at % Si | 196.3 | 649.9 | 153.8 | — | — | — | — | — | — | — | — | — | — | — |
| 31 | Cu-39.0at % Sn-39.0at % Si | 196.3 | 649.9 | 153.8 | — | — | — | — | — | — | — | — | — | — | — |
| 32 | Cu-14.0at % Sn-7.0at% Si | 729.8 | 241.6 | 28.6 | — | — | — | — | — | — | — | — | — | — | — |
| 33 | Cu-29.0at % Sn-16.0at% Si | 473.2 | 466.0 | 60.8 | — | — | — | — | — | — | — | — | — | — | — |

[Alloy Production Process]

After stabilizing the molten metal temperature at 1200° C., the molten metal was rapidly cooled under the conditions described below to cast an alloy foil sheet having a thickness of 75 μm.

As the cooling conditions, the alloy foil sheet was produced by the strip casting (SC) method of the above-described embodiment using the production apparatus shown in FIG. 30. Specifically, a water-cooled cooling roll made of copper was used. The rotational speed of the cooling roll was set to 300 meters per minute by the peripheral speed of the roll surface. The above-described molten metal was supplied to the rotating water-cooled roll via a horizontal tundish (made of alumina) in an argon atmosphere. The molten metal was pulled up by the rotating water-cooled roll, and thereby the molten metal was rapidly cooled and solidified. The width of the gap between the blade member and the water-cooled roll was 80 μm. The blade member was made of alumina.

[Mechanical Alloying (MA) Process]

Mechanical alloying (MA) processing was further performed on the alloy foil sheet of a test number other than Test Number 21. Specifically, the alloy foil sheet, graphite powder (mean particle diameter is 5 μm by median diameter D50), PEG as an oxygen source, and $SnO_2$ powder (manufactured by Hayashi Pure Chemical Ind. Co., Ltd., product number: 20001305) were mixed at proportions shown in MA condition 1 to MA condition 19. As the PEG, polyethylene glycol 20000 (reagent name) manufactured by Wako Pure Chemical Industries, Ltd., which has a mean molecular weight of 15,000 to 25,000, was used.

The mixture was subjected to mechanical alloying (MA) processing using a high-speed planetary mill (trade name: High G BX manufactured by Kurimoto, Ltd.) in an argon gas atmosphere. As the argon gas, a gas having a purity of 99.9999% or more and a dew point of –70° C. (manufactured by AIR WATER Inc.) was used. The mechanical alloying (MA) processing of each test number was carried out under the conditions described in the "A condition" column shown in Table 7. The chiller cooling water during the mechanical alloying (MA) processing was 1 to 25° C. under all the MA conditions. In Test Number 21, the mechanical alloying (MA) processing was not performed.

TABLE 7

| Test Number | MA condition | Negative electrode active material Chemical composition of alloy elements (at %) | Amount of addition of PEG (mass %) | Amount of addition of $SnO_2$ (mass %) | Oxygen content (mass %) |
|---|---|---|---|---|---|
| 1 | 1 | Cu-21.0 at % Sn-8.0 at % Si | 6.0 | 0.10 | 2.41 |
| 2 | 1 | Cu-21.0 at % Sn-28.0 at % Si | 6.0 | 0.10 | 2.53 |
| 3 | 1 | Cu-15.0 at % Sn-39.0 at % Si | 6.0 | 0.10 | 2.48 |
| 4 | 1 | Cu-14.0 at % Sn-7.0 at % Si | 6.0 | 0.10 | 2.43 |
| 5 | 1 | Cu-39.0 at % Sn-39.0 at % Si | 6.0 | 0.10 | 2.57 |
| 6 | 1 | Cu-39.0 at % Sn-7.0 at % Si | 6.0 | 0.10 | 2.44 |
| 7 | 1 | Cu-14.0 at % Sn-28.0 at % Si | 6.0 | 0.10 | 2.51 |
| 8 | 1 | Cu-28.0 at % Sn-29.0 at % Si | 6.0 | 0.10 | 2.60 |
| 9A | 1 | Cu-29.0 at % Sn-16.0 at % Si | 6.0 | 0.10 | 2.48 |
| 9B | 7 | Cu-29.0 at % Sn-16.0 at % Si | 6.0 | 0.10 | 0.71 |
| 9C | 8 | Cu-29.0 at % Sn-16.0 at % Si | 6.0 | 0.10 | 2.96 |
| 9D | 10 | Cu-29.0 at % Sn-16.0 at % Si | 6.0 | 0.10 | 2.55 |
| 10 | 1 | Cu-21.0 at % Sn-16.0 at % Si | 6.0 | 0.10 | 2.47 |
| 11 | 1 | Cu-29.0 at % Sn-16.0 at % Si-1.0 at % Ti | 6.0 | 0.10 | 2.46 |
| 12 | 1 | Cu-29.0 at % Sn-16.0 at % Si-1.0 at % V | 6.0 | 0.10 | 2.40 |
| 13 | 1 | Cu-29.0 at % Sn-16.0 at % Si-1.0 at % Cr | 6.0 | 0.10 | 2.49 |
| 14 | 1 | Cu-29.0 at % Sn-16.0 at % Si-1.0 at % Mn | 6.0 | 0.10 | 2.54 |
| 15 | 1 | Cu-29.0 at % Sn-16.0 at % Si-1.0 at % Fe | 6.0 | 0.10 | 2.56 |
| 16 | 1 | Cu-29.0 at % Sn-16.0 at % Si-1.0 at % Co | 6.0 | 0.10 | 2.43 |

TABLE 7-continued

| Test Number | MA condition | Chemical composition of alloy elements (at %) | Amount of addition of PEG (mass %) | Amount of addition of SnO$_2$ (mass %) | Oxygen content (mass %) |
|---|---|---|---|---|---|
| 17 | 1 | Cu-29.0 at % Sn-16.0 at % Si-2.0 at % Ni | 6.0 | 0.10 | 2.42 |
| 18 | 1 | Cu-29.0 at % Sn-16.0 at % Si-2.0 at % Zn | 6.0 | 0.10 | 2.44 |
| 19 | 1 | Cu-29.0 at % Sn-16.0 at % Si-2.0 at % Al | 6.0 | 0.10 | 2.47 |
| 20 | 1 | Cu-29.0 at % Sn-16.0 at % Si-1.0 at % B | 6.0 | 0.10 | 2.53 |
| 9E | 2 | Cu-29.0 at % Sn-16.0 at % Si | 6.0 | 0.10 | 2.47 |
| 9F | 3 | Cu-29.0 at % Sn-16.0 at % Si | 6.0 | 0.10 | 2.44 |
| 9G | 4 | Cu-29.0 at % Sn-16.0 at % Si | 6.0 | 0.10 | 2.46 |
| 9H | 5 | Cu-29.0 at % Sn-16.0 at % Si | 6.0 | 0.10 | 2.53 |
| 9I | 6 | Cu-29.0 at % Sn-16.0 at % Si | — | 0.10 | 0.32 |
| 9J | 9 | Cu-29.0 at % Sn-16.0 at % Si | 15.0 | 0.10 | 5.67 |
| 9K | 11 | Cu-29.0 at % Sn-16.0 at % Si | 6.0 | 0.05 | 1.56 |
| 9L | 12 | Cu-29.0 at % Sn-16.0 at % Si | 6.0 | 0.90 | 2.84 |
| 9M | 13 | Cu-29.0 at % Sn-16.0 at % Si | 6.0 | — | 2.51 |
| 9N | 14 | Cu-29.0 at % Sn-16.0 at % Si | 6.0 | 2.00 | 2.98 |
| 9O | 15 | Cu-29.0 at % Sn-16.0 at % Si | 6.0 | 0.10 | 2.44 |
| 9P | 16 | Cu-29.0 at % Sn-16.0 at % Si | 6.0 | 0.10 | 2.40 |
| 9Q | 17 | Cu-29.0 at % Sn-16.0 at % Si | 6.0 | 0.10 | 2.53 |
| 21 | — | 100% Si | — | — | — |
| 22 | 1 | Cu-49.0 at % Sn-2.0 at % Si | 6.0 | 0.10 | 2.49 |
| 23 | 1 | Cu-44.0 at % Sn-45.0 at % Si | 6.0 | 0.10 | 2.54 |
| 24 | 1 | Cu-15.0 at % Sn-49.0 at % Si | 6.0 | 0.10 | 2.61 |
| 25 | 1 | Cu-5.0 at % Sn-3.0 at % Si | 6.0 | 0.10 | 2.46 |
| 26 | 1 | Cu-5.0 at % Sn-49.0 at % Si | 6.0 | 0.10 | 2.54 |
| 27 | 1 | Cu-6.0 at % Sn-8.0 at % Si | 6.0 | 0.10 | 2.49 |
| 28 | 1 | Cu-49.0 at % Sn-8.0 at % Si | 6.0 | 0.10 | 2.47 |
| 29 | 1 | Cu-14.0 at % Sn-5.0 at % Si | 6.0 | 0.10 | 2.64 |
| 30 | 1 | Cu-39.0 at % Sn-39.0 at % Si | 6.0 | 0.90 | 2.59 |
| 31 | 18 | Cu-39.0 at % Sn-39.0 at % Si | 6.0 | 0.10 | 2.53 |
| 32 | 1 | Cu-14.0 at % Sn-7.0 at % Si | 6.0 | 0.05 | 2.43 |
| 33 | 19 | Cu-29.0 at % Sn-16.0 at % Si | 6.0 | 0.01 | 2.50 |

[MA Condition 1]
Centrifugal acceleration: 79 G (equivalent to rotational speed: 500 rpm)
Ball ratio: 15 (alloy foil sheet: ball=40 g: 600 g)
Alloy foil sheet: 88.9 mass %
Graphite powder: 6 mass %
PEG: 6.0 mass %
SnO$_2$: 0.10 mass %
MA processing time: 12 hours
Stop time per 3 hours of MA processing: 30 minutes

[MA Condition 2]
Centrifugal acceleration: 79 G (equivalent to rotational speed: 500 rpm)
Ball ratio: 15 (alloy foil sheet: ball=40 g: 600 g)
Alloy foil sheet: 88.9 mass %
Graphite powder: 6 mass %
PEG: 6.0 mass %
SnO$_2$: 0.10 mass %
MA processing time: 0.5 hours

[MA Condition 3]
Centrifugal acceleration: 79 G (equivalent to rotational speed: 500 rpm)
Ball ratio: 2 (alloy foil sheet: ball=300 g: 600 g)
Alloy foil sheet: 88.9 mass %
Graphite powder: 6 mass %
PEG: 6.0 mass %
SnO$_2$: 0.10 mass %
MA processing time: 12 hours
Stop time per 3 hours of MA processing: 30 minutes

[MA Condition 4]
Centrifugal acceleration: 79 G (equivalent to rotational speed: 500 rpm)
Ball ratio: 100 (alloy foil sheet: ball=6 g: 600 g)
Alloy foil sheet: 88.9 mass %
Graphite powder: 6 mass %
PEG: 6.0 mass %
SnO$_2$: 0.10 mass %
MA processing time: 12 hours
Stop time per 3 hours of MA processing: 30 minutes

[MA Condition 5]
Centrifugal acceleration: 7 G (equivalent to rotational speed: 150 rpm)
Ball ratio: 15 (alloy foil sheet: ball=40 g: 600 g)
Alloy foil sheet: 88.9 mass %
Graphite powder: 6 mass %
PEG: 6.0 mass %
SnO$_2$: 0.10 mass %
MA processing time: 12 hours
Stop time per 3 hours of MA processing: 30 minutes

[MA Condition 6]
Centrifugal acceleration: 79 G (equivalent to rotational speed: 500 rpm)
Ball ratio: 15 (alloy foil sheet: ball=40 g: 600 g)
Alloy foil sheet: 93.9 mass %
Graphite powder: 6 mass %
PEG: None
SnO$_2$: 0.10 mass %

MA processing time: 12 hours
Stop time per 3 hours of MA processing: 30 minutes
[MA Condition 7]
Centrifugal acceleration: 79 G (equivalent to rotational speed: 500 rpm)
Ball ratio: 15 (alloy foil sheet: ball=40 g: 600 g)
Alloy foil sheet: 98.4 mass %
Graphite powder: 0.5 mass %
PEG: 6.0 mass %
$SnO_2$: 0.10 mass %
MA processing time: 12 hours
Stop time per 3 hours of MA processing: 30 minutes
[MA Condition 8]
Centrifugal acceleration: 79 G (equivalent to rotational speed: 500 rpm)
Ball ratio: 15 (alloy foil sheet: ball=40 g: 600 g)
Alloy foil sheet: 86.9 mass %
Graphite powder: 6 mass %
PEG: 6.0 mass %
$SnO_2$: 0.10 mass %
MA processing time: 12 hours
Stop time per 3 hours of MA processing: 30 minutes
[MA Condition 9]
Centrifugal acceleration: 79 G (equivalent to rotational speed: 500 rpm)
Ball ratio: 15 (alloy foil sheet: ball=40 g: 600 g)
Alloy foil sheet: 78.9 mass %
Graphite powder: 6 mass %
PEG: 15.0 mass %
$SnO_2$: 0.10 mass %
MA processing time: 12 hours
Stop time per 3 hours of MA processing: 30 minutes
[MA Condition 10]
Centrifugal acceleration: 79 G (equivalent to rotational speed: 500 rpm)
Ball ratio: 6 (alloy foil sheet: ball=100 g: 600 g)
Alloy foil sheet: 88.9 mass %
Graphite powder: 6 mass %
PEG: 6.0 mass %
$SnO_2$: 0.10 mass %
MA processing time: 12 hours
Stop time per 3 hours of MA processing: 30 minutes
[MA Condition 11]
Centrifugal acceleration: 79 G (equivalent to rotational speed: 500 rpm)
Ball ratio: 15 (alloy foil sheet: ball=40 g: 600 g)
Alloy foil sheet: 88.95 mass %
Graphite powder: 6 mass %
PEG: 6.0 mass %
$SnO_2$: 0.05 mass %
MA processing time: 12 hours
Stop time per 3 hours of MA processing: 30 minutes
[MA Condition 12]
Centrifugal acceleration: 79 G (equivalent to rotational speed: 500 rpm)
Ball ratio: 15 (alloy foil sheet: ball=40 g: 600 g)
Alloy foil sheet: 88.1 mass %
Graphite powder: 6 mass %
PEG: 6.0 mass %
$SnO_2$: 0.90 mass %
MA processing time: 12 hours
Stop time per 3 hours of MA processing: 30 minutes
[MA Condition 13]
Centrifugal acceleration: 79 G (equivalent to rotational speed: 500 rpm)
Ball ratio: 15 (alloy foil sheet: ball=40 g: 600 g)
Alloy foil sheet: 89.0 mass %
Graphite powder: 6 mass %
PEG: 6.0 mass %
$SnO_2$: None
MA processing time: 12 hours
Stop time per 3 hours of MA processing: 30 minutes
[MA Condition 14]
Centrifugal acceleration: 79 G (equivalent to rotational speed: 500 rpm)
Ball ratio: 15 (alloy foil sheet: ball=40 g: 600 g)
Alloy foil sheet: 87.0 mass %
Graphite powder: 6 mass %
PEG: 6.0 mass %
$SnO_2$: 2.00 mass %
MA processing time: 12 hours
Stop time per 3 hours of MA processing: 30 minutes
[MA Condition 15]
Centrifugal acceleration: 79 G (equivalent to rotational speed: 500 rpm)
Ball ratio: 15 (alloy foil sheet: ball=40 g: 600 g)
Alloy foil sheet: 88.9 mass %
Graphite powder: 6 mass %
PEG: 6.0 mass %
$SnO_2$: 0.10 mass %
MA processing time: 6 hours
Stop time per 3 hours of MA processing: 30 minutes
[MA Condition 16]
Centrifugal acceleration: 79 G (equivalent to rotational speed: 500 rpm)
Ball ratio: 15 (alloy foil sheet: ball=40 g: 600 g)
Alloy foil sheet: 88.9 mass %
Graphite powder: 6 mass %
PEG: 6.0 mass %
$SnO_2$: 0.10 mass %
MA processing time: 24 hours
Stop time per 3 hours of MA processing: 30 minutes
[MA Condition 17]
Centrifugal acceleration: 79 G (equivalent to rotational speed: 500 rpm)
Ball ratio: 15 (alloy foil sheet: ball=40 g: 600 g)
Alloy foil sheet: 88.9 mass %
Graphite powder: 6 mass %
PEG: 6.0 mass %
$SnO_2$: 0.10 mass %
MA processing time: 36 hours
Stop time per 3 hours of MA processing: 30 minutes
[MA Condition 18]
Centrifugal acceleration: 79 G (equivalent to rotational speed: 500 rpm)
Ball ratio: 15 (alloy foil sheet: ball=40 g: 600 g)
Alloy foil sheet: 88.9 mass %
Graphite powder: 6 mass %
PEG: 6.0 mass %
$SnO_2$: 0.10 mass %
MA processing time: 48 hours
Stop time per 3 hours of MA processing: 30 minutes
[MA Condition 19]
Centrifugal acceleration: 79 G (equivalent to rotational speed: 500 rpm)
Ball ratio: 15 (alloy foil sheet: ball=40 g: 600 g)
Alloy foil sheet: 88.91 mass %
Graphite powder: 6 mass %
PEG: 6.0 mass %
$SnO_2$: 0.01 mass %
MA processing time: 12 hours
Stop time per 3 hours of MA processing: 30 minutes
Alloy particles were produced by the process described so far. The mean particle diameter of the alloy particles was 0.5 to 50 μm in all the test numbers. The alloy particles were used as the negative electrode active material. The alloy particles in the negative electrode active material were 100 mass %.

The oxygen content, the structure, the Si contents of the D0$_3$ phase, the δ phase, the ε phase, and the η' phase, and the x value of SiO$_x$ phase (x=0.50 to 1.70), the volume fraction (vol %) of the SiO$_x$ phase, the volume fraction of the η' phase (vol %), the strongest diffraction line peak, the half-value width, the crystallite diameter, and the mean circle-equivalent diameter of the SiO$_x$ phase (x=0.50 to 1.70) of the alloy particles in the negative electrode active material were obtained by the above-described methods. Furthermore, the initial discharge capacity, the initial coulombic efficiency, the capacity retention ratio, and the stable-period coulombic efficiency were investigated for coin batteries produced from the negative electrode active material of each test number.

In order to confirm that the position and the half-value width of the strongest diffraction line peak do not change even after discharging after a charging/discharging cycle, X-ray diffraction measurements before charging, after 10 cycles charging, and after 10 cycles discharging were performed on the negative electrode active material of each test number (excluding Test Number 21) shown in Table 7. From the obtained X-ray diffraction profiles, the change behaviors of the strongest diffraction line peak and the peak width after 10 cycles discharging, and the X-ray diffraction profile after 10 cycles charging were investigated. As a result, there was no significant change occurred in the position of the strongest diffraction line peak, the peak width after charging, and the peak width after discharging.

[Measurement of Oxygen Content in Alloy Particles of Negative Electrode Active Material]

For the negative electrode active material of each test number, the oxygen content in the alloy particles of the negative electrode active material after mechanical alloying (MA) was measured by the above-described method. The results are shown in Table 7.

[Identification of Structure of Alloy Particles]

A sample for TEM observation was prepared as described above using the produced negative electrode active material. The prepared sample for TEM observation was subjected to pick up of bright field images, measurement and analysis of electron diffraction patterns from a minute region, and EDS analysis in the same region as the region where the electron diffraction pattern was measured, by the above-described methods, to identify the phases constituting the structure of the alloy particles. The results are shown in Table 8.

TABLE 8

| | Negative electrode active material | | | | | | |
|---|---|---|---|---|---|---|---|
| | Type of phase | | | | Volume fraction (vol %) | | |
| Test Number | D0$_3$ phase, δ phase | ε phase, η' phase | SiO$_x$ phase | Others | SiO$_x$ phase | η' phase | F1 |
| 1 | δ | ε | SiO$_x$ | — | 8.6 | 2.9 | 10.1 |
| 2 | D0$_3$, δ | ε, η' | SiO$_x$ | — | 20.6 | 2.7 | 22.0 |
| 3 | D0$_3$, δ | ε, η' | SiO$_x$ | — | 23.6 | 1.8 | 24.5 |
| 4 | δ | ε, η' | SiO$_x$ | — | 7.5 | 1.2 | 8.1 |
| 5 | D0$_3$, δ | ε, η' | SiO$_x$ | — | 56.1 | 17.3 | 64.8 |
| 6 | D0$_3$, δ | ε, η' | SiO$_x$ | — | 5.2 | 58.3 | 34.4 |
| 7 | δ | ε, η' | SiO$_x$ | — | 28.6 | 1.2 | 29.2 |
| 8 | D0$_3$ | ε, η' | SiO$_x$ | — | 41.9 | 16.8 | 50.3 |
| 9A | D0$_3$ | η' | SiO$_x$ | — | 35.1 | 2.9 | 36.6 |
| 9B | D0$_3$, δ | ε, η' | SiO$_x$ | — | 23.0 | 5.7 | 25.9 |

TABLE 8-continued

| | Negative electrode active material | | | | | | |
|---|---|---|---|---|---|---|---|
| | Type of phase | | | | Volume fraction (vol %) | | |
| Test Number | D0$_3$ phase, δ phase | ε phase, η' phase | SiO$_x$ phase | Others | SiO$_x$ phase | η' phase | F1 |
| 9C | D0$_3$, δ | ε, η' | SiO$_x$ | — | 38.4 | 4.8 | 40.8 |
| 9D | D0$_3$, δ | ε, η' | SiO$_x$ | — | 28.6 | 1.1 | 29.2 |
| 10 | δ | ε, η' | SiO$_x$ | — | 34.1 | 1.1 | 34.7 |
| 11 | D0$_3$, δ | ε, η' | SiO$_x$ | — | 33.4 | 2.8 | 34.8 |
| 12 | D0$_3$, δ | ε, η' | SiO$_x$ | — | 32.6 | 2.6 | 33.9 |
| 13 | D0$_3$, δ | ε, η' | SiO$_x$ | — | 29.7 | 2.1 | 30.8 |
| 14 | D0$_3$, δ | ε, η' | SiO$_x$ | — | 31.0 | 2.9 | 32.5 |
| 15 | D0$_3$, δ | ε, η' | SiO$_x$ | — | 28.3 | 2.4 | 29.5 |
| 16 | D0$_3$, δ | ε, η' | SiO$_x$ | — | 27.4 | 2.7 | 28.8 |
| 17 | D0$_3$, δ | ε, η' | SiO$_x$ | — | 32.1 | 2.3 | 33.3 |
| 18 | D0$_3$, δ | ε, η' | SiO$_x$ | — | 34.9 | 2.7 | 36.3 |
| 19 | D0$_3$, δ | ε, η' | SiO$_x$ | — | 32.1 | 3.1 | 33.7 |
| 20 | D0$_3$, δ | ε, η' | SiO$_x$ | — | 29.6 | 2.8 | 31.0 |
| 9E | D0$_3$, δ | ε, η' | — | Sn | — | 1.1 | — |
| 9F | D0$_3$, δ | ε, η' | — | Sn | — | 1.3 | — |
| 9G | D0$_3$ | ε, η' | SiO$_x$ | — | 41.7 | 8.7 | 46.1 |
| 9H | D0$_3$, δ | ε, η' | — | Sn | — | 2.3 | — |
| 9I | D0$_3$, δ | ε, η' | — | Sn | — | 3.6 | — |
| 9J | D0$_3$, δ | ε, η' | SiO$_x$ | — | 46.3 | 2.7 | 47.7 |
| 9K | D0$_3$, δ | ε, η' | SiO$_x$ | — | 26.3 | 3.6 | 28.1 |
| 9L | D0$_3$, δ | ε, η' | SiO$_x$ | — | 39.4 | 2.9 | 40.9 |
| 9M | D0$_3$, δ | ε, η' | SiO$_x$ | — | 4.3 | 7.8 | 8.2 |
| 9N | D0$_3$, δ | ε | SiO$_x$ | — | 36.3 | — | 36.3 |
| 9O | D0$_3$, δ | ε, η' | SiO$_x$ | — | 36.4 | 1.8 | 37.3 |
| 9P | D0$_3$, δ | ε, η' | SiO$_x$ | — | 34.6 | 6.9 | 38.1 |
| 9Q | D0$_3$, δ | ε, η' | SiO$_x$ | — | 35.8 | 10.6 | 41.1 |
| 21 | — | — | — | Si (by XRD) | — | 0.0 | — |
| 22 | — | ε, η' | — | Sn | — | 68.6 | — |
| 23 | — | ε, η' | SiO$_x$ | — | 61.8 | 5.2 | 64.4 |
| 24 | D0$_3$, δ | — | SiO$_x$ | Cu—Si compound | 65.9 | 0.0 | 65.9 |
| 25 | — | — | — | fcc-Cu | — | 0.0 | — |
| 26 | δ | — | SiO$_x$ | Cu—Si compound | 69.1 | 0.0 | 69.1 |
| 27 | δ | — | SiO$_x$ | — | 12.6 | 0.0 | 12.6 |
| 28 | — | ε, η' | SiO$_x$ | — | 13.5 | 67.2 | 47.1 |
| 29 | D0$_3$, δ | — | — | — | — | 0.0 | — |
| 30 | D0$_3$, δ | ε, η' | SiO$_x$ | — | 62.0 | 1.1 | 62.6 |
| 31 | D0$_3$, δ | ε, η' | SiO$_x$ | — | 49.8 | 37.2 | 68.4 |
| 32 | δ | ε, η' | SiO$_x$ | — | 7.1 | 1.1 | 7.7 |
| 33 | D0$_3$, δ | ε, η' | SiO$_x$ | — | 5.1 | 7.9 | 9.1 |

[Measurement of Volume Fraction of SiO$_x$ Phase (x=0.50 to 1.70) and Volume Fraction of η' Phase in Alloy Particles]

A sample for TEM observation was prepared as described above using the produced negative electrode active material. The prepared sample for TEM observation was subjected to pickup of HAADF-STEM images and STEM-EDS analysis in the same field of view, by the above-described method, and as described above, the volume fraction of the SiO$_x$ phase (x=0.50 to 1.70) and the volume fraction of the η' phase were analyzed and calculated. The results are shown in Table 8.

[Measurement of Si Content (at %) of D0$_3$ Phase, δ Phase, ε Phase and η' Phase]

As described above, the phases constituting the structure of the alloy particles were identified. The Si content of each phase was calculated from the results of EDS analysis of each phase of the D0$_3$ phase, the δ phase, the ε phase, and the η' phase. The results are shown in Table 9.

TABLE 9

| | Negative electrode active material | | | | |
|---|---|---|---|---|---|
| Test Number | Si content of $DO_3$ phase (at %) | Si content of δ phase (at %) | Si content of ε phase (at %) | Si content of η' phase (at %) | x value of $SiO_x$ phase |
| 1 | — | 1.2 | 2.1 | — | 1.43 |
| 2 | 2.0 | 2.3 | 2.8 | 2.3 | 1.02 |
| 3 | 4.3 | 4.1 | 0.9 | 1.6 | 0.96 |
| 4 | — | 1.7 | 1.1 | — | 1.21 |
| 5 | 4.2 | 3.8 | 2.6 | 3.1 | 1.46 |
| 6 | 1.3 | 1.5 | 1.5 | 1.7 | 1.32 |
| 7 | — | 3.7 | 2.7 | — | 1.68 |
| 8 | 3.5 | — | 3.2 | 2.1 | 1.23 |
| 9A | 1.7 | — | — | 1.4 | 0.96 |
| 9B | 4.1 | 4.1 | 2.9 | 2.3 | 0.55 |
| 9C | 1.7 | 2.3 | 1.2 | 1.6 | 1.21 |
| 9D | 3.5 | 3.7 | 1.4 | 2.7 | 0.68 |
| 10 | — | 2.9 | 1.3 | — | 0.97 |
| 11 | 2.8 | 2.4 | 0.9 | 1.9 | 1.32 |
| 12 | 3.4 | 2.3 | 0.8 | 0.9 | 1.42 |
| 13 | 1.9 | 2.1 | 0.9 | 0.9 | 1.12 |
| 14 | 2.4 | 1.9 | 0.9 | 0.7 | 1.30 |
| 15 | 2.3 | 1.8 | 1.1 | 1.7 | 1.02 |
| 16 | 2.1 | 1.6 | 1.9 | 1.6 | 0.98 |
| 17 | 2.3 | 2.7 | 1.3 | 1.4 | 0.74 |
| 18 | 2.0 | 2.3 | 1.1 | 1.3 | 0.96 |
| 19 | 2.3 | 2.1 | 0.9 | 1.9 | 1.00 |
| 20 | 2.0 | 2.7 | 1.8 | 1.7 | 0.78 |
| 9E | 15.3 | 14.3 | 7.3 | 5.9 | — |
| 9F | 14.6 | 15.7 | 7.6 | 5.5 | — |
| 9G | 3.5 | — | 2.4 | 2.4 | 1.75 |
| 9H | 16.4 | 16.3 | 6.3 | 5.6 | — |
| 9I | 13.7 | 12.7 | 6.4 | 5.7 | — |
| 9J | 0.7 | 0.9 | 0.7 | 0.8 | 1.89 |
| 9K | 1.9 | 1.7 | 2.3 | 2.8 | 1.23 |
| 9L | 3.2 | 3.0 | 3.8 | 3.6 | 1.04 |
| 9M | 0.9 | 0.8 | 1.3 | 1.5 | 0.96 |
| 9N | 2.2 | 2.5 | 3.1 | — | 0.68 |
| 9O | 3.4 | 2.9 | 2.6 | 3.3 | 0.86 |
| 9P | 1.3 | 1.0 | 2.1 | 1.4 | 0.70 |
| 9Q | 0.8 | 0.6 | 1.2 | 1.5 | 1.32 |
| 21 | — | — | — | — | — |
| 22 | — | — | 1.4 | 1.1 | — |
| 23 | — | — | 6.3 | 5.6 | 1.74 |
| 24 | 6.3 | 5.9 | — | — | 0.88 |
| 25 | — | — | — | — | — |
| 26 | — | 7.3 | — | — | 1.36 |
| 27 | — | 3.6 | — | — | 0.68 |
| 28 | — | — | 6.4 | 5.1 | 1.47 |
| 29 | 4.1 | 4.1 | — | — | — |
| 30 | 3.8 | 4.2 | 3.2 | 3.7 | 1.56 |
| 31 | 3.2 | 4.8 | 4.1 | 3.1 | 1.61 |
| 32 | — | 1.5 | 1.0 | — | 1.31 |
| 33 | 0.8 | 0.9 | 1.4 | 1.3 | 0.97 |

[Measurement for $SiO_x$ Phase (x=0.50 to 1.70)]

As described above, the phases constituting the structure of the alloy particles were identified. The x value of the $SiO_x$ phase was calculated from the result of EDS analysis of the $SiO_x$ phase (x=0.50 to 1.70). From the bright field image, image processing was performed by the above-described method, and the mean circle-equivalent diameter of the $SiO_x$ phase (x=0.50 to 1.70) was measured. The results are shown in Tables 9 and 10.

TABLE 10

| | | Negative electrode active material | | | | Coin battery properties | | | |
|---|---|---|---|---|---|---|---|---|---|
| Test Number | MA condition | Strongest diffraction line peak (degree) | Half-value width (Δ2θ/degree) | Crystallite diameter (nm) | Mean circle-equivalent diameter of $SiO_x$ phase (nm) | Initial discharge capacity (mAh/g) | Initial coulombic efficiency (%) | Capacity retention ratio (%) | Stable-period coulombic efficiency (%) |
| 1 | 1 | 43.0 | 1.25 | 7.4 | 14.3 | 472.3 | 83.6 | 85.4 | 99.87 |
| 2 | 1 | 42.8 | 1.32 | 7.0 | 16.1 | 680.9 | 87.8 | 82.6 | 99.85 |
| 3 | 1 | 43.0 | 0.81 | 11.8 | 16.9 | 602.9 | 89.8 | 84.2 | 99.86 |
| 4 | 1 | 43.0 | 1.39 | 6.7 | 20.1 | 425.3 | 83.3 | 84.3 | 99.86 |
| 5 | 1 | 42.9 | 0.76 | 12.5 | 14.0 | 654.2 | 84.8 | 84.3 | 99.86 |
| 6 | 1 | 42.9 | 1.86 | 4.9 | 15.2 | 592.8 | 81.2 | 88.3 | 99.91 |
| 7 | 1 | 42.9 | 0.76 | 12.6 | 14.8 | 621.7 | 83.2 | 86.5 | 99.89 |
| 8 | 1 | 43.0 | 1.02 | 9.2 | 21.9 | 619.6 | 88.1 | 84.5 | 99.86 |
| 9A | 1 | 43.0 | 1.10 | 8.5 | 12.5 | 624.8 | 86.3 | 85.1 | 99.87 |
| 9B | 7 | 43.0 | 1.32 | 7.0 | 17.2 | 545.3 | 82.5 | 85.7 | 99.88 |
| 9C | 8 | 43.0 | 1.55 | 6.0 | 12.7 | 605.6 | 82.9 | 83.8 | 99.86 |
| 9D | 10 | 43.0 | 0.81 | 11.7 | 116.6 | 635.4 | 84.0 | 78.8 | 99.85 |
| 10 | 1 | 42.9 | 1.71 | 5.4 | 12.7 | 626.7 | 88.9 | 82.5 | 99.83 |
| 11 | 1 | 42.9 | 0.90 | 10.5 | 11.5 | 620.6 | 87.6 | 82.3 | 99.82 |
| 12 | 1 | 43.0 | 1.15 | 8.1 | 15.7 | 651.9 | 86.5 | 82.4 | 99.81 |
| 13 | 1 | 43.0 | 1.69 | 5.4 | 25.1 | 628.1 | 85.3 | 82.2 | 99.82 |
| 14 | 1 | 43.0 | 1.14 | 8.2 | 21.3 | 656.9 | 84.2 | 82.6 | 99.83 |
| 15 | 1 | 42.9 | 1.16 | 8.1 | 22.3 | 594.1 | 86.4 | 82.8 | 99.84 |
| 16 | 1 | 43.0 | 1.14 | 8.2 | 13.9 | 573.2 | 82.9 | 86.4 | 99.89 |
| 17 | 1 | 42.9 | 0.99 | 9.5 | 25.0 | 586.1 | 80.4 | 86.3 | 99.89 |
| 18 | 1 | 42.9 | 1.13 | 8.2 | 24.6 | 611.2 | 81.7 | 82.8 | 99.82 |
| 19 | 1 | 42.9 | 1.65 | 5.6 | 17.7 | 592.5 | 88.8 | 82.7 | 99.84 |
| 20 | 1 | 43.1 | 1.70 | 5.4 | 15.4 | 626.2 | 87.3 | 82.7 | 99.84 |
| 9E | 2 | 43.0 | 0.12 | 133.1 | — | 368.1 | 78.5 | 89.2 | 99.91 |
| 9F | 3 | 43.0 | 0.12 | 124.2 | — | 301.7 | 73.6 | 90.0 | 99.92 |
| 9G | 4 | 43.0 | 3.17 | 2.9 | 2.4 | 561.5 | 78.2 | 75.3 | 99.71 |
| 9H | 5 | 42.9 | 0.11 | 144.3 | — | 297.9 | 60.6 | 88.9 | 99.91 |
| 9I | 6 | 42.8 | 1.57 | 5.9 | — | 320.3 | 62.9 | 84.3 | 99.87 |
| 9J | 9 | 42.8 | 1.19 | 7.8 | 10.9 | 604.8 | 75.2 | 41.3 | 99.28 |
| 9K | 11 | 43.0 | 0.96 | 9.8 | 12.3 | 598.6 | 83.6 | 83.9 | 99.85 |

TABLE 10-continued

| | | Negative electrode active material | | | | Coin battery properties | | | |
|---|---|---|---|---|---|---|---|---|---|
| Test Number | MA condition | Strongest diffraction line peak (degree) | Half-value width (Δ2θ/ degree) | Crystallite diameter (nm) | Mean circle-equivalent diameter of SiO$_x$ phase (nm) | Initial discharge capacity (mAh/g) | Initial coulombic efficiency (%) | Capacity retention ratio (%) | Stable-period coulombic efficiency (%) |
| 9L | 12 | 43.0 | 1.23 | 7.6 | 9.6 | 623.1 | 84.2 | 82.3 | 99.82 |
| 9M | 13 | 43.1 | 1.32 | 7.0 | 9.8 | 369.4 | 86.7 | 83.6 | 99.86 |
| 9N | 14 | 43.2 | 0.75 | 12.7 | 10.6 | 426.8 | 84.3 | 82.6 | 99.84 |
| 9O | 15 | 42.4 | 0.56 | 17.4 | 23.9 | 625.7 | 84.8 | 84.3 | 99.84 |
| 9P | 16 | 43.5 | 1.69 | 5.4 | 7.8 | 629.8 | 86.0 | 82.3 | 99.84 |
| 9Q | 17 | 43.0 | 1.87 | 4.9 | 6.4 | 632.8 | 84.6 | 82.4 | 99.83 |
| 21 | — | — | — | — | — | 1135.0 | 59.0 | 9.9 | 98.33 |
| 22 | 1 | 42.8 | 1.35 | 6.8 | 10.3 | 579.8 | 80.1 | 47.7 | 99.36 |
| 23 | 1 | 43.1 | 1.71 | 5.4 | 13.9 | 672.1 | 73.5 | 21.5 | 98.81 |
| 24 | 1 | 42.9 | 1.00 | 9.4 | 14.8 | 421.7 | 58.9 | 56.8 | 99.48 |
| 25 | 1 | 43.1 | 1.41 | 6.5 | 14.1 | 25.7 | 43.4 | 86.8 | 99.89 |
| 26 | 1 | 42.9 | 1.09 | 8.6 | 11.9 | 464.9 | 47.2 | 52.8 | 99.40 |
| 27 | 1 | 43.0 | 1.63 | 5.6 | 17.6 | 53.5 | 43.9 | 86.8 | 99.90 |
| 28 | 1 | 43.0 | 1.53 | 6.0 | 22.0 | 525.1 | 56.0 | 19.1 | 98.71 |
| 29 | 1 | 42.8 | 1.10 | 8.4 | 15.2 | 166.5 | 53.4 | 85.7 | 99.89 |
| 30 | 1 | 42.9 | 0.87 | 10.9 | 16.0 | 658.2 | 83.6 | 82.7 | 99.68 |
| 31 | 18 | 42.8 | 0.87 | 10.9 | 16.7 | 621.8 | 84.3 | 82.1 | 99.71 |
| 32 | 1 | 43.1 | 1.21 | 7.7 | 19.8 | 408.6 | 84.1 | 85.6 | 99.87 |
| 33 | 19 | 43.1 | 1.36 | 6.8 | 10.0 | 402.3 | 85.3 | 82.6 | 99.84 |

[Measurement of Strongest Diffraction Line Peak, Half-Value Width, and Crystallite Diameter]

The produced negative electrode active material was subjected to X-ray diffraction measurement under the above-described conditions, and the strongest diffraction line peak, the half-value width, and the crystallite diameter were measured.

Figure 33:
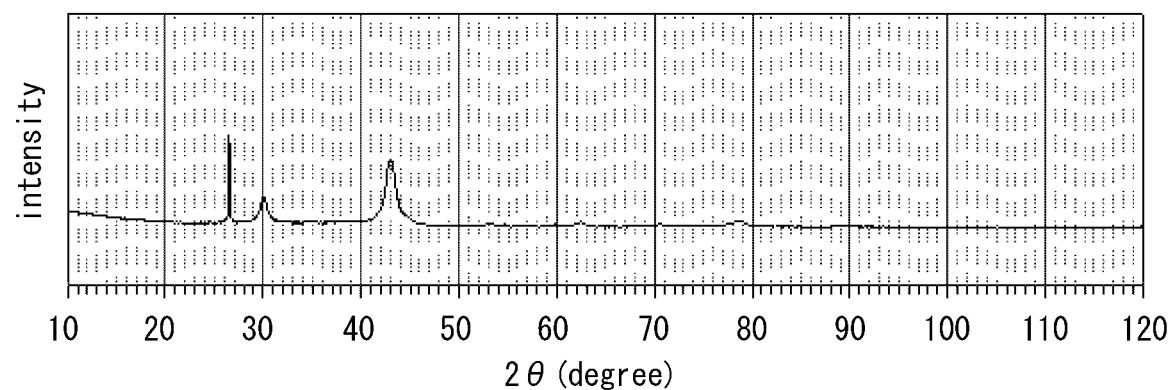
FIG. 33 shows X-ray diffraction profiles of the negative electrode active material of Test Number 9A in Examples.

Description will be made using Test Number 9A as an example. FIG. 33 is an X-ray diffraction profile of the negative electrode active material of Test Number 9A. Referring to FIG. 33, the diffraction line peak having the maximum diffraction integrated intensity (strongest diffraction line peak) existed at 2θ=43.00 degrees. In FIG. 33, the peak appearing at 2θ=26.0 to 27.0 is a peak of graphite. The half-value width (Δ2θ=B (degrees)) of the strongest diffraction line peak was 1.10 degrees after correcting the value derived from the apparatus. Further, as a result of obtaining the crystallite diameter by the analysis with the above-described Scheller equation, it was 8.5 nm. For the negative electrode active materials of other test numbers, the strongest diffraction line peak, the half-value width, and the crystallite diameter were obtained by the same method. The results are shown in Table 10.

Negative electrodes and coin batteries were produced by using the produced negative electrode active materials. The production method of the negative electrode and the coin battery of each test number other than Test Number 21 was as follows. In Test Number 21, a negative electrode and a coin battery were produced in the same manner as in other test numbers except that a powder reagent of pure Si was ground in an automatic mortar and used as the negative electrode active material.

[Production of Negative Electrodes for Coin Batteries]

In each test number, a negative electrode compound slurry containing the above-described negative electrode active material was produced. Specifically, a mixture in which a powdered negative electrode active material, acetylene black (AB) as a conductive auxiliary agent, styrene-butadiene rubber (SBR) (2-fold diluted solution) as a binder, and carboxymethyl cellulose (CMC: Product No. 1160 manufactured by Daisel Fine Chemicals Co., Ltd.) as a thickener were mixed at a mass ratio of 75:15:10:5 (blending amount: 1 g:0.2 g:0.134 g:0.067 g) was produced. Then, using a kneader, distilled water was added to the mixture such that the slurry concentration was 27.2% to produce a negative electrode compound slurry. Since the styrene-butadiene rubber diluted 2-fold with water was used, 0.134 g of styrene-butadiene rubber was blended when weighing.

The produced negative electrode compound slurry was applied onto a copper foil using an applicator (150 μm). The copper foil applied with the slurry was dried at 100° C. for 20 minutes. The dried copper foil had a coated film made from a negative electrode active material film on the surface. A copper foil having a negative electrode active material film was punched to produce a disk-shaped copper foil having a diameter of 13 mm. The punched copper foil was pressed with a pressing pressure of 500 kgf/cm² to produce a plate-shaped negative electrode.

[Production of Coin Batteries]

The produced negative electrode, EC-DMC-EMC-VC-FEC as the electrolytic solution, a polyolefin separator (φ17 mm) as the separator, and a plate-shaped metal Li (φ19×1 mmt) as the positive electrode material were prepared. By using the prepared negative electrode material, the electrolytic solution, the separator, and the positive electrode material, a coin battery of 2016 type was produced. Assembling of the coin battery was performed in a glove box in an argon atmosphere.

[Evaluation of Charging/Discharging Properties of Coin Battery]

The discharge capacity and the capacity retention ratio of the battery of each test number were evaluated by the following method.

In the initial charging, constant current doping (insertion of lithium ions into the electrode, corresponding to charging of a lithium-ion secondary battery) was performed on the coin battery at a current value of 0.1 mA (current value of 0.075 mA/cm²) until the potential difference became 0.005 V with respect to the counter electrode. Thereafter, while maintaining 0.005 V, doping was continued on the counter electrode at a constant voltage until the current value became 7.5 μA/cm² to measure the doping capacity.

Next, in the initial discharging, dedoping (removal of lithium ions from the electrode, corresponding to discharging of a lithium-ion secondary battery) was performed at a current value of 0.1 mA (current value of 0.075 mA/cm$^2$) until the potential difference became 1.5 V to measure the dedoping capacity.

In the 2nd to 100th charging, constant current doping (insertion of lithium ions into the electrode, corresponding to charging of a lithium-ion secondary battery) was performed on the coin battery at a current value of 0.75 mA (current value of 0.5625 mA/cm$^2$) until the potential difference became 0.005 V with respect to the counter electrode. Thereafter, while maintaining 0.005 V, doping was continued on the counter electrode at a constant voltage until the current value became 0.075 mA to measure the doping capacity.

Next, in the 2nd to 100th discharging, dedoping (removal of lithium ions from the electrode, corresponding to discharging of the lithium-ion secondary battery) was performed at a current value of 0.75 mA (current value of 0.075 mA/cm$^2$) until the potential difference became 1.2 V to measure the dedoping capacity.

The doping capacity and the dedoping capacity correspond to the charge capacity and the discharge capacity when this electrode is used as the negative electrode of a lithium-ion secondary battery. Therefore, the measured doping capacity was defined as the "charge capacity" and the measured dedoping capacity was defined as the "discharge capacity" (mAh/g). The coin battery was repeatedly subjected to charging/discharging. The doping capacity and the dedoping capacity were measured for each charging and discharging in each cycle. By using the measurement results, the initial coulombic efficiency, the capacity retention ratio, and the stable-period coulombic efficiency were obtained. Specifically, the initial coulombic efficiency was obtained from the charge capacity and the discharge capacity (mAh/g) of the first cycle (initial cycle). The initial coulombic efficiency was expressed in percentage (%) by a value obtained by dividing the initial discharge capacity by the initial charge capacity. Further, the capacity retention ratio after 100 cycles was obtained. The capacity retention ratio was expressed in percentage by a value obtained by dividing the discharge capacity after 100 cycles by the initial discharge capacity.

The capacity of the coin battery was calculated as a value converted to the capacity of the negative electrode active material alone by subtracting the capacity of the conductive auxiliary agent (acetylene black: AB) and then dividing by the ratio of the negative electrode active material in the negative electrode compound. For example, when the ratio in the negative electrode compound was negative electrode active material: conductive auxiliary agent (AB): binder (SBR solid content): CMC=75:15:5:5, the charge capacity or the discharge capacity was calculated by converting the measured charge capacity or discharge capacity into 1 g of the negative electrode compound, thereafter, subtracting therefrom a portion of the capacity of acetylene black (25 mAh/g), and multiplying by 6/5 in order to convert it into the capacity of the negative electrode active material as single substance from the compound proportion (negative electrode active material: AB+binder+CMC=75:25). Table 10 shows the initial discharge capacity (mAh/g), the initial coulombic efficiency (%), and the capacity retention ratio (%), which were obtained as described above.

The stable-period coulombic efficiency was assumed to be a mean value of the values obtained by the following formula in each cycle from the 11th cycle to the 100th cycle in which the charging/discharging behavior was stabilized.

Stable-period coulombic efficiency(%)=(discharge capacity: mAh/g)/(charge capacity: mAh/g)×100

Table 10 shows the stable-period coulombic efficiency obtained as described above.

[Measurement Result]

Referring to Tables 6 to 10, the negative electrode active materials of Test Numbers 1-8, 9A-9D, 9K, 9L, 9N, 9O, 9P, 9Q, 10-20 and 31-33 contained alloy particles (alloy elements and oxygen) each having an appropriate composition, and also the structure of the alloy particles, the Si contents of D0$_3$ phase, the δ phase, the ε phase, and the η' phase, the x value of SiO$_x$, the strongest diffraction line peak, and the half-value width were appropriate. For that reason, the initial discharge capacity in the coin battery property was higher than the theoretical capacity of graphite (372 mAh/g). Further, the initial efficiency was 80.0% or more in each case. Further, the capacity retention ratio was 80.0% or more in each case. Furthermore, the stable-period coulombic efficiency was 99.70% or more in each case.

Further, in the negative electrode active material of Test Number 9A, the mean circle-equivalent diameter of the SiO$_x$ phase (x=0.50 to 1.70) was 2.0 to 90.0 nm. For that reason, the capacity retention ratio was higher compared to Test Number 9D.

The negative electrode active material of Test Number 9A further contained the η' phase. For that reason, the initial discharge capacity was higher compared to Test Number 9N.

In Test Number 5, F1 was 65.0 or less. For that reason, the stable-period coulombic efficiency was higher compared to Test Number 31.

In Test Number 4, F1 was 8.0 or more. For that reason, the initial discharge capacity was higher compared to Test Number 32.

In any of the above-described test numbers, the position and the half-value width of the strongest diffraction line peak in the X-ray diffraction profile of the negative electrode active material in a battery before charging and in a battery after 10 cycles of discharging were substantially the same as those of the negative electrode active material immediately after production. On the other hand, in the X-ray diffraction profile of the negative electrode active material in the battery after 10 cycles of charging, it was confirmed that the strongest diffraction line peak was broadened and the crystal structure of the constituent phase changed to become an occlusion phase.

In Test Number 9E, Si was not sufficiently discharged from each alloy phase because the mechanical alloying (MA) time was short. For that reason, the SiO$_x$ phase (x=0.50 to 1.70) was not formed so that the initial discharge capacity was low. Further, since the Si contents of the D0$_3$ phase, the δ phase, and the ε phase were high, the initial discharge capacity and the initial coulombic efficiency were low. Furthermore, the initial coulombic efficiency was low because the half-value width was small and the crystallite diameter was large.

In Test Number 9F, Si was not sufficiently discharged from each alloy phase because the ball ratio was small. For that reason, the SiO$_x$ phase (x=0.50 to 1.70) was not formed so that the initial discharge capacity was low. Further, since the Si contents of the D0$_3$ phase, the δ phase, the ε phase, and the η' phase were high, the initial discharge capacity and the initial coulombic efficiency were low. Furthermore, the initial coulombic efficiency was low because the half-value width was small and the crystallite diameter was large.

In Test Number 9G, since the ball ratio was large, the half-value width was large and the crystallite diameter was small. As a result, the initial coulombic efficiency and the capacity retention ratio were low. Further, although the volume fraction of the $SiO_x$ phase (x=0.50 to 1.70) was appropriate, the initial coulombic efficiency was low since the x value of $SiO_x$ was high.

In Test Number 9H, since the centrifugal acceleration of the mechanical alloying (MA) processing was small, Si was not sufficiently discharged from each alloy phase. For that reason, the $SiO_x$ phase (x=0.50 to 1.70) was not formed so that the initial discharge capacity was low. Further, since the Si contents of the $D0_3$ phase, the δ phase, the ε phase, and the η' phase were high, the initial discharge capacity and the initial coulombic efficiency were low. Furthermore, since the half-value width was small and the crystallite diameter was large, the initial coulombic efficiency was low.

In Test Number 9I, no oxygen source was contained. For that reason, the $SiO_x$ phase (x=0.50 to 1.70) was not formed so that the initial discharge capacity was low. Further, since the Si contents of the $D0_3$ phase, the δ phase, the ε phase, and the η' phase were high, the initial discharge capacity and the initial coulombic efficiency were low.

In Test Number 9J, there were many oxygen sources. For that reason, the oxygen content of the alloy particles was too high. Further, the x value of the $SiO_x$ phase was high, and the $SiO_2$ phase was formed. For that reason, lithium silicate was formed during the initial charging. As a result, the initial coulombic efficiency was low. Furthermore, the capacity retention ratio was also low. In addition, the stable-period coulombic efficiency was also low.

In Test Number 9M, $SnO_2$ was not added. For that reason, the $SiO_x$ phase (x=0.50 to 1.70) was not sufficiently formed so that the initial discharge capacity was low.

In Test number 21, 100% of Si was contained. For that reason, although the initial discharge capacity was high, the initial efficiency, the capacity retention ratio, and the stable-period coulombic efficiency were low.

In Test Number 22, the Sn content was too high and the Si content was too low. For that reason, no $SiO_x$ phase (x=0.50 to 1.70) was contained. On the other hand, since the volume fraction of the η' phase was too high, although the initial discharge capacity was high, the capacity retention ratio and the stable-period coulombic efficiency were low.

In Test number 23, the Sn content and the Si content were too high. For that reason, the volume fraction of the $SiO_x$ phase (x=0.50 to 1.70) was too high. As a result, the capacity retention ratio and the stable-period coulombic efficiency were low. Furthermore, since neither the $D0_3$ phase nor the δ phase was contained, the capacity retention ratio was low. Furthermore, since the Si contents of the ε phase and the η' phase were high, the initial efficiency was low. The x value of the $SiO_x$ phase was high, and the $SiO_2$ phase was formed. For that reason, lithium silicate was formed during the initial charging. As a result, the initial efficiency was low.

In Test number 24, the Si content was too high. For that reason, the volume fraction of the $SiO_x$ phase (x=0.50 to 1.70) was too high. As a result, the capacity retention ratio and the stable-period coulombic efficiency were low. Furthermore, since the Si contents of the $D0_3$ phase and the δ phase were high, the initial efficiency was low.

In Test number 25, the Sn content and the Si content were too low. For that reason, the $SiO_x$ phase (x=0.50 to 1.70) was not formed so that the initial discharge capacity was low. Furthermore, since the $D0_3$ phase, the δ phase, the ε phase, and the η' phase were not contained, the initial discharge capacity and the initial efficiency were low.

In Test Number 26, the Sn content was too low and the Si content was too high. For that reason, the volume fraction of the $SiO_x$ phase (x=0.50 to 1.70) was too high. As a result, the capacity retention ratio and the stable-period coulombic efficiency were low. Furthermore, since the Si content of the δ phase was high, the initial efficiency was low.

In Test number 27, the Sn content was too low. For that reason, since the ε phase and the η' phase were not contained, the initial discharge capacity and the initial efficiency were low.

In Test Number 28, the Sn content was too high. For that reason, the content of the η' phase was too high, and therefore the capacity retention ratio was low. Furthermore, since the Si contents of the ε phase and the η' phase were high, the initial efficiency was low.

In Test Number 29, the Si content was too low. For that reason, the $SiO_x$ phase (x=0.50 to 1.70) was not formed so that the initial discharge capacity was low. Furthermore, since the ε phase and the η' phase were not contained, the initial discharge capacity and the initial efficiency were low.

In Test Number 30, the volume fraction of the $SiO_x$ phase (x=0.50 to 1.70) was high. For that reason, the stable-period coulombic efficiency was low.

The present embodiment has been described so far. However, the embodiments described above are merely examples for carrying out the present invention. Therefore, the present invention is not limited to the above-described embodiment, and the above-described embodiment can be appropriately modified and carried out without departing from the spirit of the present invention.

REFERENCE SIGNS LIST

1 ε phase
2 δ phase
3 $SiO_x$ phase (x=0.50 to 1.70)
5 $D0_3$ phase
6 η' phase
7 $SiO_x$ phase (x=0.50 to 1.70)
8 $SiO_x$ phase (x=0.50 to 1.70)

The invention claimed is:

1. A negative electrode active material, comprising a plurality of alloy particles, wherein
a chemical composition of the alloy particles contains:
0.50 to 3.00 mass % of oxygen; and
alloy elements containing: in atomic composition percentage excluding the oxygen and carbon, Sn: 13.0 to 40.0 at % and Si: 6.0 to 40.0 at %, with a balance being Cu and impurities, wherein
a structure of the alloy particles includes:
one or more types selected from a group consisting of a phase having a $D0_3$ structure in Strukturbericht notation and having a Si content of 0 to 5.0 at %, and a δ phase having a Si content of 0 to 5.0 at %;
one or more types selected from a group consisting of an ε phase having a Si content of 0 to 5.0 at % and an η' phase having a Si content of 0 to 5.0 at %; and
a $SiO_x$ phase (x=0.50 to 1.70), wherein
the alloy particles have a peak having a maximum diffraction integrated intensity in an X-ray diffraction profile, in a range of 42.0 to 44.0 degrees of diffraction angle 2θ, and the peak has a half-value width of 0.15 to 2.50 degrees, and wherein
in the structure of the alloy particles,
the $SiO_x$ phase (x=0.50 to 1.70) has a volume fraction of 5.0 to 60.0%, and
the η' phase has a volume fraction of 0 to 60.0%.

2. The negative electrode active material according to claim 1, wherein
in the structure of the alloy particles,
the η' phase has a volume fraction of more than 0% to 60.0%.

3. The negative electrode active material according to claim 2, wherein
in the structure of the alloy particles,
a volume fraction $V_{SiOx}$ (%) of the $SiO_x$ phase (x=0.50 to 1.70) and a volume fraction $V_{\eta'}$ (%) of the η' phase satisfy Formula (1):

$$8.0 \leq V_{SiOx} + 0.5 V_{\eta'} \leq 65.0 \tag{1}.$$

4. The negative electrode active material according to claim 1, wherein
a mean circle-equivalent diameter of the $SiO_x$ phase (x=0.50 to 1.70) is 2.0 to 90.0 nm.

5. The negative electrode active material according to claim 2, wherein
a mean circle-equivalent diameter of the $SiO_x$ phase (x=0.50 to 1.70) is 2.0 to 90.0 nm.

6. The negative electrode active material according to claim 3, wherein
a mean circle-equivalent diameter of the $SiO_x$ phase (x=0.50 to 1.70) is 2.0 to 90.0 nm.

7. The negative electrode active material according to claim 1, wherein
the chemical composition of the alloy particles further contains, in place of part of Cu, one or more elements selected from the group consisting of C, Ti, V, Cr, Mn, Fe, Co, Ni, Zn, Al, and B.

8. The negative electrode active material according to claim 2, wherein
the chemical composition of the alloy particles further contains, in place of part of Cu, one or more elements selected from the group consisting of C, Ti, V, Cr, Mn, Fe, Co, Ni, Zn, Al, and B.

9. The negative electrode active material according to claim 3, wherein
the chemical composition of the alloy particles further contains, in place of part of Cu, one or more elements selected from the group consisting of C, Ti, V, Cr, Mn, Fe, Co, Ni, Zn, Al, and B.

10. The negative electrode active material according to claim 4, wherein
the chemical composition of the alloy particles further contains, in place of part of Cu, one or more elements selected from the group consisting of C, Ti, V, Cr, Mn, Fe, Co, Ni, Zn, Al, and B.

11. The negative electrode active material according to claim 5, wherein
the chemical composition of the alloy particles further contains, in place of part of Cu, one or more elements selected from the group consisting of C, Ti, V, Cr, Mn, Fe, Co, Ni, Zn, Al, and B.

12. The negative electrode active material according to claim 6, wherein
the chemical composition of the alloy particles further contains, in place of part of Cu, one or more elements selected from the group consisting of C, Ti, V, Cr, Mn, Fe, Co, Ni, Zn, Al, and B.

13. The negative electrode active material according to claim 7, wherein
the chemical composition contains one or more elements selected from the group consisting of:
C: 40% or less in mass %,
Ti: 2.0 at % or less in atomic composition percentage excluding oxygen and carbon,
V: 2.0 at % or less in atomic composition percentage excluding oxygen and carbon,
Cr: 2.0 at % or less in atomic composition percentage excluding oxygen and carbon,
Mn: 2.0 at % or less in atomic composition percentage excluding oxygen and carbon,
Fe: 2.0 at % or less in atomic composition percentage excluding oxygen and carbon,
Co: 2.0 at % or less in atomic composition percentage excluding oxygen and carbon,
Ni: 3.0 at % or less in atomic composition percentage excluding oxygen and carbon,
Zn: 3.0 at % or less in atomic composition percentage excluding oxygen and carbon,
Al: 3.0 at % or less in atomic composition percentage excluding oxygen and carbon, and
B: 2.0 at % or less in atomic composition percentage excluding oxygen and carbon.

14. The negative electrode active material according to claim 8, wherein
the chemical composition contains one or more elements selected from the group consisting of:
C: 40% or less in mass %,
Ti: 2.0 at % or less in atomic composition percentage excluding oxygen and carbon,
V: 2.0 at % or less in atomic composition percentage excluding oxygen and carbon,
Cr: 2.0 at % or less in atomic composition percentage excluding oxygen and carbon,
Mn: 2.0 at % or less in atomic composition percentage excluding oxygen and carbon,
Fe: 2.0 at % or less in atomic composition percentage excluding oxygen and carbon,
Co: 2.0 at % or less in atomic composition percentage excluding oxygen and carbon,
Ni: 3.0 at % or less in atomic composition percentage excluding oxygen and carbon,
Zn: 3.0 at % or less in atomic composition percentage excluding oxygen and carbon,
Al: 3.0 at % or less in atomic composition percentage excluding oxygen and carbon, and
B: 2.0 at % or less in atomic composition percentage excluding oxygen and carbon.

15. The negative electrode active material according to claim 9, wherein
the chemical composition contains one or more elements selected from the group consisting of:
C: 40% or less in mass %,
Ti: 2.0 at % or less in atomic composition percentage excluding oxygen and carbon,
V: 2.0 at % or less in atomic composition percentage excluding oxygen and carbon,
Cr: 2.0 at % or less in atomic composition percentage excluding oxygen and carbon,
Mn: 2.0 at % or less in atomic composition percentage excluding oxygen and carbon,
Fe: 2.0 at % or less in atomic composition percentage excluding oxygen and carbon,
Co: 2.0 at % or less in atomic composition percentage excluding oxygen and carbon,
Ni: 3.0 at % or less in atomic composition percentage excluding oxygen and carbon,
Zn: 3.0 at % or less in atomic composition percentage excluding oxygen and carbon, Al: 3.0 at % or less in atomic composition percentage excluding oxygen and carbon, and B: 2.0 at % or less in atomic composition percentage excluding oxygen and carbon.

16. The negative electrode active material according to claim 10, wherein the chemical composition contains one or more elements selected from the group consisting of:

C: 40% or less in mass %,

Ti: 2.0 at % or less in atomic composition percentage excluding oxygen and carbon, V: 2.0 at % or less in atomic composition percentage excluding oxygen and carbon, Cr: 2.0 at % or less in atomic composition percentage excluding oxygen and carbon, Mn: 2.0 at % or less in atomic composition percentage excluding oxygen and carbon, Fe: 2.0 at % or less in atomic composition percentage excluding oxygen and carbon, Co: 2.0 at % or less in atomic composition percentage excluding oxygen and carbon, Ni: 3.0 at % or less in atomic composition percentage excluding oxygen and carbon, Zn: 3.0 at % or less in atomic composition percentage excluding oxygen and carbon, Al: 3.0 at % or less in atomic composition percentage excluding oxygen and carbon, and B: 2.0 at % or less in atomic composition percentage excluding oxygen and carbon.

17. The negative electrode active material according to claim 11, wherein the chemical composition contains one or more elements selected from the group consisting of:

C: 40% or less in mass %,

Ti: 2.0 at % or less in atomic composition percentage excluding oxygen and carbon, V: 2.0 at % or less in atomic composition percentage excluding oxygen and carbon, Cr: 2.0 at % or less in atomic composition percentage excluding oxygen and carbon, Mn: 2.0 at % or less in atomic composition percentage excluding oxygen and carbon, Fe: 2.0 at % or less in atomic composition percentage excluding oxygen and carbon, Co: 2.0 at % or less in atomic composition percentage excluding oxygen and carbon, Ni: 3.0 at % or less in atomic composition percentage excluding oxygen and carbon, Zn: 3.0 at % or less in atomic composition percentage excluding oxygen and carbon, Al: 3.0 at % or less in atomic composition percentage excluding oxygen and carbon, and B: 2.0 at % or less in atomic composition percentage excluding oxygen and carbon.

18. The negative electrode active material according to claim 12, wherein the chemical composition contains one or more elements selected from the group consisting of:

C: 40% or less in mass %,

Ti: 2.0 at % or less in atomic composition percentage excluding oxygen and carbon, V: 2.0 at % or less in atomic composition percentage excluding oxygen and carbon, Cr: 2.0 at % or less in atomic composition percentage excluding oxygen and carbon, Mn: 2.0 at % or less in atomic composition percentage excluding oxygen and carbon, Fe: 2.0 at % or less in atomic composition percentage excluding oxygen and carbon, Co: 2.0 at % or less in atomic composition percentage excluding oxygen and carbon, Ni: 3.0 at % or less in atomic composition percentage excluding oxygen and carbon, Zn: 3.0 at % or less in atomic composition percentage excluding oxygen and carbon, Al: 3.0 at % or less in atomic composition percentage excluding oxygen and carbon, and B: 2.0 at % or less in atomic composition percentage excluding oxygen and carbon.

19. A negative electrode, comprising the negative electrode active material according to claim 1.

20. A battery, comprising the negative electrode according to claim 19.

* * * * *